(12) United States Patent
Scott et al.

(10) Patent No.: US 7,571,817 B2
(45) Date of Patent: *Aug. 11, 2009

(54) AUTOMATIC SEPARATOR OR SHAKER WITH ELECTROMAGNETIC VIBRATOR APPARATUS

(75) Inventors: Eric Scott, Conroe, TX (US); George E. Smith, Missouri City, TX (US); Lyndon Stone, Humble, TX (US); Norman Padolino, Montgomery, TX (US); Kevin McDonough, The Woodlands, TX (US); Kenneth W. Seyffert, Houston, TX (US); William Koederitz, Cedar Park, TX (US); Mallappa Guggari, Cedar Park, TX (US); Guy L. McClung, III, Spring, TX (US)

(73) Assignee: Varco I/P, Inc., Houston, TX (US)

( * ) Notice: Subject to any disclaimer, the term of this patent is extended or adjusted under 35 U.S.C. 154(b) by 489 days.

This patent is subject to a terminal disclaimer.

(21) Appl. No.: 11/255,159

(22) Filed: Oct. 20, 2005

(65) Prior Publication Data

US 2006/0243643 A1 Nov. 2, 2006

Related U.S. Application Data

(63) Continuation-in-part of application No. 11/096,192, filed on Mar. 31, 2005, which is a continuation-in-part of application No. 10/949,882, filed on Sep. 25, 2004, now Pat. No. 7,278,540, and a continuation-in-part of application No. 10/835,256, filed on Apr. 29, 2004, now Pat. No. 7,331,469, and a continuation-in-part of application No. 10/512,372, filed on Oct. 25, 2004, and a continuation-in-part of application No. 10/373,216, filed on Feb. 24, 2003, now Pat. No. 6,907,375.

(60) Provisional application No. 60/424,262, filed on Nov. 6, 2002.

(51) Int. Cl.
B07B 1/49 (2006.01)
(52) U.S. Cl. .................. 209/413; 209/404; 209/405; 209/412
(58) Field of Classification Search ................ 209/319, 209/365.4, 404, 405, 412, 413
See application file for complete search history.

(56) References Cited

U.S. PATENT DOCUMENTS 2,089,548 A   8/1937   Frantz et al. ............... 210/389

(Continued)

FOREIGN PATENT DOCUMENTS

DE           3611234        8/1987

(Continued)

OTHER PUBLICATIONS

Product Manual: Model S3i-101: Smart Screens Systems. Inc.: Feb. 17, 2004: 16 pages.

(Continued)

*Primary Examiner*—Patrick H Mackey
*Assistant Examiner*—Kalyanavenkateshware Kumar
(74) *Attorney, Agent, or Firm*—Guy McClung

(57) ABSTRACT

A vibratory separator (in one aspect, a shale shaker) and methods for using it, the separator in certain aspects having a base, a basket movably mounted on the base, screen apparatus on the basket, material flowing onto the screen apparatus for treatment, at least a portion of the screen apparatus not inclined downhill (e.g. said portion horizontal or uphill), electromagnetic vibratory apparatus connected to the basket for vibrating the basket and the screen apparatus, driving apparatus for driving the electromagnetic vibratory apparatus, and control apparatus (on-site and/or remote) for controlling the driving apparatus and the electromagnetic vibratory apparatus; the material, in one aspect, being drilling fluid material with solids therein.

37 Claims, 44 Drawing Sheets

U.S. PATENT DOCUMENTS

| | | | |
|---|---|---|---|
| 2,716,493 A | 8/1955 | Hutchison | 209/269 X |
| 2,750,043 A | 6/1956 | Thompson | 210/340 |
| 2,919,898 A | 1/1960 | Marwil et al. | |
| 2,938,393 A | 5/1960 | Dunn et al. | |
| 3,012,674 A | 12/1961 | Hoppe | |
| 3,053,379 A | 9/1962 | Roder et al. | |
| 3,226,989 A | 1/1966 | Robins | |
| 3,605,919 A | 9/1971 | Bromell et al. | |
| 3,659,465 A | 5/1972 | Oshima et al. | 74/61 |
| 3,796,299 A * | 3/1974 | Musschoot | 198/753 |
| 4,082,657 A | 4/1978 | Gage | 209/311 |
| 4,212,731 A | 7/1980 | Wallin et al. | 209/366.5 |
| 4,446,022 A | 5/1984 | Harry | 210/388 |
| 4,539,102 A | 9/1985 | Boston et al. | 209/38 |
| 4,546,783 A | 10/1985 | Lott | 134/109 |
| 4,549,431 A | 10/1985 | Soeiinah | 73/152.49 |
| 4,553,429 A | 11/1985 | Evans et al. | 73/152.21 |
| 4,606,415 A | 8/1986 | Gray. Jr. et al. | |
| 4,634,535 A | 1/1987 | Lott | 210/780 |
| 4,685,329 A | 8/1987 | Burgess | |
| 4,793,421 A | 12/1988 | Jasinski | 175/27 |
| 4,795,552 A | 1/1989 | Yun et al. | 209/319 |
| 4,807,469 A | 2/1989 | Hall | 73/155 |
| 4,809,791 A * | 3/1989 | Hayatdavoudi | 175/40 |
| 4,836,385 A | 6/1989 | Slesarenko et al. | 209/315 |
| 4,861,463 A | 8/1989 | Slesarenko | 209/315 |
| 4,911,834 A | 3/1990 | Murphy | 210/167 |
| 4,940,535 A | 7/1990 | Fisher et al. | 209/250 |
| 5,131,271 A | 7/1992 | Haynes et al. | 73/290 |
| 5,190,645 A | 3/1993 | Burgess | 210/144 |
| 5,265,730 A | 11/1993 | Norris et al. | 209/326 |
| 5,273,112 A | 12/1993 | Schultz | 166/374 |
| 5,314,058 A * | 5/1994 | Graham | 198/753 |
| 5,319,972 A | 6/1994 | Oblak et al. | 73/290 |
| 5,465,798 A | 11/1995 | Edlund et al. | 175/24 |
| 5,474,142 A | 12/1995 | Bowden | 175/27 |
| 5,570,749 A | 11/1996 | Reed | 175/66 |
| 5,597,042 A | 1/1997 | Tubel et al. | 166/250.01 |
| 5,662,165 A | 9/1997 | Tubel et al. | 166/250.01 |
| 5,706,896 A | 1/1998 | Tubel et al. | 166/313 |
| 5,730,219 A | 3/1998 | Tubel et al. | 66/250.01 |
| 5,732,776 A | 3/1998 | Tubel et al. | 166/250.15 |
| 5,793,705 A | 8/1998 | Gazis et al. | 367/98 |
| 5,896,998 A * | 4/1999 | Bjorklund et al. | 209/326 |
| 5,952,569 A | 9/1999 | Jervis et al. | |
| 5,955,666 A | 9/1999 | Mullins | 73/152.18 |
| 5,992,519 A | 11/1999 | Ramakrishnan et al. | 166/250.15 |
| 6,021,377 A | 2/2000 | Dubinsky et al. | |
| 6,062,070 A | 5/2000 | Maltby et al. | 73/61.49 |
| 6,105,689 A | 8/2000 | McGuire et al. | 175/48 |
| 6,116,389 A | 9/2000 | Allaei | 188/378 |
| 6,155,428 A | 12/2000 | Bailey et al. | 209/315 |
| 6,173,609 B1 | 1/2001 | Modlin et al. | 73/293 |
| 6,176,323 B1 | 1/2001 | Weirich et al. | 175/40 |
| 6,192,742 B1 | 2/2001 | Miwa et al. | 73/40 |
| 6,233,524 B1 | 5/2001 | Harrell et al. | |
| 6,234,250 B1 | 5/2001 | Green et al. | 166/250.03 |
| 6,237,404 B1 | 5/2001 | Crary et al. | 73/152.03 |
| 6,333,700 B1 * | 12/2001 | Thomeer et al. | 340/854.8 |
| 6,346,813 B1 | 2/2002 | Kleinberg | 324/303 |
| 6,349,834 B1 | 2/2002 | Carr et al. | 209/365.5 |
| 6,356,205 B1 | 3/2002 | Salvo et al. | 340/853.3 |
| 6,412,644 B1 | 7/2002 | Crabbe et al. | 209/309 |
| 6,429,653 B1 | 8/2002 | Kruspe et al. | 324/303 |
| 6,438,495 B1 | 8/2002 | Chau et al. | |
| 6,439,391 B1 | 8/2002 | Seyffert | 209/238 |
| 6,474,143 B1 | 11/2002 | Herod | 73/54.01 |
| 6,484,088 B1 | 11/2002 | Reimer | 701/123 |
| 6,485,640 B2 | 11/2002 | Fout et al. | 210/188 |
| 6,505,682 B2 | 1/2003 | Brockman | 166/250.15 |
| 6,513,664 B1 | 2/2003 | Logan et al. | 209/367 |
| 6,517,733 B1 | 2/2003 | Carlson | 210/785 |
| 6,543,620 B2 | 4/2003 | Allaei | 209/365.1 |
| 6,575,304 B2 | 6/2003 | Cudahy | 209/365.3 |
| 6,581,455 B1 | 6/2003 | Berger et al. | 73/152.55 |
| 6,679,385 B2 | 1/2004 | Suter et al. | 209/367 |
| 6,691,025 B2 | 2/2004 | Reimer | 701/123 |
| 6,715,612 B1 | 4/2004 | Krystof | 209/331 |
| 6,746,602 B2 | 6/2004 | Fout et al. | 210/188 |
| 6,766,254 B1 | 7/2004 | Bradford et al. | 702/9 |
| 6,769,550 B2 | 8/2004 | Burnett et al. | 209/399 |
| 6,783,685 B2 | 8/2004 | Hwang | 210/690 |
| 6,827,223 B2 | 12/2004 | Colgrove et al. | 209/365.3 |
| 6,838,008 B2 | 1/2005 | Fout et al. | 210/780 |
| 6,868,920 B2 | 3/2005 | Hoteit et al. | 175/25 |
| 6,868,972 B2 | 3/2005 | Seyffert et al. | 209/254 |
| 6,873,267 B1 | 3/2005 | Tubel et al. | 340/853.3 |
| 6,892,812 B2 | 5/2005 | Niedermayr et al. | 166/250.15 |
| 6,896,055 B2 | 5/2005 | Koithan | 166/250.15 |
| 6,899,178 B2 | 5/2005 | Tubel | 166/313 |
| 6,938,778 B2 | 9/2005 | Allaei | 209/365.1 |
| 6,953,122 B2 | 10/2005 | Allaei | 209/365.1 |
| 7,303,079 B2 * | 12/2007 | Reid-Robertson et al. | 209/405 |
| 2002/0112888 A1 | 8/2002 | Leuchtenberg | 175/48 |
| 2002/0135112 A1 | 9/2002 | Allaei | 267/136 |
| 2003/0015351 A1 | 1/2003 | Goldman et al. | 175/39 |
| 2003/0220742 A1 | 11/2003 | Niedermayr et al. | 702/9 |
| 2004/0040746 A1 | 3/2004 | Niedermayr et al. | 175/38 |
| 2004/0051650 A1 * | 3/2004 | Gonsoulin et al. | 340/853.1 |
| 2004/0084267 A1 | 5/2004 | Allaei | 188/378 |
| 2004/0103588 A1 | 6/2004 | Allaei | 52/1 |
| 2004/0245688 A1 | 12/2004 | Allaei | 267/136 |

FOREIGN PATENT DOCUMENTS

| | | |
|---|---|---|
| GB | 498523 | 10/1939 |
| GB | 2081026 | 10/1982 |
| WO | WO 98/16328 | 4/1998 |
| WO | WO 02/080043 | 10/2002 |
| WO | WO 96/08301 | 3/2009 |

OTHER PUBLICATIONS

The Derrick LP Sandwich Shaker. Derrick Equip. 6., 1981, 4 pp.
LM-3 Full-Flo Shale Shaker, Sweco Oilfield Services, 1991. 4 pp.
The Advanced Technology Linear Separator Model ATL-1000. Adams et al. Drexel Oilfield Services. STC-03. 1991. 18pp.
Automated Chemical Additive System. Thule Rigtech, Rig Technology Ltd. . 2000 4 pp.
AMS 2000 Description, Thule Rigtech, Rig Technology Td. . 2000. 18 pp.
The Prodigy Series I Dynamic Control Shaker: Fluid Systems. Inc.: 2pp.; Apr. 27, 2004.
LCM—2D I.P Installations And Operation Manual. Brand, A Varco Company. 84 pp. 1998.
King Cobra Series, Installation, Operation, and Maintenance Manual. M12444 R5. Brandt. A Varco Company, 65 pp., 2003.
Mud Equip. Manual—Handbook 3: Shale Shakers. Brandt et al. Gulf Pub. Co., 1982, 18 pp.
Int'l Search Report: PCT/US04/07620: 3 pp.: Mar. 18, 2005.
Written Opinion of Int'l Searching Authority: PCT/US04/07620: 3 pp.: Mar. 18, 2005.
Brandt Automated Shaker Control, Varco. 1 page. 2002.

* cited by examiner

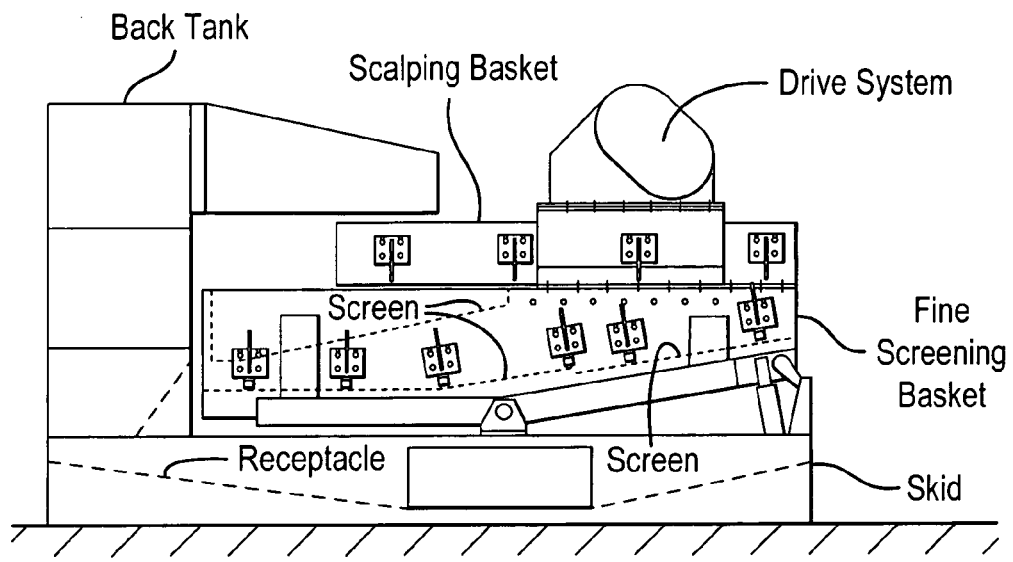
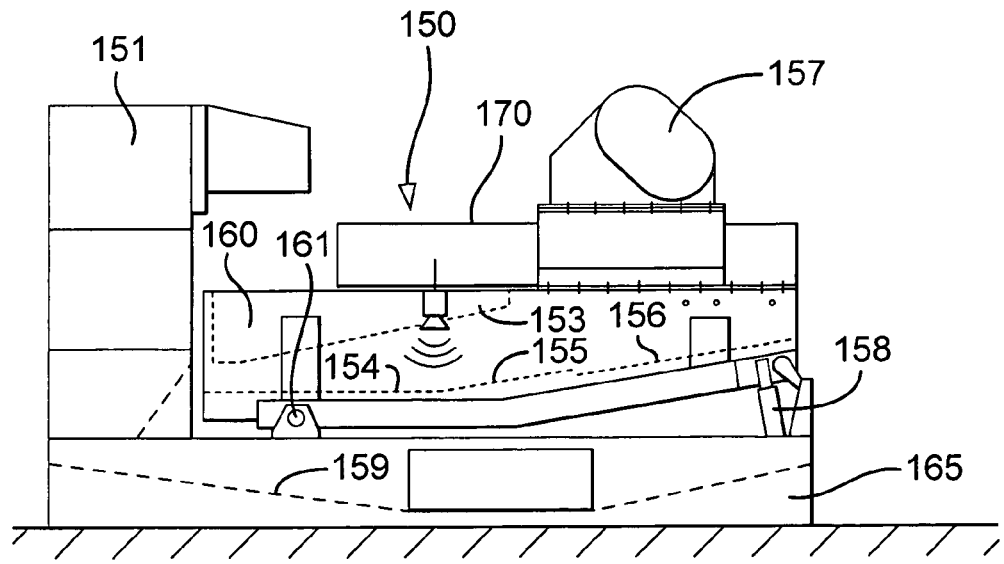

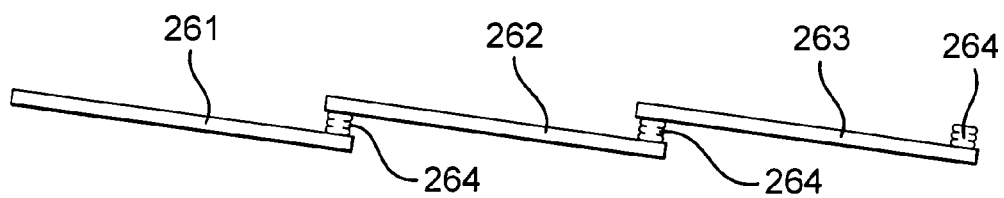
Fig. 7
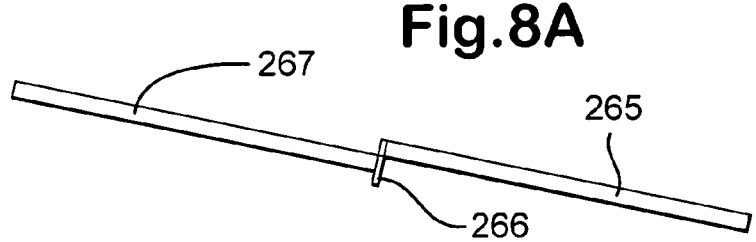
Fig. 8A

Fig. 9
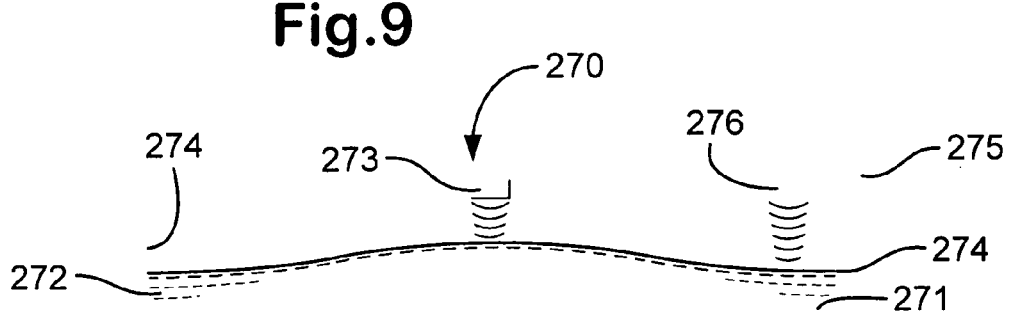

Fig. 20

Current Status of Rigs

| Rigs | Link | Status |
|---|---|---|
| 561 | O | O |
| 562 | O | O |
| 563 | O | O |
| 564 | O | O |
| 565 | O | O |
| 566 | O | O |
| 567 | O | O |
| 568 | O | O |
| 569 | O | O |
| 570 | O | O |
| 571 | O | O |
| 572 | O | O |

○ OK
○ Failed
○ Caution
○ Inconclusive
◉ Rig Stacked

Status of Rig-569

Health Checks

System Health Check Summery Results as on : 9/6/2002

| Joystick | Override | Tunning Changes | BCS | RigSense |
|---|---|---|---|---|
| O | O | O | O | O |

Summary Rig Report for 9/6/2002

Rig Status. At 0648 Mike reported that the rig was drilling ahead. The equipment was working as designed with no problems to report. Encoder Failure Alarm. At 1645 Clarence reported an encoder failure alarm and minor problem with the block surging during reaming. Trend indicated that both Encoders (A&B) were still tracking correctly but was unable to identify any surge evidence. CC called Marcus who was already on his way to the rig. At 0113 Marcus reported that he checked the status on the rig and did not find any encoder failure alarm or block surging issues.

AutoDriller Performance on OTC

| Parameter | %Time Enabled | %Time in Control | Avg. for 24 Hours | %Time Within Acceptable Zone | +/- Target Control Range |
|---|---|---|---|---|---|
| ROP ft/hr | 100 | 28.79 | 102.77 | 90.58 | 10% of SP |
| WOB klbs | 100 | 71.17 | -14.74 | 0.17 | 1 klb |
| Torque | 0 | 0 | | Insignificant Data | 10% of SP |
| Delta-P psi | 0 | 0 | | Insignificant Data | 100 psi |

Driller Adjustable Parameters

| Parameter Name | Current Value | Changed? | Outside Range |
|---|---|---|---|
| Drill Lo Set Point | 0 | | |

Fig.21B

Health Checks on Rig - 569

○ RigSense System

| Details Link | Device Name | Device Status | Operation | Device Message |
|---|---|---|---|---|
| 🔍 | Sensor Group | ○ | | Click on Magnifying Glass for more details — 746 |
| 🔍 | RS AppServer | ○ | | |
| | RS NTTracer | ○ | OK | |
| | RS Client | ○ | OK | |

○ Well Data Net

| Details Link | Device Name | Device Status | Operation | Device Message |
|---|---|---|---|---|
| | Satellite System | ○ | OK | |
| | Data Server | ○ | OK | |
| | Web Application | ○ | Unknown | |

Fig. 22

Varco. *Imagine the Possibilities* e-drill Service Center - PD Company Rigs
*Realize the Efficiencies*

Global  SW-USA  US Rockies  Canada  North Sea  South America    Rig Reports  Config Changes  Historical Data  Log Out

Current Status of Rigs

| Rigs | Link | Status |
|------|------|--------|
| 561  | O    | O      |
| 562  | O    | O      |
| 563  | O    | O      |
| 564  | O    | O      |
| 565  | O    | O      |
| 566  | O    | O      |
| 567  | O    | O      |
| 568  | O    | O      |
| 569  | O    | O      |
| 570  | O    | O      |
| 571  | O    | O      |
| 572  | O    | O      |

704 — RigSense System Statue on Rig - 569     750

○ RigSense System

| Details Link | Device Name | Device Status | Operation | Device Message |
|---|---|---|---|---|
|  | Standpipe pressure sensor | O | Continous loss of signal |  |
|  | Pump 1 stroke count sensor | O | Unknown |  |
|  | Pump 2 stroke count sensor | ○—756 | OK |  |
|  | Pump 3 stroke count sensor | ○—754 | Intermittent loss of signal | 752 |
| 🔍—758 | Hookload sensor |  |  |  |

○ OK
○ Failed
○ Caution
○ Inconclusive
◙ Rig Stacked

Fig. 23

Varco □ *Imagine the Possibilities* e-drill Service Center - PD Company Rigs
*Realize the Efficiencies*

Global   SW-USA   US Rockies   Canada   North Sea   South America   Rig Reports   Config Changes   Historical Data   Log Out Current Status of Rigs

| Rigs | Link | Status |
|---|---|---|
| 561 | O | O |
| 562 | O | O |
| 563 | O | O |
| 564 | O | O |
| 565 | O | O |
| 566 | O | O |
| 567 | O | O |
| 568 | O | O |
| 569 | O | O |
| 570 | O | O |
| 571 | O | O |
| 572 | O | O |

704 — RigSense System Statue on Rig - 569

○ Sensor Group

| Details Link | Device Name | Device Status | Operation | Device Message |
|---|---|---|---|---|
|  | Circuit Board | O | OK |  |
| 760 — | Barrier | O — 762 | SPP sensor - output signal is zero — 764 |  |
|  | AD Converter | O | Keys are sticking (user input) |  |
|  | Junction Box | O | Unknown |  |

— 766

○ OK
○ Failed
○ Caution
○ Inconclusive
▣ Rig Stacked

Driller Adjustable Parameters

| Parameter Name | Current Value | Changed ? | Outside Range ? |
|---|---|---|---|
| Date of Data | 2/22/2002 | | |
| Drill Lo Set Point | 10.5 | | o |
| Lo Set Point | 1.7 | | |
| Upper Set Point | 101 | | o |
| Swab Speed | 355 | | |
| Tripin Surge Speed | 100 | | |
| Stand Lowering Time | 10 | | |
| Casing Surge Speed | 100 | | |
| Joint Lowering Time | 2 | | |
| Connection Lowering Speed | 15 | | |
| Connection Hoist Speed | 20 | | |
| Kickout Height | 87.2 | | |
| Tripout High Alert | 85 | | |
| ROP Set Point | 150 | | |
| WOB Set Point | 40 | | |
| Torque Set Point | 1500 | | |
| DeltaP Set Point | 280 | | |
| Cut & Slip Engine RPM | 700 | | |
| Lines Strung | 10 | | |
| Bail Height | 11 | | |

Driller Tuning Parameters

| Parameter Name | Current Value | Changed ? | Outside Range ? |
|---|---|---|---|
| Date of Data | 2/22/2002 | | |
| Large Piston Drilling Bias | 0 | | |
| Large Piston Tripping Bias | -5 | | |
| ROP Gain Factor-Driller | 0.5 | | |

Fig.24

VICIS-ED Configuration Parameters

Driller Adjustment Parameters

Changed in last 24 Hours ○
Outside Permissable Range ◉
Invalid Data ○

| Parameter Name \ Rig # | 178 | 179 | 180 | 181 | 182 | 183 | 184 | 185 | 186 | 187 | 188 | 189 |
|---|---|---|---|---|---|---|---|---|---|---|---|---|
| Date of Data | 2/22/2002 | 2/22/2002 | 2/22/2002 | 2/22/2002 | 2/22/2002 | No Data | 2/22/2002 | 2/22/2002 | 2/22/2002 | 2/22/2002 | 2/22/2002 | 2/22/2002 |
| Drill Lo Set Point | 9 | 7 | 10.5 ◉ | 9 | 9 | N/A | 9.6 | -1.5 ◉ | 6.5 ◉ | 8.3 | 8.227 ◉ | 11.4 ◉ |
| Lo Set Point | 1 | 1.5 | 1.7 | 0.5 ◉ | 8.996◉ | N/A | 0.1 ◉ | -1.5 ◉ | 1 | 1.6 | 1.3 | 3 ◉ |
| Upper Set Point | 99 ◉ | 100 ◉ | 101 ◉ | 95 ◉ | 96 ◉ | N/A | 90 ◉ | 99 ◉ | 99 ◉ | 99 ◉ | 105.1 ◉ | 95.5 ◉ |
| Swab Speed | 180 | 255 | 355 | 50 | 100 | N/A | 200 | 200 | 30 | 300 | 200 | 30 |
| Tripin Surge Speed | 60 | 160 | 100 | 100 | 50 | N/A | 40 | 200 | 30 | 70 | 200 | 140 |
| Stand Lowering Speed | 25 | 40 | 10 | 60 | 5 | N/A | 100 | 27 | 5 | 20 | 25 | 20 |
| Casing Surge Speed | 20 | 155 | 100 | 30 | 50 | N/A | 10 | 100 | 15 | 25 | 100 | 140 |
| Joint Lowering Time | 12 | 60 | 2 | 40 | 40 | N/A | 90 | 14 | 5 | 5 | 5 | 9 |
| Connection Lowering Speed | 20 | 32 | 15 | 50 | 10 | N/A | 50 | 40 | 20 | 20 | 25 | 50 |
| Connection Hoist Speed | 50 | 45 | 20 | 50 | 50 | N/A | 50 | 40 | 30 | 30 | 50 | 50 |
| Kickout Height | 60 | 60 | 87.2 | 47 | 60 | N/A | 75 | 71.2 | 61 | 65 | 88 | 80 |
| Tripout High Alert | 85 | 85 | 85 | 28 ◉ | 60 | N/A | 75 | 65 | 60 | 65 | 88 | 85 |
| ROP Set Point | 150 | 55 | 150 | 50 | 150 | N/A | 250 | 150 | 21 | 175 | 50 | 70 |
| WOB Set Point | 10 | 40 | 40 | 8 | 11 | N/A | 20 | 112 | 13 | 8 | 15 | 43 |
| Torque Set Point | 650 | 300 | 1500 | 500 | 280 | N/A | 660 | 1500 | 650 | 220 | 400 | 400 |
| DeltaP set Point | 500 | 200 | 280 | 200 | 400 | N/A | 500 | 139 | 500 | 200 | 250 | 200 |
| Cut & Slip Engine RPM | 700 | 715 ◉ | 700 | 700 | 700 | N/A | 700 | 700 | 700 | 700 | 700 | 700 |
| Lines Strung | 10 | 10 | 10 | 10 | 8 | N/A | 10 | 10 | 10 | 10 | 0 | 12 |

| | |
|---|---|
| ⊟ FluidLevel | |
| deadBand | 0.5 |
| desiredValue | 18.862432 |
| fluidLevelError | 0.8398495 |
| fluidLevel_inches | 19.702282 |
| homePosition | 40.0 |
| maxValueFiltered | 25.0 |
| medianDistance | 20.297718 |
| minValueFiltered | 10.0 |
| offSet | 0.0 |
| runningState | FLUID_LEVEL_HIGH |
| validSensorDataPercentage | 100.0 |
| validSensorDataPoints | 50 |
| ⊟ FluidLevelUnfiltered | |
| calibrateCommand | F |
| decoded | T |
| forceEnabled | F |
| forceValue | 0.0 |
| ioIdentifier | 6 |
| ioType | MOD |
| maxRawValue | 32768 |
| maxValue | 40.0 |
| minRawValue | 3277 |
| minValue | 4.0 |
| rawValue | 16628 |

Fig.32B

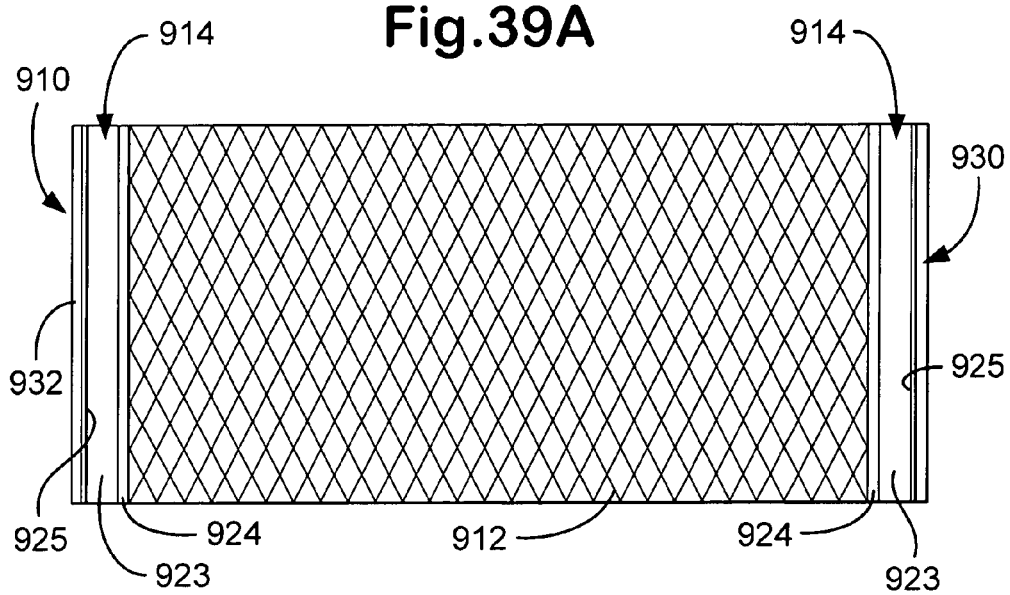
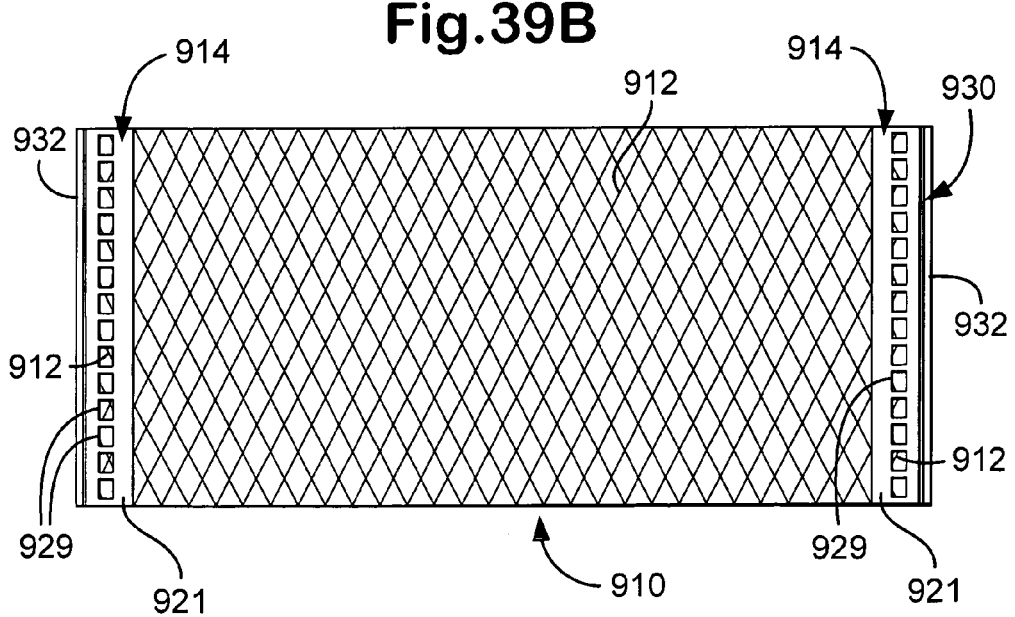

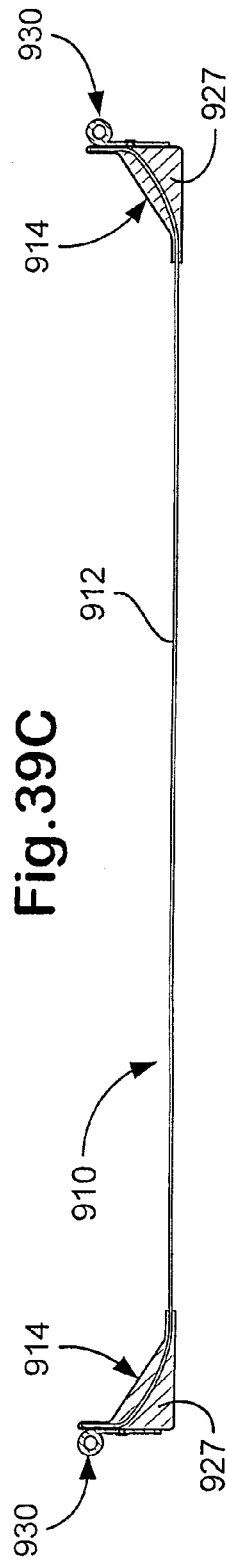
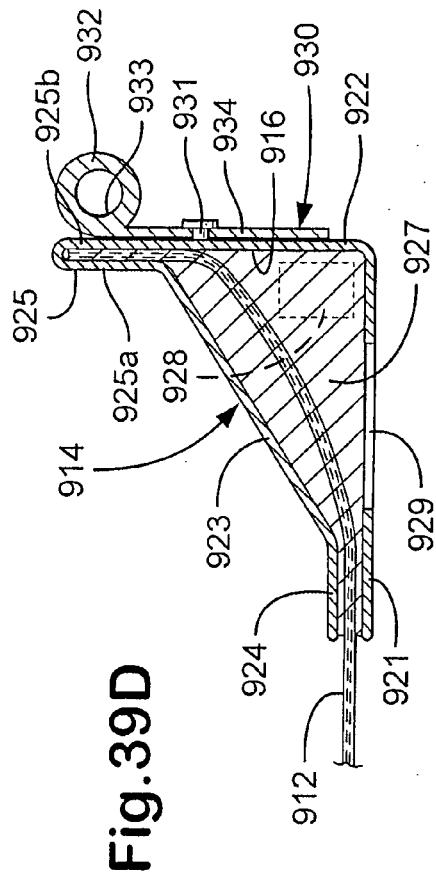
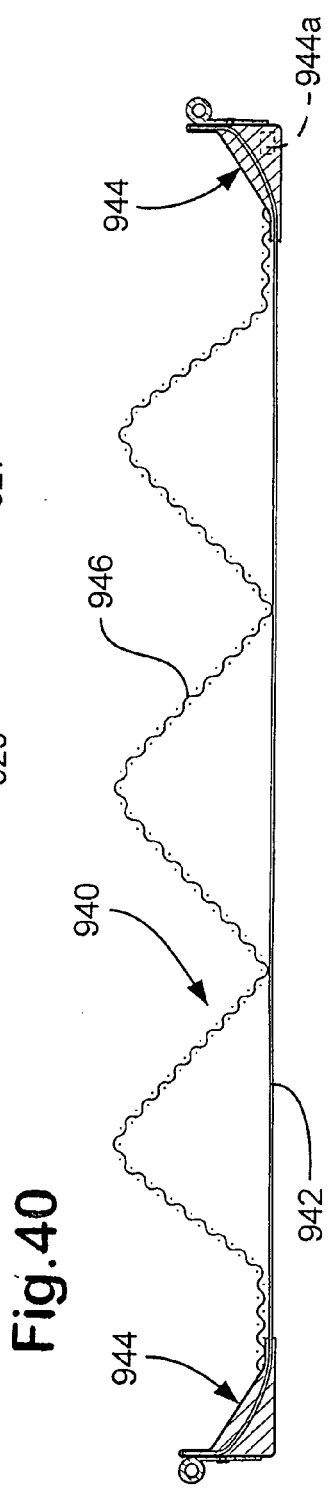
Fig.39C
Fig.39D
Fig.40

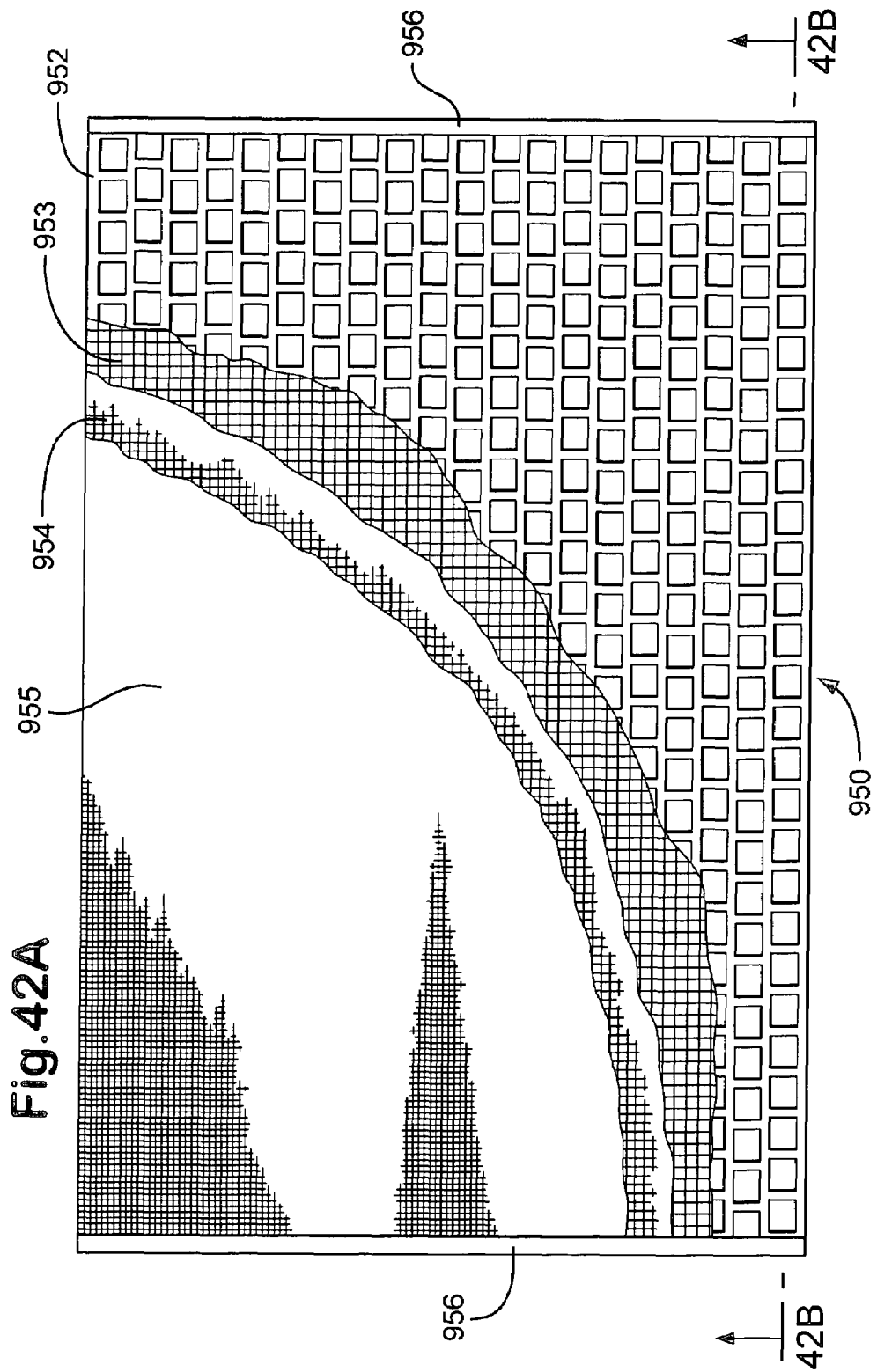

AUTOMATIC SEPARATOR OR SHAKER WITH ELECTROMAGNETIC VIBRATOR APPARATUS

RELATED APPLICATIONS

This is: a continuation-in-part of U.S. application Ser. No. 11/096,192 filed Mar. 31, 2005 which is a continuation-in-part of U.S. application Ser. No. 10/949,882 filed Sep. 25, 2004 now U.S. Pat. No. 7,278,540; a continuation-in-part of U.S. application Ser. No. 10/835,256 filed Apr. 29, 2004 now U.S. Pat. No. 7,331,469; a continuation-in-part of U.S. Ser. No. 10/512,372 filed Oct. 25, 2004 which claims priority from U.S. Ser. No. 10/134,027 filed Apr. 26, 2002 and Application Ser. No. PCT/IB03/01031 filed Mar. 12, 2003; and a continuation-in-part of U.S. Ser. No. 10/373,216 filed Feb. 24, 2003 now U.S. Pat. No. 6,907,375 which claims priority from U.S. Application Ser. No. 60/424,262 filed Nov. 6, 2002—all of which are incorporated fully herein and with respect to all of which the present invention claims priority under the Patent Laws.

BACKGROUND OF THE INVENTION

1. Field of the Invention

This invention is directed to vibratory separators and shale shakers; to such separators and shakers with electromagnetic vibratory apparatuses for use with shakers or separators that separate fluid and/or which employ one or more screens or screen assemblies inclined uphill and/or are generally horizontal; apparatuses and methods for sensing various parameters related to the use of separators and shakers, including, but not limited to, fluid levels in such separators; and to apparatuses and methods for adjusting such levels and for adjusting the extent of a beach area on a screen.

2. Description of Related Art

In many prior art vibratory separators and shale shakers a pool or mass of fluid or material is formed on top of one or more screens or screen assemblies which are used to filter material introduced to the separator or shaker. The depth of this fluid or material can affect efficient operation of the separator or shaker. Fluid or material that is too deep may not be adequately filtered. Fluid or material that is too shallow may flow across a screen too quickly or without sufficient weight to be filtered adequately.

Shale shakers assist in maintaining certain desired properties of drilling fluid by using vibrating screens to remove certain large particles while allowing certain smaller particles to remain in the fluid. The large undesirable particles may include drilling cuttings and debris picked up in the drilling process. The smaller particles may include drilling fluid additives that are required for maintaining desired drilling fluid density and viscosity. The screens on these shakers have a limited life, and can be expensive and time consuming to replace. The shaker is turned off and, preferably, rinsed clean prior to screen replacement.

One factor in screen life is how well the beach area is maintained. "Beach" area is the distance from a fluid-dry interface-with-fluid line on a final screen to the end of the screen. Thus, a zero beach length describes a shaker operating with drilling fluid covering the entire screen area of the final screen and running over to discharge. This can be costly due to the loss of drilling fluid which flows off, rather than through, a screen. A beach length of 20" in certain shakers indicates a shaker operating fairly dry, with the last sections of screen potentially vibrating against completely dry particles. Such dry particles vibrating on the beach of the last screen can tear holes in the screen and shorten the screen life. The beach length is affected by variables such as fluid flow rates and drilling fluid properties including viscosity, density, temperature, and solids content.

In many prior art separators and shakers tilting or raising mechanisms are provided to adjust the angle of screen(s) with respect to the horizontal. For example, a prior art shaker S (shown in FIG. 1) has a tilting mechanism which permits a screen-containing basket to be tilted around a pivot point P up to 5° from the horizontal.

U.S. Pat. No. 4,082,657 discloses a separator apparatus which has individual height adjustable mounting structures for each screen unit which permit adjustment of the screen unit angle with respect to the horizontal.

U.S. Pat. No. 6,575,304 B2 discloses an hydraulic ram apparatus beneath a screen body which is used to adjust the angle of incline of the screen body.

In many prior art systems, a determination of the level of material or fluid on a screen or screen assembly of a separator or shaker is done visually and then adjustments of screen incline angle or of screen support incline angle are done manually.

There has long been a need, recognized by the present inventors, to provide an efficient and accurate measurement of the depth of fluid or material on a screen or screen assembly of a vibratory separator or shale shaker. There has long been a need, recognized by the present inventors, for such separators and shakers with accurate adjustment of such depth based on measurement thereof. There has long been a need, recognized by the present inventors, for a shale shaker or vibratory separator with screen pool depth adjustability to efficiently adjust last-screen beach extent to enhance screen efficiency and to prolong screen life.

SUMMARY OF THE PRESENT INVENTION

The present invention, in certain embodiments, discloses a shale shaker or vibratory separator with a base; a basket or other screen mounting structure movably mounted on the base for supporting screen apparatus for treating material introduced at a first end of the basket into the vibratory separator; a screen, screens, screen assembly, or screen assemblies on the basket either inclined uphill or flat and/or the separator or shaker for separating fluid from an input feed; and at least one electromagnetic vibratory apparatus for vibrating the basket or other structure to vibrate the screen, etc.

The present invention, in certain embodiments, discloses a shale shaker or vibratory separator with a base; a basket movably mounted on the base and for supporting screen apparatus for treating material introduced at a first end of the basket into the vibratory separator, the basket on a base and the first end pivotable with respect thereto, the basket having a second end spaced apart from the first end, material exiting the basket at the second end; vibratory apparatus connected to the basket for vibrating the basket; screen apparatus supported by the basket, the material flowing onto the screen apparatus for treatment; angle adjustment apparatus connected to the basket for adjusting angle of the basket by pivoting the basket's first end; sensor apparatus connected to the vibratory separator for sensing a parameter indicative of basket angle and for providing a signal corresponding to said basket angle; control apparatus for receiving signals from the sensor apparatus and for controlling basket angle based on said signals; and the angle adjustment apparatus including movement apparatus for moving the second end up and down to change basket angle, the movement apparatus controlled by the control apparatus.

The present invention, in certain aspects, discloses a vibratory separator with a base; a basket movably mounted on the base and for supporting screen apparatus for treating material introduced into the vibratory separator, the basket on a base and pivotable with respect thereto; vibratory apparatus connected to the basket for vibrating the basket; screen apparatus supported by the basket, the material flowing onto the screen apparatus for treatment; angle adjustment apparatus connected to the basket for adjusting angle of the basket; sensor apparatus for sensing a parameter indicative of basket angle and for providing a signal corresponding to said basket angle; control apparatus for receiving signals from the sensor apparatus and for controlling basket angle based on said signals; the angle adjustment apparatus including a rocker arm assembly with a first end and a second end, the first end pivotably mounted to the base adjacent and beneath a material input area of the vibratory separator and the second adjacent and beneath a material exit end of the vibratory separator; and the angle adjustment apparatus including movement apparatus with a part thereof in contact with the second end of the rocker arm assembly for moving the second end up and down to change basket angle, the movement apparatus controlled by the control apparatus.

The present invention discloses, in certain embodiments, beach adjustment apparatus for adjusting extent of a beach on a screen of a vibratory separator, the screen mounted to a vibratable basket of the vibratory separator, the beach adjustment apparatus having an end-pivotable basket support for supporting the basket, the end-pivotable basket support pivotable at a pivot end thereof, the end pivotable basket support having a second end spaced-apart from the pivot end, the second end positionable near an exit end of a vibratory separator, apparatus for pivoting the end-pivotable basket support at its pivot end, and the apparatus for pivoting the end-pivotable basket support including movement apparatus for moving the second end of the end-pivotable basket support for facilitating pivoting movement of the end-pivotable basket support to raise and lower the second end to adjust the extent of the beach.

The present invention, in certain embodiments, teaches a vibratory separator (in one particular aspect, a shale shaker) which has sensing apparatus for sensing parameters indicative of the level of fluid or material on a screen or screen assembly supported by the separator and, therefore, for indicating the extent of a beach area on the screen or screen assembly. In one aspect, a screen or screen assembly itself (or a screen on holding structure) is able to be inclined to a desired angle to adjust the extent of a beach area adjacent an exit end of a screen. A beach area is an area adjacent a screen's exit end with two boundary sides—a first side (or rear side) is the side of a pool of material on the screen (analogous to the seashore) and the second side or front side is at or near the exit end of the screen. It is important in some systems to maintain a beach area of desired extent which is sufficiently large so that the pool does not extend to or beyond the screen's exit end—which would result in some material not being treated (filtered, separated) by the screen and simply flowing off the end of the screen. It is also important in some systems to insure that the beach area is not too large which could adversely affect screening efficiency and effectiveness.

In certain aspects, such a separator also has adjustment apparatus (powered electrically, hydraulically, or pneumatically) for receiving information from one or more sensing apparatuses regarding distance to fluid or material at a certain location on a screen or screen assembly (which corresponds to pool depth at the location) and for then adjusting incline angle of the screen or screen assembly to adjust and maintain the extent of a beach area adjacent an exit end of a screen.

In certain aspects, any suitable basket pivot point is used from a basket center to a basket end. In one particular aspect a basket for supporting a screen or screen assembly is positioned and configured so that it pivots at a pivot point relatively near one of its ends; and, in one particular aspect, such a pivot is beneath a rear line which is the rear boundary of a desired beach area ("rear" meaning the beach boundary farthest away from the exit end of a screen).

The present invention, in certain aspects, discloses a shale shaker or vibratory separator with a screen support or basket for supporting screen apparatus for treating material introduced into the vibratory separator, the basket on a base and pivotable with respect thereto; vibratory apparatus connected to the basket for vibrating the basket; screen apparatus supported by the basket, the material flowing onto the screen apparatus and forming a pool on the screen apparatus, and a beach on the screen apparatus adjacent the pool; measurement sensor apparatus connected to the vibratory separator and positioned above the screen apparatus for measuring a distance from the measurement sensor apparatus to a top surface of the pool, the measurement sensor apparatus including a signal production portion for producing signals indicative of said distance and for transmitting said signals; a control system for controlling and in communication with the measurement sensor apparatus for receiving signals from the measurement sensor apparatus indicative of said distance and for processing said signals to calculate a pool depth corresponding to said distance, said pool depth related to a location of an edge of said pool adjacent said beach; and angle adjustment apparatus connected to the basket and controlled by the control system for adjusting angle of the basket, thereby adjusting extent of the beach.

In one particular aspect, a shale shaker according to the present invention consists of a vibrating basket which supports multiple screens. Drilling fluid is directed to flow over the screens from a weir tank. As fluid flows over the screens, drilling fluid and smaller particles pass through the screens and are returned to the drilling fluid system. The larger particles and pieces remain on top of the screens, and vibratory action moves them off an end of the shaker. Within the shaker, the angle at which the basket sits can be changed to maintain the desired beach area. One or more ultrasonic transducer sensor measuring apparatuses mounted above a screen or screens, (in one aspect above the last screen) measures the fluid level on screen(s) or on the last screen. In one particular aspect a single sensor is used above the pool above a last screen which is a pool area that is less turbulent than previous screen areas and, in one aspect, a basket pivot point is located beneath a beach's rear line so that the single sensor provides all needed information to adjust beach extent as desired. The level of the fluid on the screen(s) is related to the rear or inner beach boundary. A signal from the sensor(s) indicative of sensor-to-pool-surface distance is sent to a control system, e.g. a computerized control system, a programmable logic controlled control system, a digital signal processor and/or a microprocessor based control system which interprets the signal and sends a control signal to a height adjustment apparatus, e.g., but not limited to, a system with a directional control valve which controls pressurized hydraulic fluid flow to pistons attached via linkages between the shaker base and basket and/or any basket raising apparatus (mechanical, pneumatic, or hydraulic; e.g. but not limited to hydraulically-powered piston/cylinder apparatuses) of the prior art. In certain aspects, multiple distance measurements are made and the controller is programmed to average the measurements.

As the basket is raised or lowered, the basket angle changes. When the beach width is too long, the height adjustment apparatus decreases the angle of the basket, and when the beach width is too short, the angle of the basket is increased. Thus, the desired beach extent is automatically maintained. A desired sensor-to-pool-surface distance, and thus a desired beach width can be programmed into the control system for a particular separator, shaker, screen, or screen assembly.

In one particular aspect a power system for providing hydraulic fluid under pressure to apparatus for raising and lowering a basket uses double rod hydraulic cylinders so that dual apparatuses on two sides of a basket operate in unison. One or more sensors may be connected to or over a basket, to a rear tank, to a skid or base, or to a motor tube or mount. In one aspect a fluid reservoir (hydraulic fluid or gas) and/or fluid pump apparatus is part of a vibratory separator system or part of a shale shaker. In one particular aspect, a skid, base, or support of a shaker or part of a shaker supports a fluid reservoir; and pump apparatus on the shaker provides fluid to height adjustment apparatus.

In certain aspects a fluid flow sensor is employed on a vibratory separator or shale shaker which gives an indication when the flow of material ceases so that a basket end near a material input point can be lowered so that upon recommencement of the material flow the basket angle is such that material does not flow off a last screen's exit end without being treated.

In certain aspects the present invention provides a vibratory separator (e.g. but not limited to a shale shaker) with a basket for supporting screen apparatus for treating material introduced into the vibratory separator, the basket on a base and pivotable with respect thereto; vibratory apparatus connected to the basket for vibrating the basket and the screen apparatus in the basket; screen apparatus supported by the basket, the material flowing onto the screen apparatus and forming a pool on the screen apparatus, and a beach formed on the screen apparatus adjacent the pool; measurement sensor apparatus connected to the vibratory separator and positioned above the screen apparatus for measuring a distance from the measurement sensor apparatus to a top surface of the pool, the measurement sensor apparatus including a signal production portion for producing signals indicative of said distance and for transmitting said signals; a control system for controlling and in communication with the measurement sensor apparatus for receiving signals from the measurement sensor apparatus indicative of said distance and for processing said signals to calculate a pool depth corresponding to said distance, said pool depth related to a location of an edge of said pool adjacent said beach; and angle adjustment apparatus connected to the basket and controlled by the control system for adjusting angle of the basket, thereby adjusting extent of the beach.

What follows are some of, but not all, the objects of this invention. In addition to the specific objects stated below for at least certain preferred embodiments of the invention, there are other objects and purposes which will be readily apparent to one of skill in this art who has the benefit of this invention's teachings and disclosures. It is, therefore, an object of at least certain preferred embodiments of the present invention to provide new, unique, useful, and nonobvious systems and methods of their use—all of which are not anticipated by, rendered obvious by, suggested by, or even implied by any of the prior art, either alone or in any possible legal combination; and it is, therefore, an object of at least certain preferred embodiments of the present invention to provide:

New, useful, unique, efficient, non-obvious vibratory separators and shale shakers and methods of their use and such separators and shakers with electromagnetic vibratory apparatus for vibrating a screen, screens, screen assembly, or screen assemblies in the separator or shaker;

Such separators and shakers with one or more energizable identification apparatuses or devices (e.g., but not limited to, SAW's and/or RFIDT's) in or on the shaker, separator, parts thereof, screen(s), and/or vibration apparatus(es);

Such separators and shakers with one or more sensing apparatuses for sensing parameters indicative of the depth of fluid or material on screen(s) or screen assemblies supported by the separator or shaker, which depth is related to the extent of a beach area on the screen(s) or screen assemblies;

Such separators or shakers with a screen support which is pivotable at or near one of its ends for screen inclination angle adjustment thereby adjusting beach area;

Such separators or shakers with adjustment apparatus for adjusting screen inclination angle based on information received from the sensing apparatus or apparatuses;

Such separators or shakers with sensor(s) to sense sensor-to-pool-surface distance on screen(s) and to automatically adjust said distance to maintain a desired beach extent on a screen; and, in one aspect, on a last or material-exit screen; and, in one aspect, a single sensor which, in certain embodiments, is located above a basket pivot point;

Such separators or shakers with material flow sensing apparatus so that basket angle can be adjusted and readjusted depending on the material flow status; and New, useful, unique, efficient, non-obvious beach adjustment apparatus for adjusting beach extent on a screen of a vibratory separator or shake shaker.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

The Abstract that is part hereof is to enable the U.S. Patent and Trademark Office and the public generally, and scientists, engineers, researchers, and practitioners in the art who are not familiar with patent terms or legal terms of phraseology to determine quickly from a cursory inspection or review the nature and general area of the disclosure of this invention. The Abstract is neither intended to define the invention, which is done by the claims, nor is it intended to be limiting of the scope of the invention in any way.

It will be understood that the various embodiments of the present invention may include one, some, or all of the disclosed, described, and/or enumerated improvements and/or technical advantages and/or elements in claims to this invention.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or equivalent embodiments.

FIG. 5A is a schematic view of a prior art shale shaker.

FIG. 5B is a side schematic view of a system according to the present invention.

FIG. 7 is a side schematic view of screen assemblies according to the present invention.

FIG. 8A is a side schematic view of a screen assembly according to the present invention.

FIG. 9 is an end view of a system according to the present invention.

FIG. 20 is an illustration of a preferred status display for an oil recovery system showing status for individual rigs and panel results showing text descriptions and color-coded status for a single oil rig.

FIG. 21B is an illustration of an alternative status display for an oil recovery system and a sub status for an individual rig.

FIG. 22 is an illustration of a preferred status display for an oil recovery system and a lower level sub status for an individual rig.

FIG. 23 is an illustration of a preferred status display for an oil recovery system and a lower level sub status for an individual rig.

FIG. 24 is an alternative tabular status display for an oil recovery system.

FIG. 25 is an alternative tabular status display for an oil recovery system.

FIG. 32B is a screen display for a system according to the present invention.

FIG. 39A is a top view of a screen assembly according to the present invention.

FIG. 39B is a top view of a screen assembly according to the present invention.

FIG. 39C is an end view of the screen assembly of FIG. 39B.

FIG. 39D is an enlargement of part of the screen assembly shown in FIG. 39C.

FIG. 40 is an end view of a screen assembly according to the present invention.

FIG. 42A is a top view of a screen assembly according to the present invention.

DESCRIPTION OF EMBODIMENTS PREFERRED AT THE TIME OF FILING FOR THIS PATENT

Figure 1:
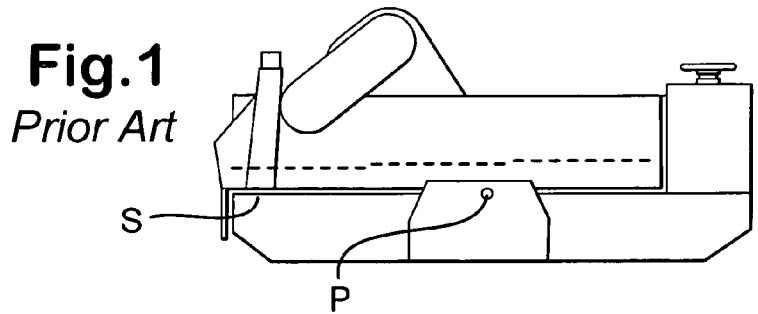
FIG. 1 is a schematic side view of a prior art shale shaker.
Figure 2A:
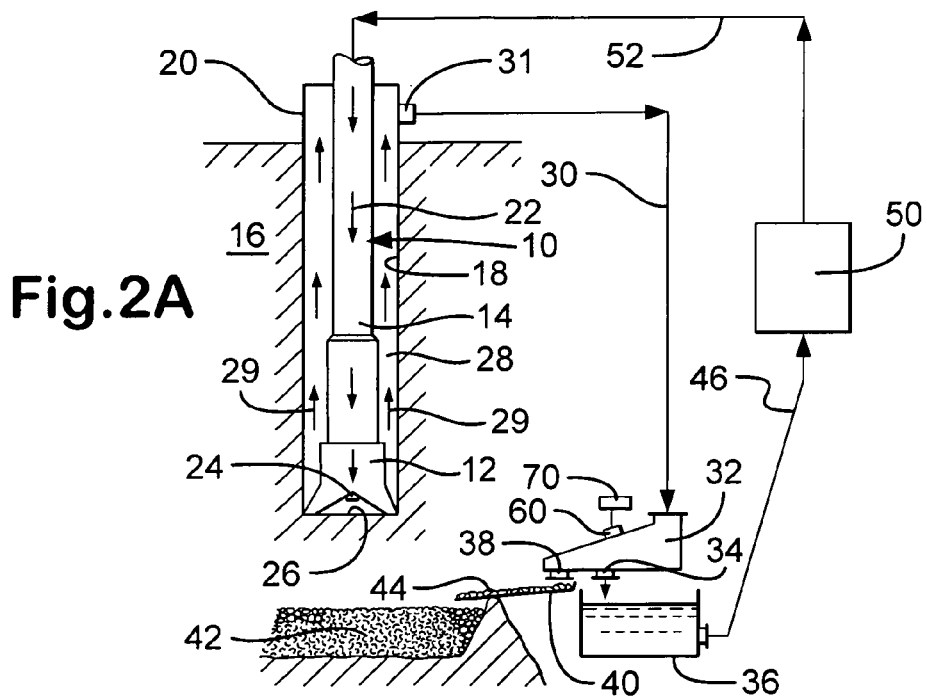
FIG. 2A is a schematic view of a system according to the present invention.
Figure 2B:
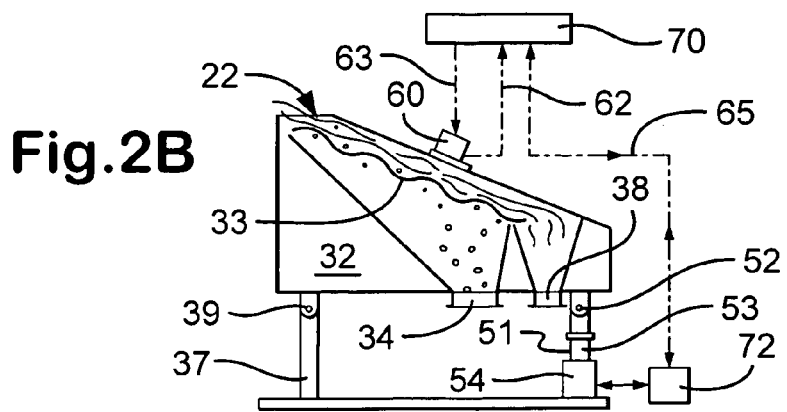
FIG. 2B is a schematic side view of shale shaker apparatus of the system of FIG. 2A.

Referring now to FIGS. 2A and 2B, a drilling system 10 according to the present invention includes a rotary bit 12 attached to the lower end of a length of hollow drill pipe 14 suspended from a drilling derrick (not shown).

The drill pipe 14 and attached drill bit 12 are rotated to cut into the subsurface formation 16 to form a wellbore 18. The drill pipe 14 passes through a wellhead assembly 20 located at the surface. The wellhead assembly 20 controls flow of drilling fluid into the well. During the drilling of the well, a drilling fluid 22 commonly referred to as drilling mud is pumped down the interior of the hollow drill pipe 14. The drilling mud exits jets such as jet 24 in drill bit 12 and impinges upon a bottom 26 of the well bore 18. The drilling fluid exiting the jets 24 flushes away from the bottom 26 of the wellbore 18 the cuttings or particles generated as the drill bit 12 cuts into the earthen formation 16. A stream of drilling mud 22 then carries the cuttings and particles upward through a well annulus 28 (arrows 29) to the wellhead 20. The drilling mud 22 with the particles and cuttings carried or suspended therein, exits the wellhead 20 at outlet 31 and passes through a conduit 30 to a shaker system according to the present invention which includes a shale shaker 32.

In the shaker 32, the drilling mud and particles are deposited upon one or more screens which are vibrated so that the larger particles are sifted out of the drilling mud and carried off the top of the screen(s).

A liquid portion of the drilling mud along with very fine suspended particles exits a first shaker outlet 34 and is received in a mud pit 36.

Larger particles 44 which are sifted out of the stream of drilling mud exit a second shaker outlet or trough 38 and are conveyed on a conveyor or slide 40 for deposit into a reserve pit 42 or into storage tanks for haulage to another location. The drilling mud is pumped from the mud pit 36 through a line 46 by a mud pump 50. The mud pump 50 then pumps the mud through a discharge line 52 which returns it to the interior bore of drill pipe 14.

As shown in FIGS. 2A and 2B the shale shaker 32 has a fluid level sensing apparatus 60 which is in communication with a control apparatus 70. The sensing apparatus 60 senses a distance to a top surface of the drilling mud 22 on a screen 33 of the shaker 32, which is indicative of mud depth. Via a signal transmission line 62 (or multiple such lines if needed) the sensing apparatus sends a signal to the computer apparatus 70 indicative of this distance. The apparatus 70 controls the sensing apparatus 60 via a line 63 (or multiple such lines if needed).

The shale shaker 32 (or a screen supporting basket thereof) is supported by a first support 37 which has a pivotal connection 39 and by a second support 51 which has a pivotal connection 52 and a movable post 53 which is selectively movable up and down by moving apparatus 54 to pivot the shale shaker 32 (or its basket alone) on the pivotal connection 39 to affect the angle of the shaker or basket 32, the depth of drilling fluid beneath the sensing apparatus 60, and the extent of a beach area on the screen 33. Via a line 65 the computer apparatus 70 controls a control apparatus 72 that selectively operates the moving apparatus 54 (which may be pneumatically, hydraulically or electrically powered as may be any such apparatus or height adjustment apparatus of any system according to the present invention).

The sensing apparatus 60 may be (and as may be the case for any sensor of any system disclosed herein) any suitable known level and/or distance sensing apparatus including, but not limited to, the following types: electrical, optical, electromagnetic, ultrasonic, acoustic, and pulse-echo, and may be like the level sensing systems disclosed in U.S. Pat. Nos. 6,691,025 B2; 5,793,705; 5,319,972; 6,484,088 B1; 6,062,070; and 5,131,271 (all said patents incorporated fully herein for all purposes) and the systems referenced, referred to or mentioned in these patents. The apparatus 70 may be (and as may be for any system disclosed herein) any suitable computer, computers, computer system, microprocessor-based system and/or programmable logic controller(s).

Figure 3:
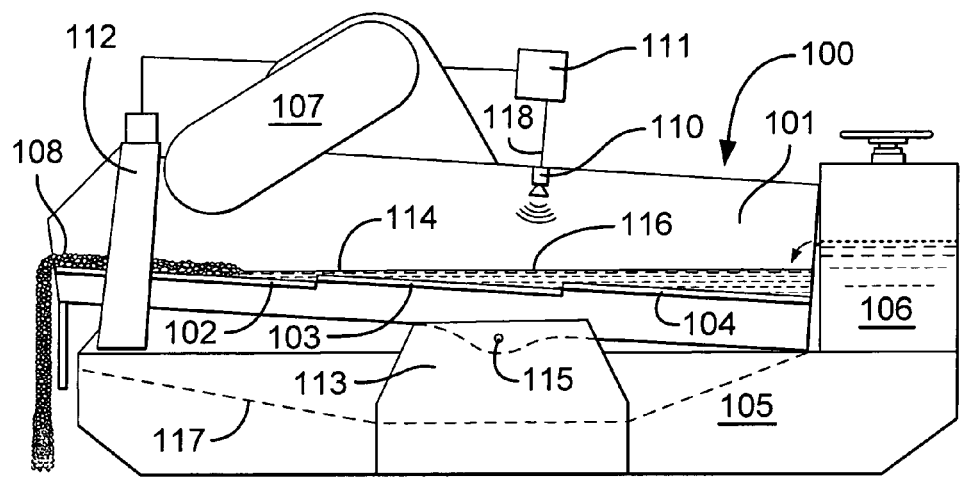
FIG. 3 is a side schematic view of a system according to the present invention.

FIG. 3 shows a shale shaker 100 according to the present invention which has a basket 101 vibrated by interconnected vibrating apparatus 107. The basket 101 supports three screens 102, 103, 104 for treating material introduced onto screen 104 from a tank 106.

An ultrasonic level sensor 110 is connected to the basket 101 and selectively senses the distance to, and, therefore the level of the material 114 (e.g., drilling fluid with solids entrained therein) at a location 116 above the screen 103. A control apparatus 111 controls the sensor 110 via a cable 118 and also, via the cable 118, the sensor 110 sends signals to the control apparatus 111 indicative of a measurement of the level at the location 116. In one aspect the control apparatus 111 includes suitable apparatus (e.g. like the apparatus 70 described above) which calculates the depth at the location 116 and, based on suitable programming in suitable programming media in the control apparatus 111, adjusts the inclination of the basket 101 using adjustment apparatus 112 so that the depth at the location 116 is maintained at a desired level.

In one aspect the basket 101 is pivotally connected to a support 113 at a pivot point 115. The support 113 is secured to a base 105, as is the tank 106 and adjustment apparatus 112. Fluid and/or solid material flowing through the screens 102-104 flows down into a receptacle 117. Separated material 108 flows off an exit end of the last screen 102.

Figure 4:
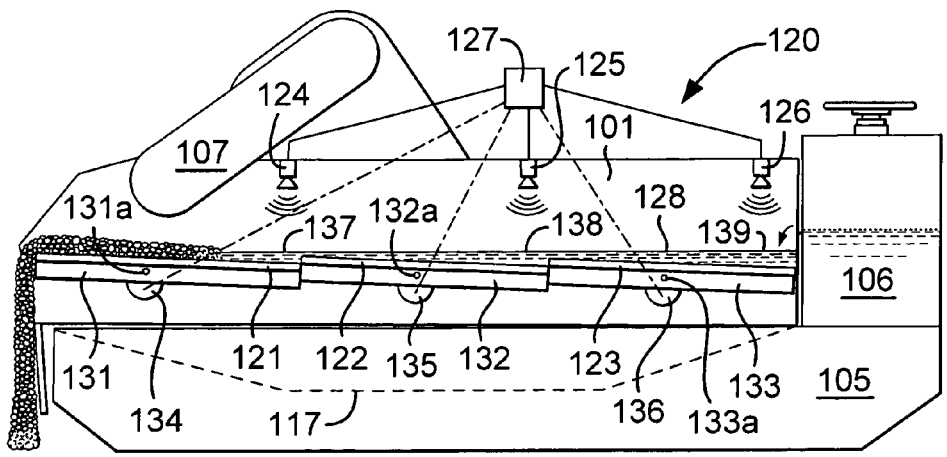
FIG. 4 is a side schematic view of a system according to the present invention.

FIG. 4 shows a shale shaker 120 according to the present invention similar to the shale shaker 100, FIG. 3 (and like numerals indicate like parts); but the shale shaker 120 has individual tilting mechanisms 131, 132, 133 (each with a respective pivot point 131a, 132a, 133a) each beneath a respective screen 121, 122, 123. Levels of drilling fluid 128 at various locations on the screens 121-123 can be adjusted by selectively changing the inclination of the screens 121-123. Control apparatuses 134-136 correspond, respectively, to the mechanisms 131-133. A control system 127 with suitable control apparatus (e.g. like the apparatus 70, FIG. 2B) communicates with the control apparatuses 131-133 and also with individual level sensors 124, 125, and 126. Each sensor 124-126 senses the level of drilling fluid 128 at, respectively, locations 137, 138 and 139. The control apparatus in one aspect is pre-programmed to maintain the drilling fluid levels at locations 137-139 at predetermined levels by monitoring the levels with the sensors 124-126 and adjusting the depths at those locations by pivoting the screens 121-123 by pivoting the individual tilting mechanisms 131-133. Any one or any two of the sensors 124-126 may be deleted and the corresponding tilting mechanism(s) and associated control(s) may be deleted.

FIG. 5A shows a prior art shale shaker with a pivot point at or near a mid-point of a shaker basket ("fine screening basket"). FIG. 5B shows a shale shaker 150 according to the present invention which has a basket pivot point 161 at or near one end of a basket 160. The shaker 150 has a back tank 151 from which material to be treated flows into a scalping basket 170 which removes massive and/or gross size pieces and particles and from which material then flows down onto screens 153-156. Height adjustment apparatus 158 (controlled as is any adjustment apparatus disclosed herein) selectively pivots the basket 160 about the point 161. Vibrating apparatus 157 vibrates the basket 160. Material passing through the screens flows into a receptacle 159 on a skid 165.

Figure 6:
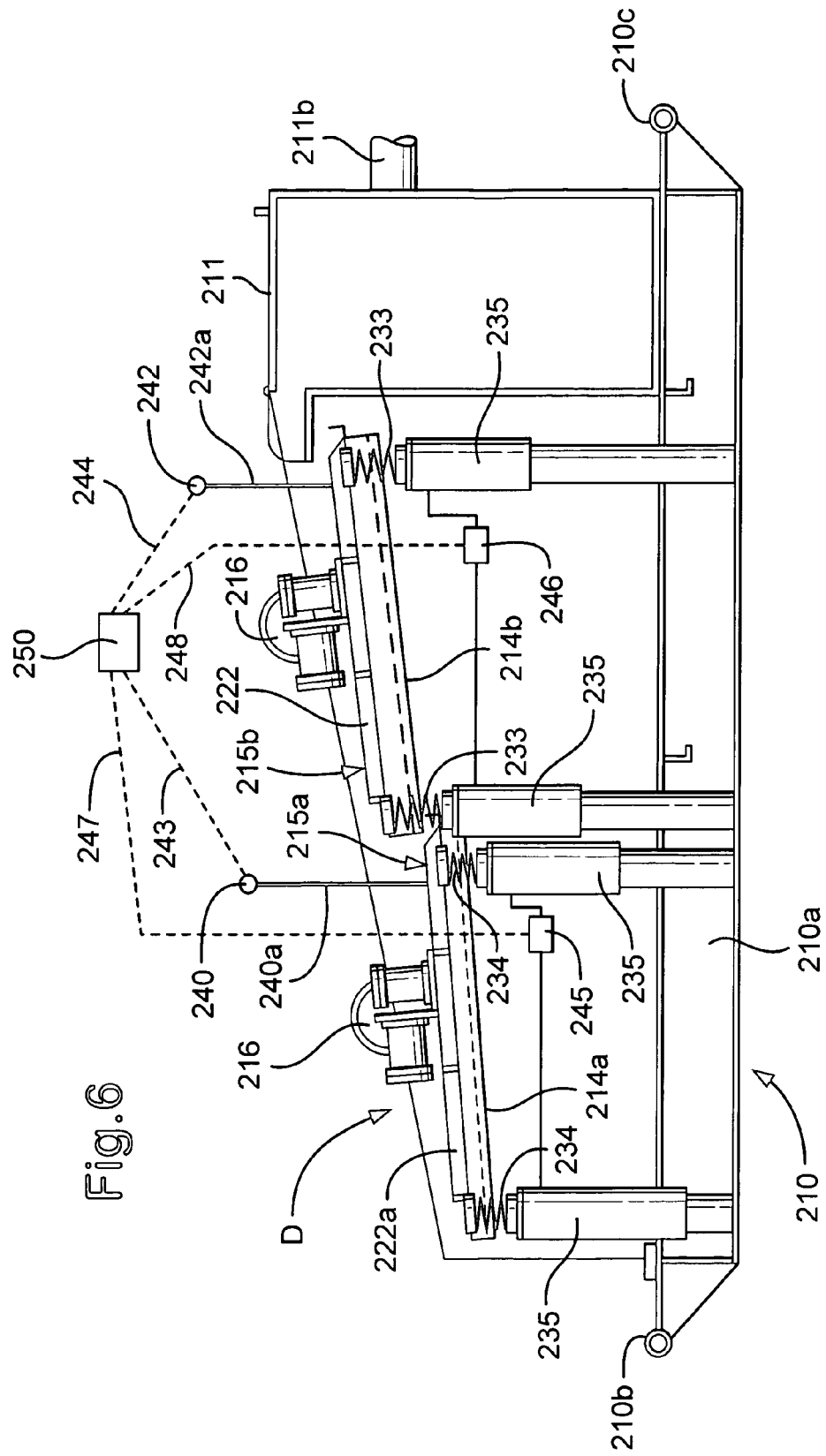
FIG. 6 is a side schematic view of a system according to the present invention.

In one aspect the present invention provides a separator like that disclosed in U.S. Pat. No. 4,082,657 (incorporated fully herein for all purposes); but with improvements according to the present invention. As shown in FIG. 6 a separating device D according to the present invention for separating particulate from a fluid stream includes a frame 210 having mounted thereon an inlet tank 211 for receiving a fluid to be filtered or cleaned. Screen units 214a and 214b are mounted in cascaded alignment on the frame 210 by vibration mount means generally designated as 215a and 215b which each includes a vibrating means 216 mounted therewith for vibrating screen units 214a and 214b simultaneously.

The frame 210 includes first and second side members 210a (only one is illustrated) which are connected together by a front end connecting rod 210b and a rear connecting rod 210c. The front and rear connecting rods 210b and 210c cooperate with the side members such as 210a to provide a generally rectangular form having an opening therethrough through which the cleaned fluid stream may pass to a recovery area positioned therebelow. The side frame members such as 210a may be I-beams or other suitable frame members for supporting the structure to be disclosed here.

The inlet tank 211 has connected therewith an inlet line 211b for receiving the fluids to be cleaned. In one aspect the screen unit 214a and 214b includes a metal frame with screening material thereon.

The screen units are releasably mounted in screen unit mounting assembly supports 222 and 222a.

Each screen unit is supported by four adjustable posts 235 (two shown on each side of each screen; e.g. as described in U.S. Pat. No. 4,082,657). Optionally, interposed between the screen units' supports 222, 222a are spring mechanisms 233 and 234. Vibratory apparatuses 216 vibrate the screen units.

A sensor 240 on a support 240a senses the depth of fluid on the screen unit 214a and a sensor 242 on a support 242a senses the depth of fluid on the screen unit 214b. A control apparatus 250 (like any disclosed herein) is in signal communication with the sensors 240, 242 via cables 243, 244. The control apparatus 250 is also in communication via cables 247, 248 with control apparatuses 245, 246 which control the height-adjustable posts 235. The control apparatuses 250, 245, 246 may be like any control apparatus and/or computer apparatus described above.

FIG. 7 shows three screen assemblies 261, 262, 263 according to the present invention which may be used in any system according to the present invention in which screen assemblies, screens, or individual screen supports are tilted or moved to adjust fluid depth at a location on a screen assembly or screen. Each screen assembly 261-263 has an expandable member 264 (e.g., but not limited to, an expandable bellows or seal) which insures that sealing contact is maintained between adjacent screen assemblies (or between a screen assembly end and a member on a basket against which a screen assembly end abuts). In one aspect as shown the expandable members 264 are bellows seals; but it is within the scope of this invention for any suitable seal or sealing material to be used which can expand and contract sufficiently to maintain a seal between adjacent screens.

Figure 8B:
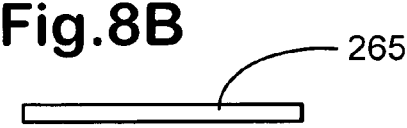
FIG. 8B is an end view of a screen assembly of FIG. 8A.
Figure 8C:
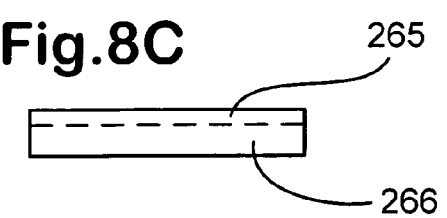
FIG. 8C is an end view of a screen assembly of FIG. 8A.

FIGS. 8A-8C illustrate a screen assembly 265 according to the present invention which has a flexible end seal 266 which seals against an end of an adjacent screen 267. The seal 266 is sufficiently wide that it will seal against the end of the screen assembly 267 when the inclination of the screen assembly 267 is changed (and/or when the inclination of the screen assembly 265 is changed) e.g. in response to a signal from a fluid level sensor above either or both screen assemblies 265, 267. Optionally, the screen assembly 267 may also have an end seal 264.

FIG. 9 shows a vibratory separator 270 according to the present invention with walls 274 and a screen assembly 271 in a crowned configuration with fluid 272 to be treated thereon. A fluid level sensor 273 connected to a wall 274 of the separator 270 with a connector 275 senses fluid level near a center point of the screen assembly 271 (as viewed in FIG. 9). A fluid level sensor 276 senses fluid level near the wall 274. It is within the scope of the present invention to locate one or more fluid sensors at any point above a screen assembly in a vibratory separator or shaker. Optionally, either sensor 273 or 276 may be deleted.

FIGS. 10A-10D show a shale shaker 300 according to the present invention which is like a King Cobra Shale Shaker commercially available from Varco International, Inc., but which has improvements according to the present invention. The shale shaker 300 has a skid or base 302 on which is a basket 306 which is vibrated by vibration apparatus 304. From a weir tank 308 fluid, e.g. drilling fluid with drilled cuttings and debris therein, flows onto a first screen 310 which is supported by a screen support 310a connected to the basket 306. Part of the fluid then flows onto a second screen 311 supported by a screen support 311a connected to the basket 306 and then part of the fluid flows onto a last screen 312 supported by a screen support 312a connected to the basket 306. Part of the fluid flows off an exit end 312b of the screen 312 onto an optional lower screen 313 which is supported by a screen support 313a connected to the basket 306.

The fluid forms a pool 315 above the screens 310-312. Depending on the fluid, on the fluid viscosity, on the fluid's solids content, on the rate of fluid flow, and the through-put of the screens, a beach 316 is created at the exit end 312b of the screen 312. It is desirable to optimize the extent of this beach 316 and, in certain aspects, it is preferred that the beach, as viewed in FIG. 10B, be sufficiently large that no fluid flows untreated off the last screen 312.

An ultrasonic transducer sensor measurement apparatus 320 is connected to the basket 306 (e.g. to a motor tube 309 and/or such a sensor apparatus 320b is connected to a weir tank 308) and is, optionally, positioned above the pool 315, e.g. over an entry end 310b of the screen 310 or over an entry end 312c of the screen 312. Such locations for the apparatus 320 provide measurement at locations providing the greatest range of pool depth and therefore, the greatest range for adjusting beach extent; i.e., such a location insures that the apparatuses 320a and/or 320b will have a sensor-to-pool-surface distance to measure since in most cases there will be fluid at some depth at this point beneath the apparatus or apparatuses 320. The apparatuses 320a and/or 320b are in communication with a control apparatus 330. The sensor apparatuses generates a signal indicative of sensor-to-pool distance which indicates depth of the pool 315 beneath the sensor apparatus(es). Optionally, either the sensor 320a or the sensor 320b is deleted.

The control apparatus 330 (e.g. a computer, PLC, PID controller, or other device with programmable media) selectively controls a control valve 336 which allows hydraulic fluid under pressure from a reservoir 338 pumped by an hydraulic pump 337 to move to and from two hydraulic cylinder apparatuses (one shown, FIG. 10A) which are on opposite sides of the shaker 300. A flow control valve 332 controls the flow of fluid into/out of the pistons and adjusts the rate of stroke in the cylinder apparatuses 333, 334 and a flow control valve 335 limits the flow of fluid to/from the pistons and adjusts the rate of stroke out of the cylinder apparatuses 333, 334. An hydraulic cylinder apparatus 350 has an extendable piston 351 pivotably connected to a pivot plate 353 at a pivot point 365. The plate 353 is pivotably connected at a pivot point 357 to the basket 306. A housing 350 of the apparatus 334 is secured to a mount 359 which is pivotably connected to the basket 306. A link 355 is pivotably connected to the plate 353 at a pivot point 366 and the link 355 is connected to a link 356 that is pivotably connected at a pivot point 354 to a basket support 340. The basket support 340 is supported by the hydraulic cylinder apparatuses and by bases 341. Shafts 367 of the basket supports 340 are pivotably mounted on the bases 341. A scale 339 indicates the angle of the support 340 with respect to horizontal (i.e. assuming the skid or base 302 is level). The support 340 is connected to springs 346, 343 which support basket mounts 345 and 342, respectively; and similar springs and mounts are on the other side of the basket.

In another aspect the plate 365 is deleted and the hydraulic cylinder apparatuses are oriented almost vertically and the hydraulic cylinder apparatuses' pistons 351 are pivotably connected to the basket support 340 for selectively raising and lowering it to adjust beach extent.

Figure 10A:
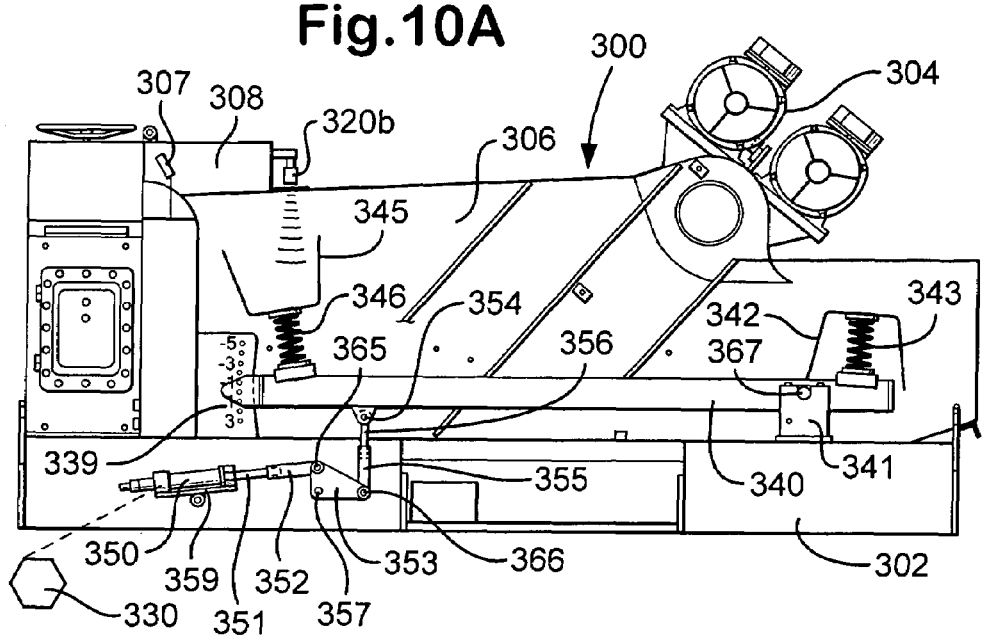
FIG. 10A is a side view of a shale shaker according to the present invention.
Figure 10B:
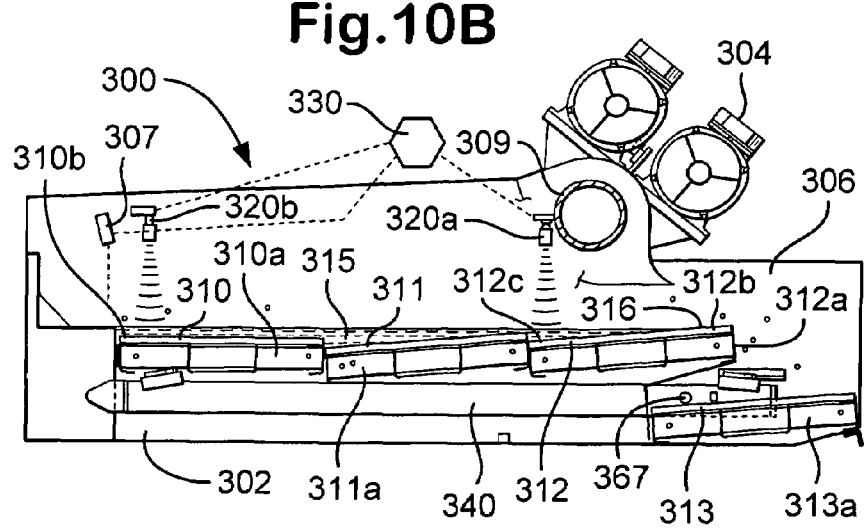
FIG. 10B is a side cross-section view of the shaker of FIG. 10A.
Figure 10C:
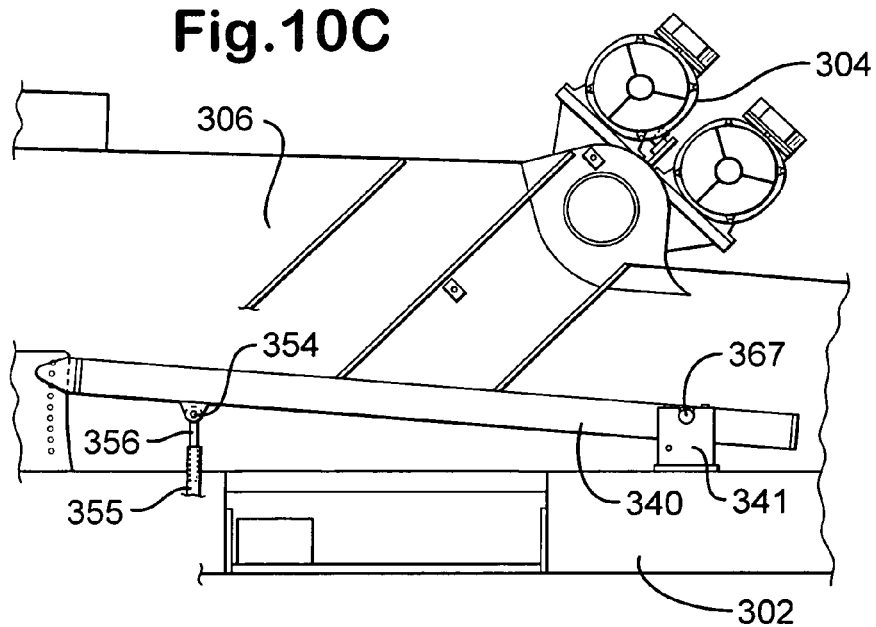
FIG. 10C is a side cross-section view which shows the shaker of FIG. 10A with its basket tilted.
Figure 10D:
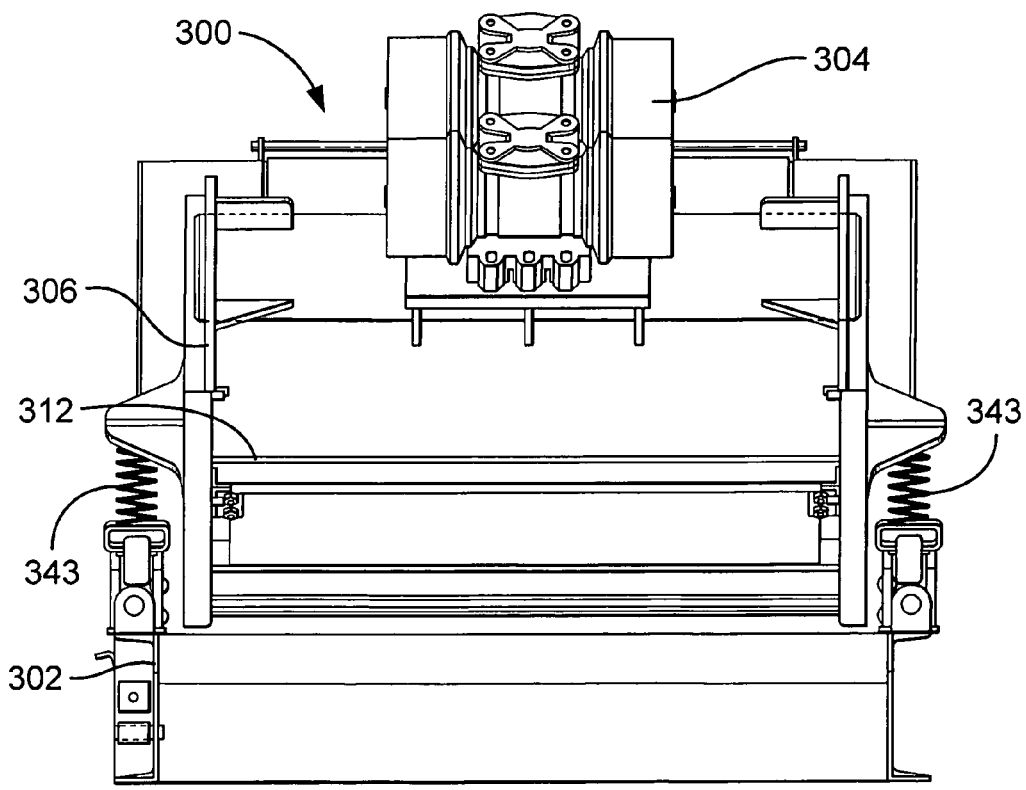
FIG. 10D is a front end view of the shaker of FIG. 10A.

FIG. 10C shows the basket 306 tilted as compared to the basket 306 as shown in FIG. 10A.

In one aspect a vibratory separator or shale shaker according to the present invention may employ a material flow sensor which produces a signal indicative of the presence or absence of material flowing onto screen apparatus; e.g., but not limited to, drilling fluid with drilled solids flowing onto screen apparatus of a shale shaker. Such an indication is valuable in insuring that, upon flow commencing again following cessation of material flow which is common when drilling is stopped, a screen or a basket is not inclined at such an angle that a relatively low depth pool is formed resulting in the loss of untreated drilling fluid flowing off a screen exit end. By adjusting screen or basket angle so that flow recommencement is accommodated, a pool is formed of sufficient depth and extent that all or the great majority of material is treated and an optional amount of drilling fluid flows through the screen and is recovered.

Optionally, a shaker 300 as shown in FIGS. 10A and 10B (with or without a sensor or sensors like the sensor 320a and/or 320b) has a material flow switch device 307 connected to vibratory separator adjacent a material input tank like the tank 308 for sensing when material is flowing. The device 307 may be any suitable known flow sensor apparatus, including, but not limited to paddle switch systems, including, but not limited to, FS-550 Series paddle switches from Gems Sensors Co.

The device 307 is in communication with and controlled by the controller 330 and, in one aspect, signals from the device 307 override signals from sensors like the sensors 320a and 320b so that the controller 330 knows that material flow has ceased (rather than an indication from the sensors 320a, 320b that the pool is very shallow). In response to signals from the device 307 the controller 330 can activate the apparatus for adjusting basket angle.

Once material flow into the basket is again proceeding, the controller 330 (acting upon signals from the sensor 320a and/or the sensor 320b) adjusts the basket angle to maintain the desired beach extent. Although one particular flow sensor has been mentioned, it is to be understood that any suitable known flow sensor device or system may be used, including, but not limited to, ultrasonic transducer systems.

The controller 330 may be any suitable known commercially available controller apparatus, including, but not limited to computerized systems, digital signal processor systems, programmable logic controller systems, and/or microprocessor systems. One suitable sensor apparatus and associated control system is the model XPS-10 and Hydro Ranger 200 from Siemens.

Figure 10E:
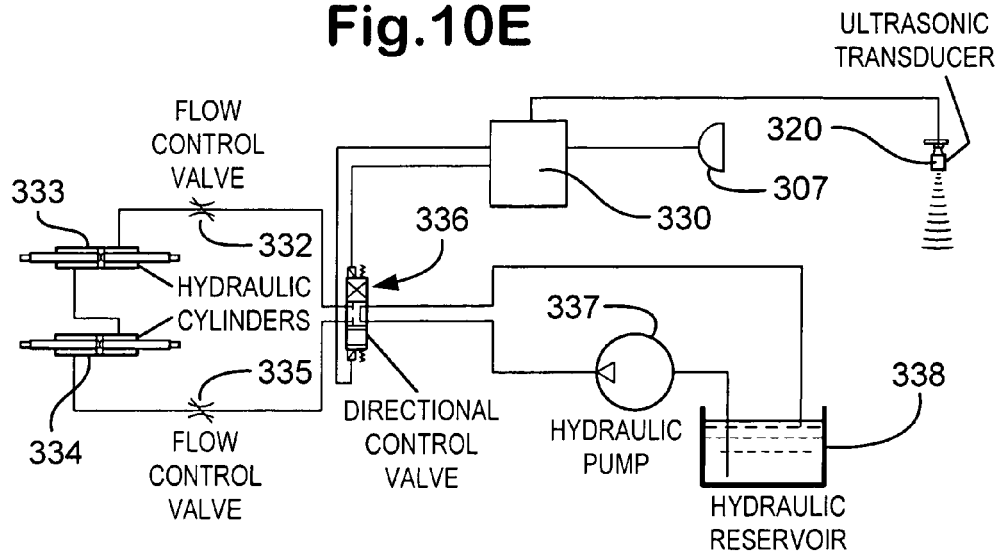
FIG. 10E is a schematic diagram of a control apparatus for the shaker of FIG. 10A.
Figure 10F:
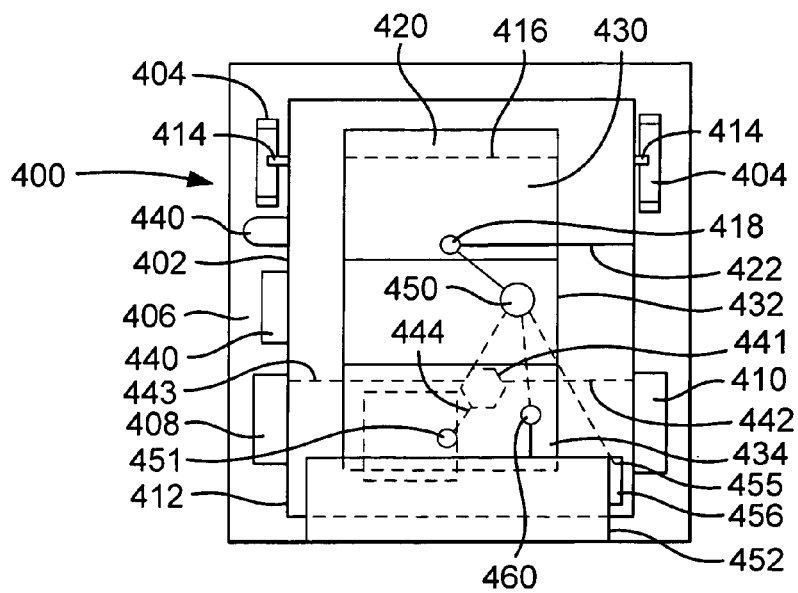
FIG. 10F is a top schematic view of a vibratory separator according to the present invention.

FIG. 10F shows schematically a vibratory separator or shake shaker 400 according to the present invention which has a screen-supporting basket 402 with pivot members 414 pivotally mounted on supports 404 on a skid or base 406. Adjustment apparatuses 408, 410 on either side of the basket 402 (like any adjustment apparatus described herein) raise and lower an end 412 of the basket 402, pivoting it about the pivot members 414. In one aspect a rear line 416 of a beach area 420 of a screen 430 supported in the basket 402 coincides with a line between the pivot members 414.

A sensor 418 (like any sensor disclosed herein, including but not limited to those in FIGS. 1-10A) is positioned above a fluid entry end of the screen 430 on a connecting member 422 connected to the basket 402. A sensor 451 (like any sensor herein) is positioned above a fluid entry end of the screen 434 and may be conveniently connected to a bar or beam which is connected to the tank 450 and/or to the basket 402. Material flows from a screen 432 to the screen 430 and from a screen 434 to the screen 432. Any suitable tank 452 and/or fluid introduction apparatus may be used. Vibrating apparatus 440 vibrates the basket 402.

A power apparatus 441 connected to the shaker 400 powers the adjustment apparatuses 408, 410 and may be located at any suitable location on the shaker 400 including, but not limited to, on the basket 402 or on the skid 406. Optionally the power apparatus 441 is any such apparatus or system disclosed herein. In one aspect the power apparatus 441 includes an hydraulic pump in fluid communication with an hydraulic fluid reservoir 440 via a line 444 and the apparatuses 408, 410 are hydraulically-powered apparatus in fluid communication with the pump via lines 442, 443. Control apparatus 450 (as any disclosed herein) controls the apparatus 441, the sensor 418, a sensor 460, a controller 456, and/or the sensor 451. Optionally, a material flow sensor 460 connected to the tank 452 (or at any suitable location in the separator 400) which is like the sensor 307, FIG. 10A, senses the presence or absence of material flowing from the tank 452 onto the screen 434. The sensor 460 is in communication with the control apparatus 450 and, in response to signals from the sensor 460, the control apparatus 450 adjusts the basket angle to accommodate material flow and to adjust for recommencement of flow following flow cessation. Optionally, a flow rate controller 456 controls the amount of fluid introduced onto the screen 434 from the weir tank 452 and a control switch 455 of the controller 456 is in communication with the control apparatus 450.

It is within the scope of this invention for the apparatuses 408, 410 to be located at any desirable effective location with respect to the basket, as may be the case with any adjustment apparatus disclosed herein.

The present invention, therefore, in some and not necessarily all embodiments, provides a vibratory separator having a screen support or basket for supporting screen apparatus for treating material introduced into the vibratory separator, the basket on a base and pivotable with respect thereto, vibratory apparatus connected to the basket for vibrating the basket, screen apparatus supported by the basket, the material forming a pool on the screen apparatus, and a beach on the screen apparatus adjacent the pool, measurement sensor apparatus connected to the vibratory separator and positioned above the screen apparatus for measuring a distance from the measurement sensor apparatus to a top surface of the pool, the measurement sensor apparatus including a signal production portion for producing signals indicative of said distance and for transmitting said signals, a control system for controlling and in communication with the measurement sensor apparatus for receiving signals from the measurement sensor apparatus indicative of said distance and for processing said signals to calculate a pool depth corresponding to said distance, and angle adjustment apparatus connected to the basket and controlled by the control system for adjusting angle of the basket, thereby adjusting extent of the beach. Such a vibratory separator may have one or some, in any possible combination, of the following: wherein the vibratory separator is a shale shaker and the material is drilling fluid with drilled cuttings therein; wherein the screen apparatus includes at least an exit screen with an exit end from which material separated by the screen apparatus flows off the screen apparatus for discharge from the vibratory separator, wherein the basket is at an angle such that the beach is formed adjacent an edge of the pool adjacent said exit end, and wherein the control system controls extent of the beach; wherein the control system controls extent of the beach to maintain the beach on the exit screen; wherein the screen apparatus is a plurality of screens placed adjacent each other in the basket, each screen with an associated screen support connected to the basket; wherein the angle adjustment apparatus includes a basket support pivotably mounted to the base and moving apparatus for selectively moving the basket up and down; wherein the basket has a fluid entry end and a fluid exit end and wherein the basket is pivotably mounted adjacent the fluid exit end, and wherein the angle adjustment apparatus moves the basket's fluid entry end; wherein the moving apparatus includes hydraulic cylinder apparatus for moving the basket; wherein the hydraulic cylinder apparatus includes two hydraulically powered piston apparatuses, each on a side of the basket for moving the basket; wherein each hydraulically powered piston apparatus is pivotably interconnected with corresponding linkage apparatus, the linkage apparatus pivotably connected to the basket support adjacent the fluid entry end of the basket; wherein the measurement sensor apparatus is ultrasonic apparatus; wherein the ultrasonic apparatus is at least one ultrasonic apparatus; wherein the measurement sensor apparatus is a plurality of distance sensor apparatuses; wherein the plurality of sensor apparatuses includes a first ultrasonic sensor apparatus spaced-apart from a second ultrasonic sensor apparatus, the first ultrasonic sensor apparatus above one side of the screen apparatus and the second ultrasonic sensor apparatus above an opposite side of the screen apparatus; wherein the measurement sensor apparatus is from the group consisting of electrical, optical, electromagnetic, ultrasonic, acoustic, and pulse-echo apparatus; wherein a rear boundary of the beach is along a rear beach line and the basket is pivotably connected to the base beneath the rear beach line; and/or wherein the angle adjustment apparatus is powered by power apparatus.

FIGS. 11A-11D show a shale shaker 500 according to the present invention which is like a King Cobra Shale Shaker commercially available from Varco International, Inc., but which has improvements according to the present invention. The shale shaker 500 has a skid or base 502 on which is a basket 506 which is vibrated by vibration apparatus 504. From a tank 508 fluid, e.g. drilling fluid with drilled cuttings and debris therein, flows onto a first screen 510 which is supported by a screen support 510a connected to the basket 506. Part of the fluid then flows onto a second screen 511 supported by a screen support 511a connected to the basket 506 and then part of the fluid flows onto a last screen 512 supported by a screen support 512a connected to the basket 506. Part of the fluid flows off an exit end 512b of the screen 512 onto an optional lower screen 513 which is supported by a screen support 513a connected to the basket 506. Fluid flows into a lower sump or receptacle 503.

The fluid forms a pool 515 above the screens 510-512. A beach 516 is at the exit end 512b of the screen 512. It is desirable to control and/or optimize the extent of this beach 516 and, in certain aspects, it is preferred that the beach, as viewed in FIG. 11B, be sufficiently large that no fluid flows untreated off the last screen 512.

An ultrasonic transducer sensor measurement apparatus 520 is connected to the shale shaker, e.g. to a skid, base, tank or as shown to the basket 506 and is, optionally, positioned above the pool 515, e.g. over an entry end 510b of the screen 510. The apparatus 520 is in communication with a control apparatus 530 (e.g., but not limited to, a computer). The sensor apparatus generates a signal indicative of sensor-to-pool distance which indicates depth of the pool 515 beneath the sensor apparatus(es).

The control apparatus 530 selectively controls a bladder apparatus 536 which selectively raises and lowers a rocker arm assembly 540 which, in turn, raises and lowers the basket 506 to which the rocker arm assembly 540 is connected. Optionally the rocker arm assembly's angle with respect to the horizontal is selectively adjustable by a mechanical mechanism, e.g. any suitable known mechanical mechanism for moving the rocker arm assembly up and down, e.g., but not limited to, a screw mechanism or an hydraulic or pneumatic piston device.

A top part 536a of the bladder apparatus 536 contacts a lower surface 541a of a plate 541 of the rocker arm assembly 540. The bladder apparatus 536 inflates to raise the rocker arm assembly 540 and deflates to lower it. A gas, e.g. air, or a liquid, e.g. a water-glycol mixture, can be used to inflate the bladder apparatus 536. The control apparatus 530 controls the bladder apparatus 536. It is within the scope of the present invention to use, instead of the air bladder apparatus 536, to move the rocker arm assembly up and down: a linear actuator device or other electronically-operated device; a hydraulically-powered device, e.g. an hydraulic cylinder system; or an air-over-hydraulic apparatus, e.g. a system with a liquid-filled tank with air pressure. In one particular embodiment the air bladder apparatus 536 is a commercially available Model 20-2 from Firestone Company. Although only one air bladder apparatus 536 is shown, it is within the scope of the present invention to use two such apparatuses, one on each side of the basket 506.

The rocker arm assembly 540 has pivot shafts 542 which pivot in corresponding recesses 543 of mounts 544 on the skid 502. The rocker arm assembly 540 has two side members 545 interconnected with an end member 546. Spring mounts 54, welded to the basket 506, support springs 548 which are connected to the brackets 549.

An optional ultrasonic sensor apparatus 522, in communication with the control apparatus 530, senses whether or not there is fluid flow from the tank 508 to the pool 515. If a "no-flow" signal is generated by the apparatus 522 and sent to the control apparatus 530, then the basket is tilted to its maximum uphill angle in anticipation of a next rush of mud. An optional ultrasonic sensor apparatus 524 senses the location (height) of the plate 541, and produces a signal indicative of this location, which is a signal whose value corresponds to the angle of the rocker arm assembly 540 and, therefore, to the angle of the basket 506 (and which correlates with signal values from the apparatus 522). In one aspect, the control apparatus 530 computes the basket angle based on the signal from the ultrasonic sensor apparatus 524 and correlates this computed angle with the value for the pool depth based on the signal from the ultrasonic sensor apparatus 520. If these two values correlate, this indicates the system is working properly. If there is a discrepancy between the values (from the ultrasonic sensors) (e.g. a discrepancy caused by high flow, downhill basket orientation or low fluid level) this indicates a measurement problem and the control apparatus 530 then adjusts the basket to a fully uphill angle until there is no such discrepancy.

Figure 11A:
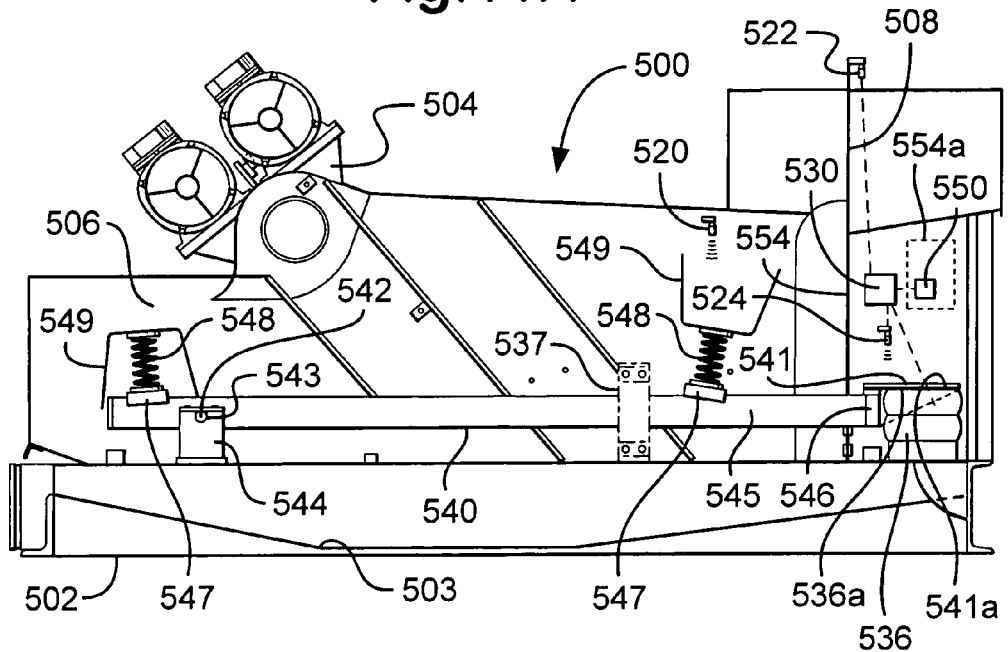
FIG. 11A is a side end view of a shale shaker according to the present invention.
Figure 11B:
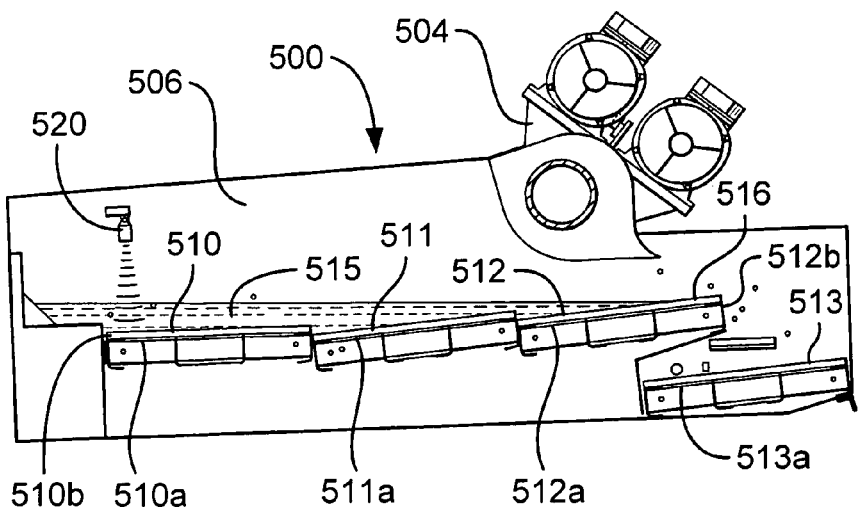
FIG. 11B is a partial cross-section view of the shale shaker of FIG. 11A.
Figure 11C:
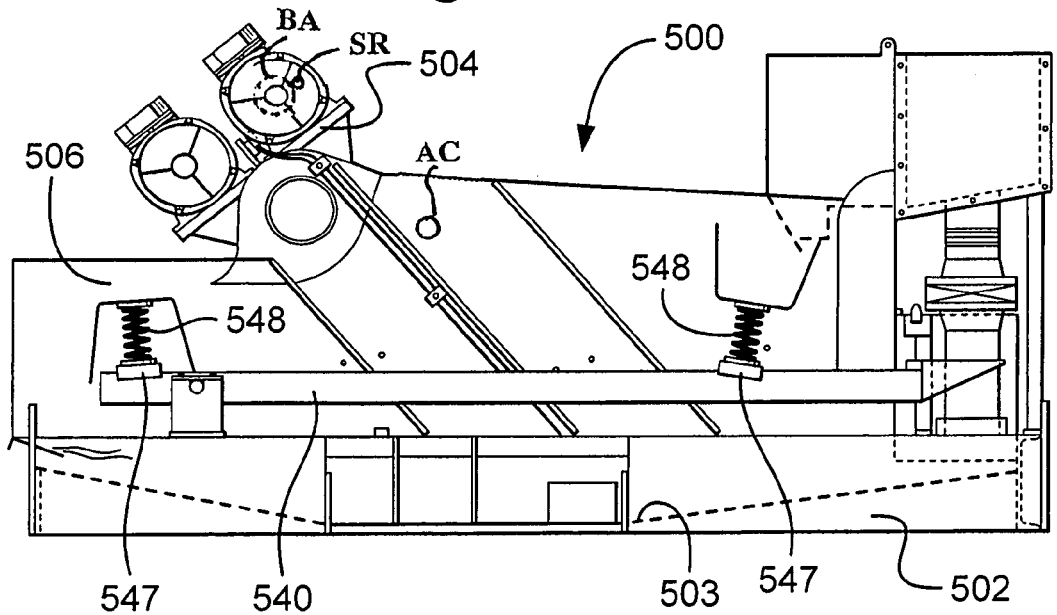
FIG. 11C is a partial cross-section view of the shale shaker of FIG. 11A.
Figure 11D:
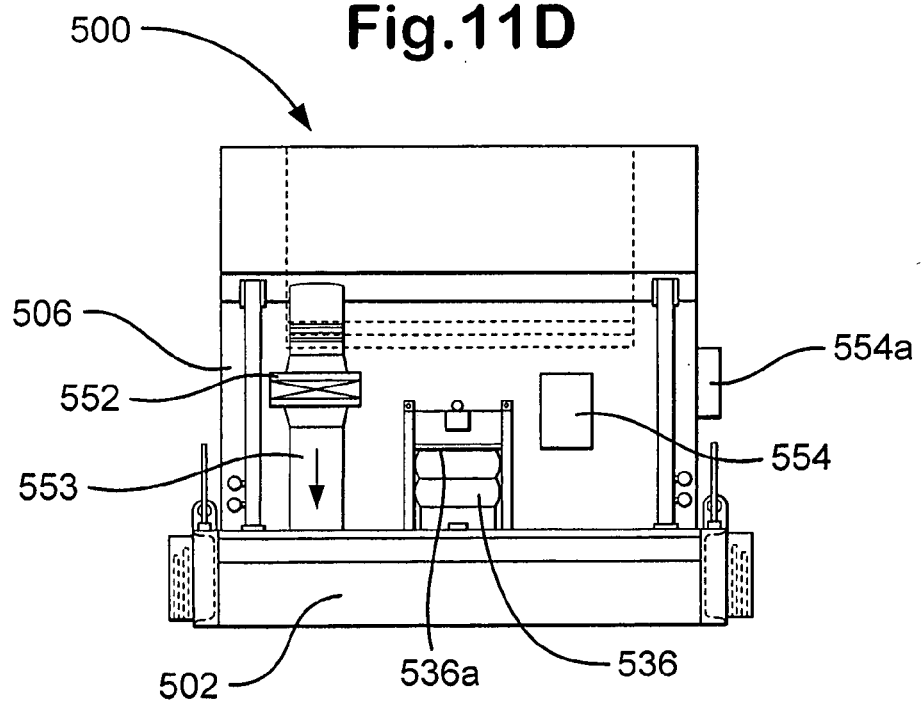
FIG. 11D is an end view of the shale shaker of FIG. 11A.
Figure 12A:
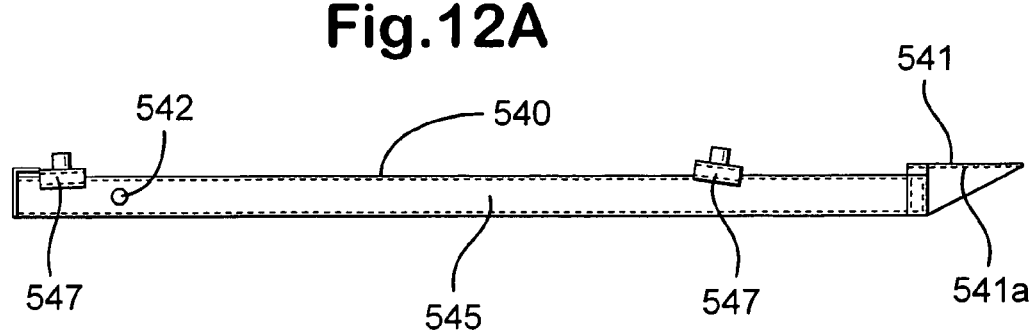
FIG. 12A is a side view of a rocker arm assembly of the shale shaker of FIG. 11A.
Figure 12B:
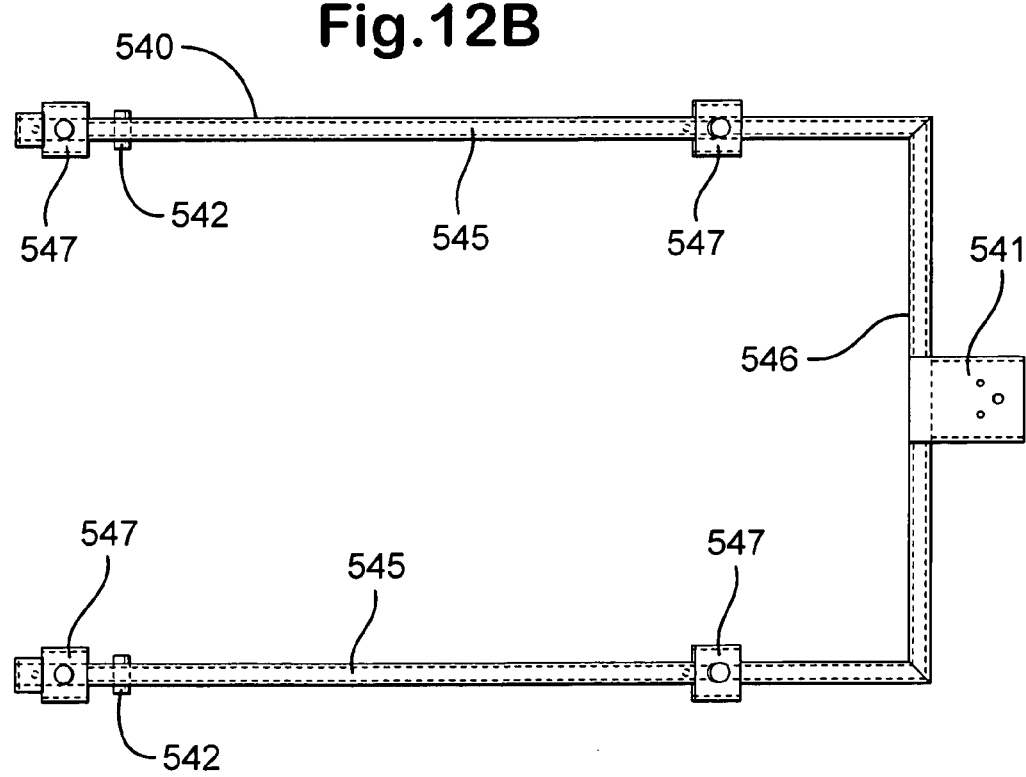
FIG. 12B is a top view of the rocker arm assembly of FIG. 12A.

Optionally, the shale shaker 500 includes a variable frequency drive 550 (optionally in an enclosure rated for a Class 1, Division 1, or Zone 1 hazardous area) whose functions include varying the rpm's of the vibration apparatus 504 and thus varying the G-forces (acceleration) imparted to the basket 506 by the vibration apparatus 504; and changing the direction of rotation of the vibration apparatus 504 thereby changing the motion of the basket 506, e.g. from linear motion to elliptical motion. In one particular aspect the vibration apparatus 504 includes a Model VMX 18-8300-80 vibrator or a Model VMX 18-8300-110 from Martin Engineering which have dual motion motors with the capability of changing an imbalance of weights based on rotation direction to change motion, e.g. from linear to elliptical (or vice versa). The control apparatus 530, and/or the ultrasonic sensor apparatus 524 and/or the apparatus 550 may be located at any convenient location on the shale shaker 500. As shown in FIG. 11A they are protected within an enclosure 554 formed of parts of the tank made of resilient material, e.g. metal or composite. Alternatively the drive 550 is located in a separate enclosure 554a (shown by dotted lines).

Apparatus 552 provides a channel 553 for fluid in the tank 508 to bypass the screens 510-512 and flow directly into the receptacle 503.

Figure 13:
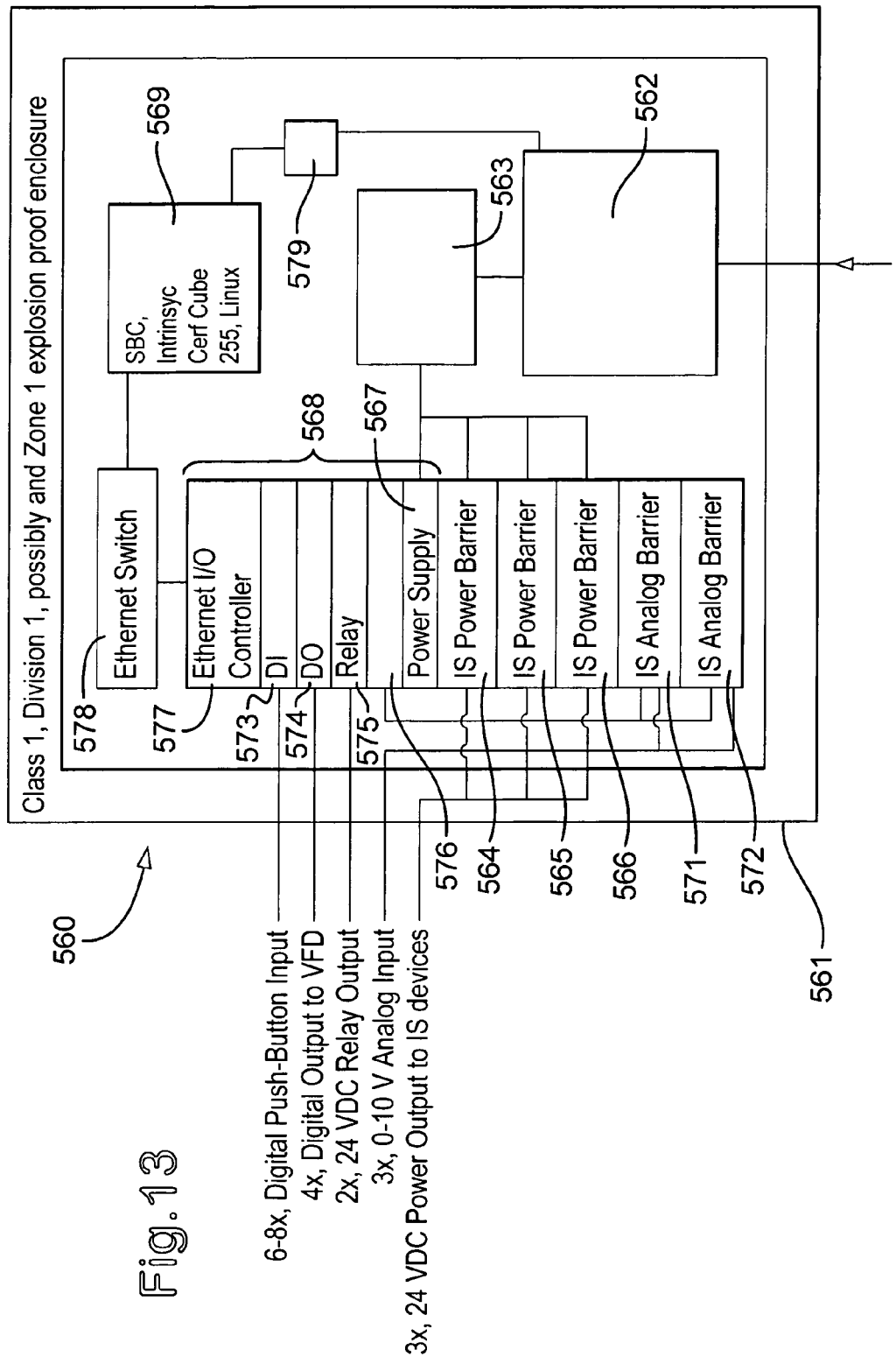
FIG. 13 is a schematic view of a control system according to the present invention for a vibratory separator according to the present invention.

FIG. 13 shows a computer 560 which can be used, in one aspect, for the control apparatus 530. Optionally, the computer 560 is positioned within an enclosure 561 which is suitable for installation in a Class 1, Division 1 or Zone 1, hazardous area. AC Power is input to an AC to DC transformer 562 which provides power to a power supply 579 and to a power supply 563 (which in turn supplies power to barrier devices 564, 565, and 566). The power supply 563 provides power, e.g. 24 VDC, to a power supply 567 of an Input/Output device 568. The power supply 579 provides power (e.g. 5 VDC) to a single board computer 569 which runs a control program and reads the I/O device, and sends control signals to electrically actuated valves (e.g. 670, 671, FIG. 14) to control the shaker's basket angle. The power barrier devices 564-566 provide power, e.g. 24 VDC, to various intrinsically safe ("IS") devices, e.g. the ultrasonic sensor apparatuses. The computer 569 can be programmed to provide a basket angle reset to reset a value of the ultrasonic sensor apparatuses' measurement of a "home" position of the basket (e.g. a maximum uphill angle).

Analog barrier devices 571 and 572 limit the power of signals on analog devices, i.e. the ultrasonic sensors. Supply 567 provides power to the devices 573-576. A digital input card 573 receives digital input signals from other devices, e.g. the VFD and user push buttons. A digital output card 574 outputs digital signals to other devices, e.g. to the VFD. A relay card 575 provides switch openings and closures for sending control signals from the computer to other devices, e.g. control valves. An analog input card 576 receives analog signals from other devices; e.g. from the ultrasonic sensor apparatuses.

Optionally the Input/Output device 568 may have a switch or connection 578 for communication with a system (e.g. a computer or computer system) apart from and/or remote from a shale shaker or vibratory separator, e.g., but not limited to an Ethernet Input/Output Controller which, in turn, provides to connection to other systems, e.g. the Internet.

Figure 14:
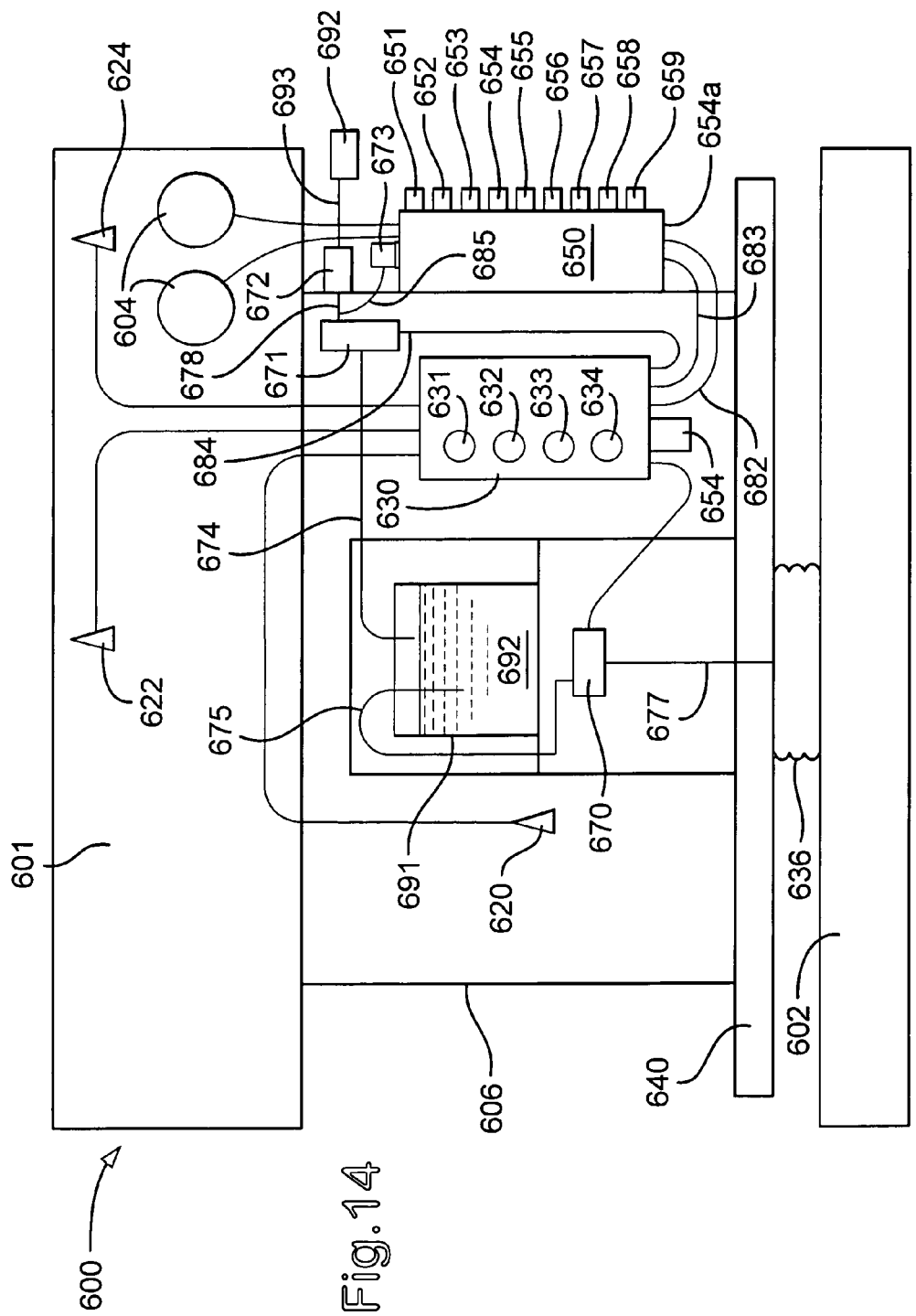
FIG. 14 is a schematic view of a system according to the present invention.

FIG. 14 illustrates schematically a system 600 according to the present invention which is like the systems shown in FIGS. 11A-13. A shaker 601 (e.g. like the shaker 500 or any shaker disclosed or referred to herein) has a rocker arm assembly 640 (e.g. like the assembly 540) which can be raised and lowered by a bladder apparatus 636 (e.g. like the apparatus 536) which is mounted on a skid 602. Vibratory motors 604 (e.g. like the motors 504) vibrate a basket 606 (e.g. like the basket 506).

Ultrasonic sensor apparatuses 620, 622, 624 (e.g. like the apparatuses 520, 522 524) provide signals to a control system 630 (e.g. like the control apparatus 530) for sensing system parameters and for controlling the rocker arm assembly to adjust basket angle and to control the motors 604. The control apparatus 630 is housed within an enclosure 654 (e.g. like the enclosure 554).

An optional variable frequency drive system ("VFD") 650 (e.g. like the system 550) in an enclosure 654a (e.g. like the enclosure 554a) is in communication with the system 630 and provides control of the motors 604 (i.e. control of G forces on the screens and/or control of type of motion) and control of the basket angle. In one particular aspect the system 630 has manually-operable push buttons 631-634. The buttons 631-633 provide for calibration of the ultrasonic sensor apparatuses 620, 622, 624, respectively. The button 634 is a system re-set button. In one aspect the buttons are tied to a digital input card in the enclosure.

The VFD 650 has manually-operable push buttons 651-656 and 658-659 which function as follows:
- 651 On
- 652 Off
- 653 Switch between linear/elliptical motor motion
- 654 Power to system 630
- 655 Switch between automatic and manual mode
- 656 System 650 re-set
- 658 Move basket up (increase basket angle)
- 659 Move basket down (decrease basket angle)

Valves 670 and 671 are electronically-operated valves. Power is provided to the valve 670 via a power line 681 from the system 630 and to the valve 671 via a power line 684. The basket is raised or lowered by selectively opening or closing the valve 670 which permits fluid 692 (e.g. a water-glycol mixture) to flow to or from the bladder apparatus 636 from a controlled pressure reservoir 691 in a line 675 and to or from the valve 670 in a line 677.

The valve 671 controls air flow between an air inlet 672 and the reservoir 691. Air under pressure from a source 692 flows in a line 693 to the air inlet 672 and then via the lines 678 and 674 to and from the reservoir 691 to move the fluid 692 for raising and lowering of the basket to adjust basket angle.

A cooler 673, e.g. a vortex cooler apparatus in fluid communication with the air inlet 672 via lines 678 and 685, cools the interior of the enclosure 654*a*.

Figure 15:
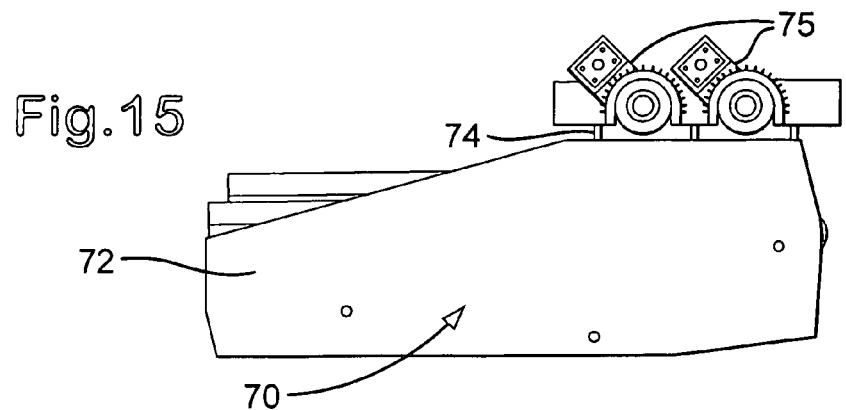
FIG. 15 is a side view of a shale shaker according to the present invention.
Figure 16:
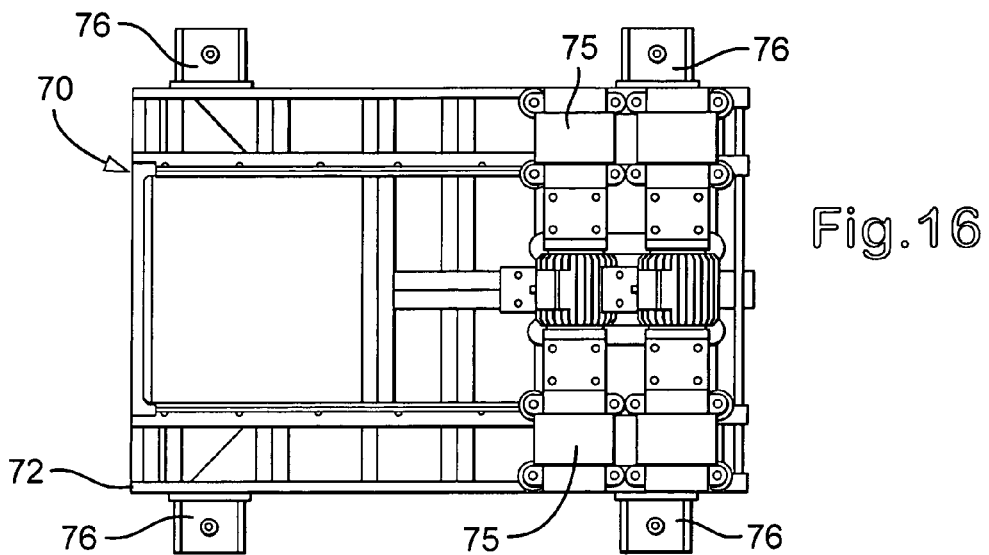
FIG. 16 is a top view of the shale shaker of FIG. 15.
Figure 17:
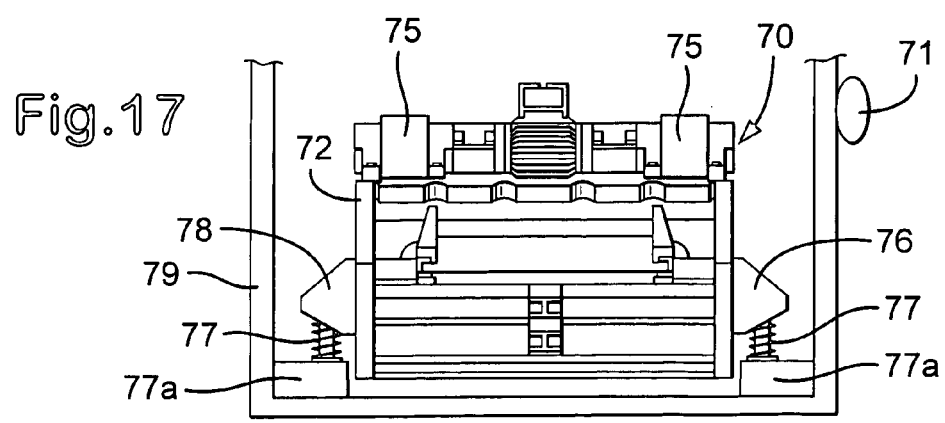
FIG. 17 is an end view of the shale shaker of FIG. 15.

FIGS. 15-17 show a shale shaker 70 according to the present invention which has a screen-mounting basket 72 and a bridge 74 on which are mounted two vibrating apparatuses 75. The basket 72 has brackets 76 to which are secured helical springs 77. Each spring 77 is secured to a base member 77*a*. As shown in FIG. 17, an optional housing 79 may be used on sides of and beneath the shale shaker 70. Optionally (and as may be the case with any shale shaker disclosed herein according to the present invention or with any known prior art shaker or vibratory separator) an electronic tracking apparatus 71 is on the housing 79, but may, according to the present invention, be within any suitable member or part of a shale shaker; and, optionally, such a tracking apparatus has a container or housing made of composite material and/or is encased within or coated with composite material. Any known tracking device, apparatus, or system may be used, including, but not limited to known satellite tracking systems.

The present invention, therefore, provides, in at least certain embodiments, a vibratory separator or shale shaker with a base; a basket movably mounted on the base and for supporting screen apparatus for treating material introduced into the vibratory separator, the basket on the base and pivotable with respect thereto; vibratory apparatus connected to the basket for vibrating the basket; screen apparatus supported by the basket, the material flowing onto the screen apparatus for treatment; angle adjustment apparatus connected to the basket for adjusting angle of the basket; sensor apparatus, e.g., ultrasonic, for sensing a parameter indicative of basket angle and for providing a signal corresponding to said basket angle; control apparatus for receiving signals from the sensor apparatus and for controlling basket angle based on said signals; the angle adjustment apparatus including a rocker arm assembly with a first end and a second end, the first end pivotably mounted to the base adjacent and beneath a material input area of the vibratory separator and the second end adjacent and beneath a material exit end of the vibratory separator; and the angle adjustment apparatus including movement apparatus with a part thereof in contact with the second end of the rocker arm assembly for moving the second end up and down to change basket angle, the movement apparatus controlled by the control apparatus. Such an apparatus may have one or some, in any possible combination, of the following: wherein the vibratory separator is a shale shaker and the material is drilling fluid with drilled cuttings therein; wherein the vibratory apparatus comprises two motors for vibrating the basket, the two motors providing dual motion capability; wherein the screen apparatus includes at least an exit screen with an exit end from which material separated by the screen apparatus flows off the screen apparatus for discharge from the vibratory separator, wherein the basket is at an angle such that a beach is formed adjacent an edge of a pool of material adjacent said exit end, and wherein the control system controls extent of a beach; wherein the sensor apparatus is ultrasonic sensor apparatus; wherein the ultrasonic sensor apparatus is at least one ultrasonic sensor apparatus; wherein the sensor apparatus is a plurality of sensor apparatuses; wherein said plurality of sensor apparatuses includes a first ultrasonic sensor apparatus spaced-apart from a second ultrasonic sensor apparatus, the first ultrasonic sensor apparatus for sensing material level in the basket and the second ultrasonic sensor apparatus for sensing rate of material flow into the basket; wherein the measurement sensor apparatus is from the group consisting of electrical, optical, electromagnetic, ultrasonic, acoustic, and pulse-echo apparatus; flow sensor apparatus connected to the vibratory separator for sensing the flow of material onto the screen apparatus, the flow sensor apparatus controlled by and in communication with the control apparatus, and the control apparatus for adjusting basket angle in response to signals from the flow sensor apparatus; wherein said plurality includes a third ultrasonic sensor apparatus for sensing basket angle; wherein the angle adjustment apparatus is powered by power apparatus from the group consisting of pneumatic power apparatuses, hydraulic power apparatuses and electric power apparatuses; and/or wherein the movement apparatus of the angle adjustment apparatus includes inflatable bladder apparatus which is selectively inflatable to raise and lower the rocker arm assembly.

The present invention, therefore, provides, in at least certain embodiments, a vibratory separator or shale shaker with a base; a basket movably mounted on the base and for supporting screen apparatus for treating material introduced into the vibratory separator, the basket on the base and pivotable with respect thereto; vibratory apparatus connected to the basket for vibrating the basket; screen apparatus supported by the basket, the material flowing onto the screen apparatus for treatment; angle adjustment apparatus connected to the basket for adjusting angle of the basket; sensor apparatus connected to the basket for sensing a parameter indicative of basket angle and for providing a signal corresponding to said basket angle; control apparatus for receiving signals from the sensor apparatus and for controlling basket angle based on said signals; the angle adjustment apparatus including a rocker arm assembly with a first end and a second end, the first end pivotably mounted to the base adjacent and beneath a material input area of the vibratory separator and the second end adjacent and beneath a material exit end of the vibratory separator; the angle adjustment apparatus including movement apparatus with a part thereof in contact with the second end of the rocker arm assembly for moving the second end up and down to change basket angle, the movement apparatus controlled by the control apparatus; wherein the vibratory separator in one aspect is a shale shaker and the material is drilling fluid with drilled cuttings therein; wherein the vibratory apparatus has two motors for vibrating the basket, the two motors providing a dual motion capability; wherein the screen apparatus includes at least an exit screen with an exit end from which material separated by the screen apparatus flows off the screen apparatus for discharge from the vibratory separator; wherein the basket is at an angle such that a beach is formed adjacent an edge of a pool of material adjacent said exit end; wherein the control system controls extent of a beach; wherein the sensor apparatus is ultrasonic sensor apparatus; wherein the sensor apparatus is a plurality of sensor apparatuses which includes a first ultrasonic sensor apparatus, second ultrasonic sensor apparatus, and third ultrasonic sensor apparatus for sensing basket angle, the first ultrasonic sensor apparatus for sensing material level in the basket and the second ultrasonic sensor apparatus for sensing material flow rate into the basket; the control apparatus for adjusting basket angle in response to signals from the sensor apparatuses; and correlation apparatus for correlating signals from the three ultrasonic sensor apparatuses to check system adjustment.

The present invention, therefore, provides, in at least certain embodiments, a vibratory separator with a base; a basket movably mounted on the base and for supporting screen apparatus for treating material introduced at a first end of the basket into the vibratory separator, the basket on the base and the first end pivotable with respect thereto, the basket having a second end spaced apart from the first end, material exiting the basket at the second end; vibratory apparatus connected to the basket for vibrating the basket; screen apparatus supported by the basket, the material flowing onto the screen apparatus for treatment; angle adjustment apparatus connected to the basket for adjusting angle of the basket by pivoting the basket's first end; sensor apparatus for sensing a parameter indicative of basket angle and for providing a signal corresponding to said basket angle; control apparatus for receiving signals from the sensor apparatus and for controlling basket angle based on said signals; and the angle adjustment apparatus including movement apparatus for moving the second end up and down to change basket angle, the movement apparatus controlled by the control apparatus.

Such an apparatus may have one or some, in any possible combination, of the following: wherein the vibratory separator is a shale shaker and the material to be treated is drilling fluid with drilled cuttings therein; wherein said plurality of sensor apparatuses includes a first ultrasonic sensor apparatus spaced-apart from a second ultrasonic sensor apparatus, the first ultrasonic sensor apparatus for sensing material level in the basket and the second ultrasonic sensor apparatus for sensing rate of material flow into the basket and wherein said plurality of sensor apparatuses includes a third ultrasonic sensor apparatus for sensing basket angle, and correlation apparatus for correlating signals from all three ultrasonic sensor apparatuses to check system adjustment; a variable frequency drive connected to the basket for controlling the vibratory apparatus; computer apparatus for controlling the vibratory separator; wherein the computer apparatus performs the functions of a variable frequency drive; and/or boost push button apparatus for manually changing forces applied by the vibratory apparatus.

The present invention, therefore, provides, in at least certain embodiments, a method for treating material introduced to a vibratory separator, the method including introducing material to a vibratory separator, the vibratory separator like any according to the present invention, treating the material in the vibratory separator, and adjusting the angle of the basket with angle adjustment apparatus. Such an apparatus may have one or some, in any possible combination, of the following: wherein the vibratory separator is a shale shaker and the material is drilling fluid with drilled cuttings therein; and wherein the vibratory apparatus comprises two motors for vibrating the basket, the two motors providing dual motion capability, the method further including changing motion using the two motors.

The present invention, therefore, provides, in at least certain embodiments, beach adjustment apparatus for adjusting extent of a beach on a screen of a vibratory separator, the screen mounted to a vibratable basket of the vibratory separator, the beach adjustment apparatus including an end-pivotable basket support for supporting the basket, the end-pivotable basket support pivotable at a pivot end thereof, the end pivotable basket support having a second end spaced-apart from the pivot end, the second end positionable near an exit end of a vibratory separator; apparatus for pivoting the end-pivotable basket support at its pivot end; and the apparatus for pivoting the end-pivotable basket support including movement apparatus having a part thereof for contacting the second end of the end-pivotable basket support for facilitating pivoting movement of the end-pivotable basket support to raise and lower the second end to adjust the extent of the beach.

In certain aspects an automatic boost minimizes fluid loss over the end of a shaker during a flooding situation. Several standard prior art shakers operate with a fixed shaking force and frequency, and a manually adjustable basket angle and vibrate with a nominal acceleration (g-force) that is measured without drilling fluid. The addition of drilling fluid adds mass to the system, which decreases the system acceleration. In addition, the angle of the basket is often manually adjusted according to the fluid level. Adjusting the basket angle keeps the fluid extent (beach) at a desired point, e.g. in triple screen shakers at about the end of a third screen. However, when fluid flow rates change frequently in the field, the basket angle is often not adjusted to its optimum position. If the basket angle is left in the fully uphill position, several screens may be running dry, which can decrease screen life. If the basket angle is left in a downhill position for correct beach length, whole mud can be lost over the end of the shaker when flow rates increase.

In certain embodiments, a shaker according to the present invention automatically adjusts the basket angle according to the fluid level. Thus, the basket is tilted downhill when there is little flow coming into the shaker. When the flow increases, the basket is automatically tilted uphill to keep the beach at approximately the same position. If the basket has been tilted fully uphill, and the fluid level is measuring high for a certain period of time (programmable into the shaker computer and/or controller), then the computer automatically signals the VFD (variable frequency drive, or inverter) to drive the motors faster, referred to as an "automatic boost" feature. Increasing the motor speed increases the force applied to the basket and fluid system. This in turn increases the basket acceleration, which increases the flow capacity of the shaker. Thus, this automatic boost feature helps prevent a shaker from flooding and losing whole mud.

Many traditional prior art shakers operate with a fixed motion profile. These motion profiles are either linear, elliptical, or circular. Each motion tends to be best suited for a particular mud condition. For instance, circular motion can perform well with sticky clays, linear motion performs well in high flow conditions, and elliptical motion can offer a compromise between linear and circular. Some current prior art shakers can manually switch motion profiles between linear and elliptical. These shakers include the Brandt King Cobra+, Brandt King Cobra II, and Swaco Mongoose. Certain shakers according to the present invention may have a custom shaker motion profile which is elliptical with varying aspect ratio. A motion profile is the motion shape at different points on the shaker, a motion imparted to material moving on the shaker. For example, overall shaker performance can, in certain aspects, be improved by having a different motion shape at the discharge end of a shaker than at the feed end or in the middle of a shaker. In one aspect, the tuned motion in the feed end of the shaker is a thin ellipse (approximately 5% aspect ratio), which can appear to be linear; the tuned motion near the center of the basket is a medium shaped ellipse (approximately 15% aspect ratio); and the tuned motion near the discharge end of the shaker is a fatter ellipse (approximately 30% aspect ratio). The acceleration level and angle of attack remain reasonably consistent and uniform front to back. In one aspect, this motion profile enhances performance in drilling mud with sticky clays. With this configuration, the conductance is increased (faster elimination of liquid from the mud) with the thin ellipse at the feed end of the shaker. The conveyance is enhanced at the discharge end of the shaker by the more pronounced elliptical motion. The more linear motion at the feed end of the shaker processes a higher maximum fluid flow rate, while the more elliptical motion at the discharge end of the shaker conveys sticky clays better. Elliptical motion is effected by using different weights on vibratory motors creating a force differential which results in motion perpendicular to the line of force on the basket and a torque imbalance which makes the basket rotate about the center of mass producing elliptical motion; and/or such motion is produced by varying motor position with respect to the center of mass. In a shaker according to the present invention an operator can manually switch the shaker motion profile between linear, elliptical, and circular motion (with appropriate motor location and/or spacing and/or with a motor at the basket center of mass). In another aspect, a shaker according to the present invention has the ability to produce all three standard motions (linear, elliptical, and circular), and a custom motion (change shape front to back on the basket), then the best motion profile can be chosen based on the mud state and shaker state. For instance, if the mud flow rate is very high, linear might be the best motion profile. If very sticky clays are encountered, then circular motion might be preferred. If the mud does not have a large amount of sticky clays, and the flow rate is not extremely high, then elliptical motion might be best. Other conditions may point towards one motion as being the best at a certain time. For instance, an intelligent shaker according to the present invention can choose the appropriate motion, and turn motors on and off, or run the motors forward or reverse to achieve the best motion. Motors can have brakes applied to stop the rotation of the motor weights in order to achieve the desired motion.

Currently, many prior art shakers run at a fixed or at least infrequently changing state. The shaker state can be described by such parameters as screen mesh, acceleration amplitude, motion profile, basket angle, angle of attack, and vibration frequency. In addition, many typical shakers operate without knowledge of the state of the drilling mud. Some of the parameters that contribute to the mud state include viscosity, temperature, flow rate, fluid level in the shaker, specific gravity, solids content, and stickiness of the solids. Typically, many prior art shakers are designed to operate at a nominal shaker state that works reasonably well over a range of mud states. Experienced operators change the shaker state periodically to increase performance for the current mud state. Prior art mud sensors sense such parameters. Inexperienced operators may operate the shaker at a sub-optimal state for the conditions of the mud. Even experienced operators may not have the time to change the state of the shaker to match changing mud conditions. A shaker supplied with information about its own state and the state of the drilling mud can operate closer to optimum for given conditions. Certain shakers according to the present invention measure their own performance to assist in optimizing operation.

In order to operate intelligently, a shaker according to the present invention has a computer or other programmable apparatus of some form to read state information, make decisions to optimize performance, and implement the decisions (e.g., but not limited to, a controller 330, FIG. 10E; control apparatus 550, FIG. 11A, computer 560, FIG. 13; or control apparatus 630, FIG. 14). The computer, in one aspect, is connected to an I/O (input/output) device or devices that read values from various sensors and send outputs to actuators, motor drivers, and/or other equipment. Sensors (e.g. sensors within a shaker, container, tank and/or in a flow line or conduit; e.g. sensors MS, FIGS. 2A and 9) indicate and measure some or all of the mud state parameters.

With information about the mud state, the current shaker state, and/or other performance measurements, an intelligent shaker according to the present invention controls its own state to enhance and/or to optimize performance. Shaker states that can be controlled (with user selectable controls and/or automatically based on sensor readings) include basket angle, acceleration magnitude, motion profile (linear, elliptical, or circular; e.g. detect non-sticky free-flowing material and use linear motion; e.g. detect sticky clays, change to elliptical motion or detect flow is low for a long time and change to elliptical motion), vibration frequency, angle of attack (angle of basket motion relative to its horizontal position; e.g. change center of mass of basket and/or motor location).

In certain aspects, the automatic boost feature is a specific instance of controlled acceleration. In this case, the shaker acceleration is temporarily increased to a pre-determined value, e.g. in order to accommodate unusually high mud flow. More generally, when the shaker acceleration is controlled, then it can be varied over a continuous range (e.g. for such control a monitoring device monitors an accelerometer on or connected to a shaker basket and the monitoring device, e.g. a computer, PLC, or PID controller, sends a signal to a VFD). For instance, the acceleration can be controlled to be constant under varying mud flow/loading. This is accomplished by measuring the basket acceleration with an accelerometer located on the basket, in one aspect near the center of mass, e.g. accelerometer AC in FIG. 1C; feeding back the signal from the accelerometer to a shaker computer (or PID controller, or to a remote computer); comparing the actual acceleration with the desired value; and changing the motor frequency or other driving force until the actual acceleration matches the desired acceleration.

If a desired acceleration value is changed according to the states of the shaker and mud, then performance is further enhanced and/or optimized. For instance, the acceleration level is adjusted to minimize energy consumption, or to use the minimum necessary acceleration based on the fluid level in the shaker. This is useful since high acceleration can lead to decreased screen life and solids degradation. If the fluid level in the basket increases above the desired level, then the basket angle is decreased to tilt the basket uphill. This can only be done to a certain point. Once the basket is fully uphill, the acceleration is increased, which processes more fluid and lowers the fluid level in the shaker basket.

For condition-based maintenance, the shaker machine state and/or shaker history are used to predict when to perform maintenance on the machine. The maintenance schedule of a standard shaker often requires adding grease to the vibrator motor bearings after a period of time. Depending on how much the shaker was actually operating over this time causes the actual maintenance time frame to differ from the static, documented schedule. Proper greasing is especially important to motor bearings (e.g. bearing apparatus BA shown in dotted lines in FIG. 11C). Too little grease can cause increased friction, increased temperature, and premature bearing failure. Too much grease can cause increased pressure in the bearings, increased temperature, and premature bearing failure. Further, the ambient temperature that the motor operates in will affect the maintenance schedule. Other factors include motor force.

One factor that can be used to predict when bearing grease needs to be added is the operating temperature of the bearing. According to the present invention the bearing operating temperature is sensed with a sensor (e.g. sensors in the motor adjacent the bearings, e.g. sensor SR, FIG. 11C) and is then sent to a computer that compares it to the ambient temperature and the desired temperature level for greasing, then the operator can be notified (e.g. by any controller as described herein) when it is time to grease the motor bearings. Also, a computer (on the shaker, on site, or remote) or other device is used to keep track of the motor's operational time. When the operational time reaches the desired maintenance time, the operator is notified of the required maintenance. This operational time can be adjusted according to the ambient temperature and current bearing temperature.

Certain shakers according to the present invention have interfaces and communications with on-site and remote controllers, computers, systems, networks, and/or the Internet. An automatic shaker according to the present invention has a web (e.g. Internet) interface between on-site personnel at the shakers location and personnel and/or computerized information remote therefrom for maintenance and/or re-programming operations. This enables technicians during setup, maintenance, or troubleshooting to monitor the status of the shaker, including all program parameters, and adjust the program parameters on the fly, while the shaker is shaking and the software is running. Additionally, the technicians can load software updates to the shaker. The software updates can be accomplished either through the web interface, or by physically changing a programmable media, e.g. a removable Compact Flash card. Such a shaker can have a local Ethernet network in its computer enclosure on the shaker. With a wireless radio attached to the shaker computer network, the shaker computer can communicate wirelessly through the closed explosion-proof enclosure with the Internet and/or to a laptop (see, e.g. laptop LAP shown schematically in FIG. 26) with a wireless network connection. In one aspect, this works up to about 20 feet from the shaker while the shaker is running. The range can be extended with the use of a window in the computer enclosure, or with the use of an antenna in an explosion-proof enclosure with a glass dome. Additionally, the technician can connect to the computer network with a network cable.

In certain aspects, a shaker according to the present invention wirelessly connects to the Internet through a drilling rig's network connection. This enables remote monitoring, troubleshooting, and control. For instance, if a rig has a problem, technical support is contacted and is able to view the shaker state, view program variables, change settings, and update the software remotely, from anywhere in the world with an Internet connection.

The software in the shaker computer, in certain aspects, has the ability to be upgraded to communicate with other Drilling Equipment (DE) machines such as tele-operated drilling chairs, Drawworks, rackers, mud control equipment, and top drives. Optionally, local and/or remote user interfaces with touchscreens are provided. These allow an operator to view more information about the state of the shaker, including alarms, warnings, health checks, and suggested changes to the shaker. Suggested changes to the shaker can include increasing or decreasing the screen mesh, greasing motor bearings, replacing sensors, or checking basket angle actuators.

In certain embodiments, (see, e.g. FIGS. 18-28) systems according to the present invention provide tests, checks, and intelligent diagnostics specific to oil rig operational scenarios, to vibratory separator operation and, in particular aspects, to shale shaker operational scenarios which enhance oil rig safety and efficiency of oil field drilling operations, in certain particular aspects when applied to an automatically operated shale shaker with an electronic and/or computerized control system to ensure continuous and proper system availability during downhole operations. In certain systems according to the present invention failures, performance degradation and/or predicted failures are reported to service personnel that perform additional diagnostics or dispatch field personnel to replace or repair the systems as necessary.

The present invention provides a method and apparatus for remotely monitoring, analyzing and affirmatively notifying appropriate personnel of problems and events associated with an oil recovery system comprising one or more, e.g. hundreds, of oil rigs over a vast geographic area. The present invention provides a monitoring and reporting system that is referred to as a Health Check system. The present invention provides a variety of performance monitoring sensors at each oil rig in an oil recovery system, and, in certain aspects, for each shale shaker of an oil rig. The results of selected diagnostics, which are run on each oil rig and/or on each shaker, are reported to a central server. The central server automatically populates a database for the oil recovery system and displays a red/yellow/green/gray color-coded report for each rig and/or for an entire oil recovery system. The present invention also affirmatively alerts appropriate personnel of actions required to address events associated with an oil rig in an oil recovery system. The diagnostics performed at each oil rig are configurable at the individual rig. The central server need not change its reporting and display program when changes are made to a heath check at an oil rig. The present invention provides a dynamic oil rig status reporting protocol that enables construction and display of a tree node structure representing an entire oil recovery system status on a single screen. Preferably, top level information is presented on a single screen, and detailed information presented when one drills down in to other screens. Thus, the present invention enables rapid visual affirmation of a system Health Check.

A Health Check is an automated test that is running on the rig and monitoring something, e.g., but not limited to, a shale shaker or shakers, for acceptable performance, indication of problems, etc. These tests could be applied to equipments, drilling processes, or an operator's usage of particular drilling equipment, e.g., but not limited to, shaker(s). The results are then communicated to a central server located in a service center through a unique protocol, which allows automatic distribution and display of information and/or directly from a shaker to an Internet interface. A test program on a rig can be modified and that change will flow automatically through communication, storage and display of the resulting Health Check data for the rig.

The service center based web server allows secure access to Health Check results. The results are presented in "top down tree" mode with red/yellow/green/gray colors. The red color indicates the failure of a test or flagging an event of interest, the yellow color indicates that the health test has found some abnormality that may need attention, green indicates successful completion of a test, and gray color indicates inability to conduct a test. The bottom-most node of the "top down tree" contains the results of a Health Check. The workcase result is successively carried up to the next level, until topmost node (which in most cases is the drilling rig, group of rigs or oil recovery system) is reached.

Each Health Check result can be configured to generate a message (email, phone call, PDA, etc.) to alert single or multiple persons in case of test failure. The data transfer protocol is well defined, such that other development groups or third parties can easily develop Health Check tests, generate results and feed information to the central server. Test results are transferred from the rig to the server using a novel data protocol that dynamically defines the structure of the data, that is, the node tree structure of the data by the naming convention of the protocol. Thus, the results are simply stored and displayed using the structural definition provided in the communication protocol. This allows for extreme flexibility in the definition of new programs and results to run and report at oil rigs without requiring a change in the communication protocol, notification function or the display and storage functions at the central server. The bottom-most nodes in the tree structure contain test results. Each test comes into the central server as a record containing node information as to where the information fits within the tree structure, an identifier for the test, a test result (red/yellow/green/gray) and intermediate data such as error codes, operator entry data and test data description. Thus, no results processing need occur at the central server. The central server only archives and display results and issues affirmative (with acknowledgement) and regular notifications as required.

Events or conditions can be set for notification, thus, once the event or condition occurs and after it is set for notification, a notification is sent to a designated person reporting the event of condition. A list of persons can be associated with each oil rig and event or condition. A notification can be sent to a cell phone, PDA or other electronic device. A notification can comprise a text, audio or video message to a user. A notification tells the rig status color code, text, aural or video. A user can call into the central server to check the status of an oil rig or oil recovery system. The status returned is a notification message indicating that the rig is okay or that a problem or condition of interest has occurred. Thus, the Health Checks are different than alarms, although alarms (including those alarms generated by prior or legacy systems) can be used as inputs to a Health Check where the alarms are processed and considered by Health Check rather than sending an alarm immediately to oil rig personnel. Health Check may indicate that piece of equipment is out of range and should be replaced in the near future, however, supercritical alarms can be processed by Health Checks to generate an immediate notification.

In certain aspects, the present invention (and any and all steps and/or events described above for any scenario) is implemented as a set of instructions on a computer readable medium, comprising ROM, RAM, CD ROM, Flash or any other computer readable medium, now known or unknown, that when executed cause a computer or similar system to implement the method and/or step(s) and/or events of systems and methods according to the present invention, either on-site or remotely or both.

The present invention is described herein by the following example for use on drilling rigs, however, numerous other applications are intended as appropriate for use in association with the present invention.

The present invention provides a user interface, which, in one aspect, is preferably mounted to existing rig floor structure and also provides a pedestal mount with adjustable height, for convenient choke operation. A wireless version is also provided.

The present invention supports real-time two-way data communication, e.g., with Varco International, Inc.'s RigSense and DAQ JVM, and with other commercially available information systems. In one aspect any sensors whose data is used by the present invention (for control and/or display) are directly connected to the present invention, including, but not limited to, sensors on a shale shaker or shakers.

In one aspect, when the RigSense system is present in an embodiment of the present invention, the RigSense system provides data archiving and expanded data displays functionality to the present invention. The present invention provides a user interface integrated into other systems such as the RigSense system, DAQ JVM and VICIS; Real-Time Well Control, supervisory control specific to well control tasks; and Automated well control, which may be entire process or selected sub-tasks. One of the primary impacts perceived on existing products and services in which integration and/or implementation of the present invention is performed is additional capability for taking control of and/or being in control of the choking operation via a distinct intervention, so that control is clearly being exercised by users at other stations and by automated controllers.

A key factor for efficient utilization and integration of the present invention into the operator's working environment is the present invention's provision of manual controls for high-frequency user control actions in lieu of touch screen control consoles. Additional automated functionality is provided such as automatic pressure-set control for use in association with the touch screen and provides benefit in the control area, particularly in emergency stations. In an alternative embodiment a touch screen user interface is provided.

In another embodiment, the present invention is implemented as a set of instructions on a computer readable medium, comprising ROM, RAM, CD ROM, Flash or any other computer readable medium, now known or unknown that when executed cause a computer to implement a method of the present invention.

The present invention provides a method and apparatus for remotely monitoring, analyzing and affirmatively notifying appropriate personnel of problems and events of interest associated with an oil recovery system comprising one or more, e.g. hundreds, of oil rigs over a vast geographical area or a single rig. The present invention provides a monitoring and reporting system that is referred to as a Health Check system. The present invention provides a variety of performance, process and equipment monitoring Health Checks and equipment sensors at each oil rig in an oil recovery system. The present invention provides a dynamic oil rig status reporting protocol that enables population and display of a tree node structure representing an entire oil recovery system or single oil rig status on a single screen. Thus, the present invention enables rapid visual or aural affirmation of a system Health Check.

Health Checks are not the same as alarms. An alarm is an immediate notification to an operator that a known unacceptable condition has been detected, requiring the operator's awareness of it and often some action by the operator. A Health Check may use alarms in its logic, but it is by nature different than an alarm. A heath check is more general and more diagnostic than an alarm, and does not require immediate action, at least not on the oil rig. In the present invention, a problem is reported to a central server for reporting and diagnosis to service personnel. A Health Check can apply to any equipment component or process, sensors, control systems, operator actions, or control processes, etc.

The Health Check system comprises software containing test logic. The logic is configurable so that inputs, outputs and logic can be selected by a user to test and look for any condition or event associated with an oil rig or oil recovery system. The overall system in certain aspects comprises Health Checks running in real time on a computer at an oil rig and a communications network connecting the oil rig to a central server to move data from the rig of a group of rigs to the server. The server displays the results in hierarchical form. The server sends commands, application programs and data to the rig from the server.

The Health Check system of the present invention further comprises, in certain aspects, a central database populated with dynamic status reported from oil rigs comprising an oil recovery system. The present invention further comprises a web page display for efficiently displaying Health Check results associated with a test, a rig, an area or an oil recovery system. The web page results can be displayed on a computer, cell phone, personal data assistant (PDA) or any other electronic display device capable of receiving and displaying or otherwise alerting (e.g., sound notification) a user of the status of the data. The preferred screen is a color screen to enable red/green/yellow/gray display results. Results can also be audio, video or graphically encoded icons for severity reports, e.g., an audio message may state audibly, "situation green", "situation red" or "situation yellow" or display a particular graphical icon, animation or video clip associated with the report to demonstrate a Health Check severity report. The present invention enables drilling down (that is, traversing a hierarchical data structure tree from a present node toward an associated child or leaf node), into a tree of nodes representing diagnostic status, to a node or leaf level to access additional information regarding a color-coded report.

The present invention also provides a notification system to immediately inform service personnel of problems as necessary, such as a message or email to a cell phone or pager or computer pop up message. There is also a receipt affirmation function that confirms that a notification message was received and acknowledged. Secondary and tertiary notifications are sent when a primary recipient does not acknowledge an affirmative notification within a configurable time limit. A severity report associated with a given problem is represented by a blinking color when it is unacknowledged and remains a blinking color until the given problem is cleared and returns to green or clear status. Severity reports once acknowledged change from blinking to a solid color. Reports that have been acknowledged by one user may be transferred or reassigned to another user upon administrative permission by a system supervisor or by requesting permission to transfer a second user and receiving permission from the second user. A system supervisor can also display a list of users and severity reports being handled by the user, that is, a list of acknowledged and in progress severity reports assigned to a particular user to view and enable workload distribution to facilitate reassignments for balancing the work load.

A dispatch may assign a work order to a group of particular severity reports. Once the work order is completed the system checks to see if the nodes associated with the work order have been cleared. The work order provides a secondary method for determining if nodes associated with a work order have been cleared after a work is complete. The system administrator software program can also automatically check the work order against the node state for a system check.

The advantages provided to the customer of a preferred Health Check system are substantially less down time due to the present invention's Health Check's ability to find or anticipate problems earlier and fixing the problems faster, ideally before the customer becomes aware that a problem has occurred. The present invention reassures the customer that the Health Check system is always on the job and monitoring and reporting on the oil recovery system twenty-four hours a day, seven days a week. A customer or system user can always call in and confirm the status of an entire oil recovery system or single rig with a single call to the central server or a rig and receive a situation report, that is situation red, yellow, green or gray for the oil recovery system or single rig, as requested. The present invention enables more efficient use of operational service personnel. The present invention finds and reports problems, potential problems and trigger events of interest, which enables rapid response and recovery in case of actual and/or potential equipment or operator malfunctions or the occurrence of a particular event. The present invention also helps to find problems at an early stage when the problems are often easier to fix, before catastrophic failure, thus creating less impact on the customer's oil recovery system or individual oil rig. Health Checks according to the present invention provide a method and apparatus for providing an application program that acts as an ever-vigilant set of eyes watching an entire oil recovery system or single rig to ensure that everything is okay, that is, operational.

In certain embodiments, all results for each oil rig in an oil recovery system or individual oil rig or equipment, e.g., but not limited to, a shaker or shakers, are worst-case combined so that the worst-case severity report bubbles to the top of the reporting tree and is reported as the status for an entire oil recovery system, oil rig(s), event of interest, process, or equipment being analyzed. As discussed above, red is a worst-case severity report, followed by yellow severity report and then green is the least severe report. Gray indicates no data available. Thus, if one or more tests reporting a red status is received from an oil rig, the red status bubbles up past all yellow and green status reports and the status for the rig and the entire oil recovery system in which the rig resides is shown as red. Once the red report is cleared, yellow reports, if any, bubble up and the status of the oil recovery system, rig or equipment being viewed is shown as yellow, if a yellow report is in a node tree transmitted from any oil rig in an oil recovery system. The status for a single oil rig bubbles up the worst-case report as well, however, localized to the single rig or rigs under investigation, unless grouped. When grouped the worst-case status for the group is reported. For example, if three rigs were reporting the following scenario is possible: Rig 1 reports red, rig 2 reports yellow and rig 3 reports green. The status for a group selected to include rigs 1, 2 and 3 would be red. The status for a group selected to include rigs 2 and 3 would be yellow. The status for a group selected to include rig 3 only would be green. Subsections within a rig can also be selected for a color-coded status report. Preferably, the gray is not cleared. Usually, if the test were not conducted for any reason, the status would take gray color.

The present invention enables testing at the nodes of a bottom up tree structure representing an oil recovery system, a single rig therein, or an equipment in an oil rig, wherein the nodes carry the results to the top for easy visualization and use. The present invention also provides a dynamic reporting protocol for data transfers from an oil rig to a central server wherein level identifiers are provided to transfer data and its structure in a single packet transfer, thus enabling dynamic data base population and display of reports from an oil rig. The results are presented on a web page or reported to cell phones, computers, pagers, personal data assistants or otherwise affirmatively reported other wise to appropriate personnel. In a preferred embodiment, reports are acknowledged by a first recipient or a second recipient is selected for receipt of the report when the first recipient does not acknowledge receipt, and so on, until a recipient has received and acknowledged the report. Alternatively multiple recipients may simultaneously get the notification.

The present invention is automatically scaleable and extensible due to the modular and dynamic nature of its design. Tests can be easily created, added or deleted and parameters added or modified on an oil rig equipment test or Health Check without reprogramming or changing the central server's database population, data reporting and data display applications. The reporting can vary between broad coverage and specific coverage, that is, a status report can included data for an entire oil recovery system comprising over 100 oil rigs and/or specifically report status for a single oil rig of interest concurrently.

The present invention provides early warning of potential and actual failures and also provides confirmation of product performance and usage. A set of automated Health Checks and diagnostic tests is selected to run in real time on an oil rig. Status from the test is reported continuously via a communication link between the oil rig and a central server. The present invention provides insight and analysis of equipment, processes and equipment usage on an oil rig. The present invention monitors alarms and parameter limits to assess necessary action and perform affirmative notification of appropriate personnel.

The present invention provides quick response, real-time monitoring and remote diagnostics of the automation and control systems running on oil rigs comprising a fleet of oil rigs or an oil recovery system to achieve maximum rig performance while maintaining optimum personnel allocation. A service center is connected to the oil rigs through an Internet based network. System experts make real-time data and logged data from the oil rigs available for perusal and analysis in a central facility or at distributed locations. The web site of the present invention provides access to current operational status as well as to historical operation and performance data for each of the rigs comprising an oil recovery system.

Health Check tests are configurable so that new tests can be created, added or deleted and parameters changed for execution at an oil rig without the necessity of programming. A simple user interface is provided wherein a user at the central server or at an oil rig can select a test from a library of existing tests, or create a new test using a scripting language, natural language interface or pseudo language is provided which generates a script defining inputs, outputs and processing logic for a test. The script is compiled and sent to the rig for addition to existing Health Checks running on the rig. The user interface also enables modification or addition and deletion of parameters associated with a Health Check or test.

Notifications can be an immediate message when a problem is detected or an advisory notification. The notification is sent to expert service personnel associated with the central server or can be directed to a service manager or local service person closest to the rig needing service. For each rig and problem type, a particular person or service personnel category is designated for receipt of a notification. Secondary and tertiary backup personnel and personnel categories are designated as a recipient for each notification. Affirmative notifications must be acknowledged by the recipient so that the problem is acknowledged and someone has taken responsibility for the problem. If an affirmative notification is not acknowledged within a configurable time period, then a secondary or tertiary recipient is notified until the problem is acknowledged. Reliability reports are generated by the present invention showing performance summaries for oil rigs, comprising up time, response, problems detected and solutions provided. These reports provide an objective basis for formulating an evaluation of the Heath Check system's efficiency.

The results from a rig include processed inputs from the rig. No processing is required at the central server, other than display, storage and alerts to appropriate personnel. The oil rig Health Checks and tests are configurable so no programming is required to implement a new test or change logic or parameters for an existing test. A field engineer or central server personnel can add a new test without requiring a user to perform a programming change. The present invention provides a local or remote user interface, which provides a simple interface for describing a test and logic. The interface comprises an iconic presentation, pseudo language, script or a natural language interface to describe a test's input(s), processing logic and output(s). The user interface interprets a user's inputs and converts the user's input into a scripting language. The script language is compiled and sent to the rig on which the new or augmented test is to be performed. The new test is added to a library of tests from which a user may choose to have run at a rig. Test modules can be deleted, added, parameters changed, and updated from the oil rig, the central server or from a remote user via a remote access electronic device.

Figure 18:
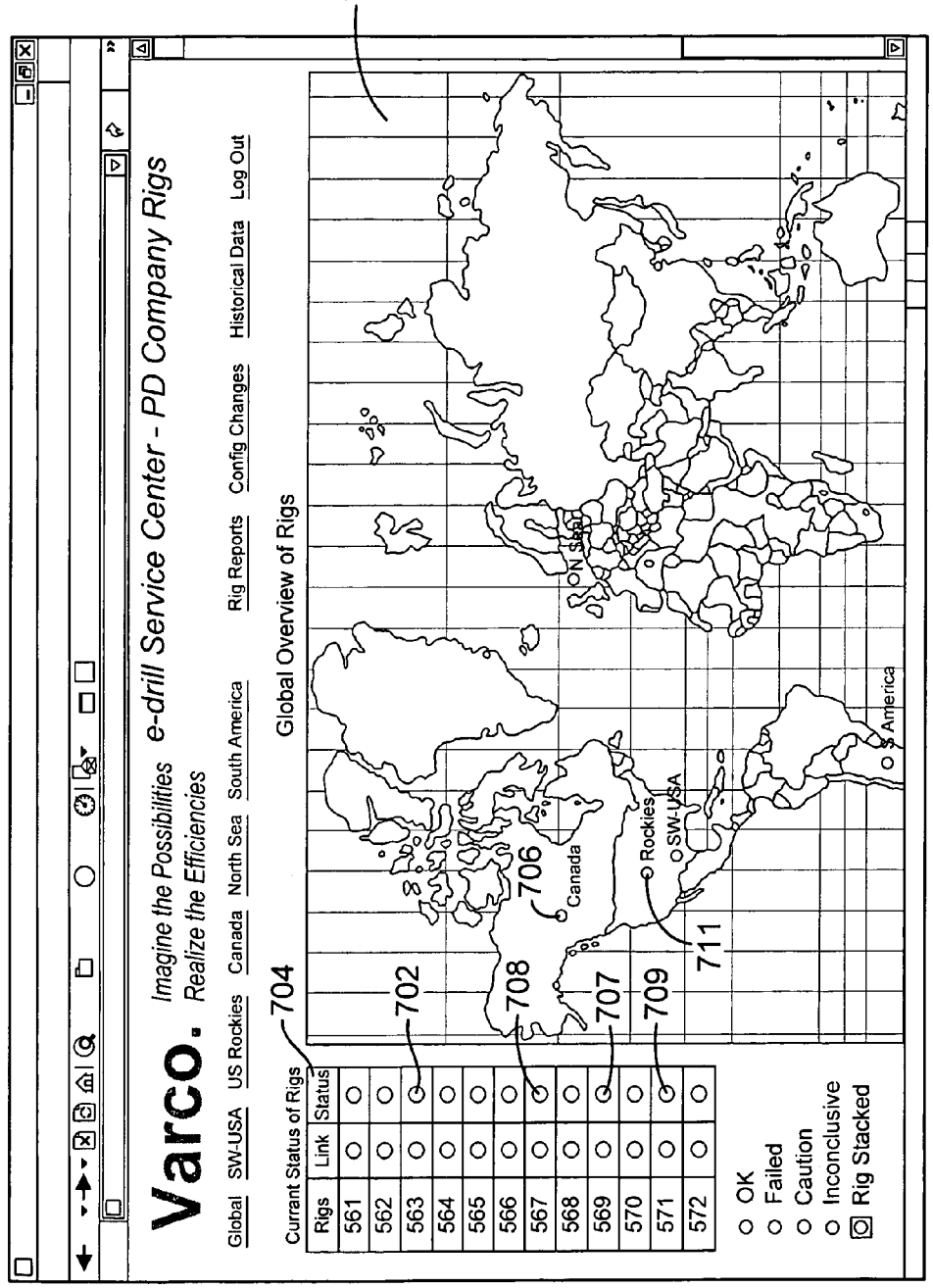
FIG. 18 is an illustration of a preferred status display for an oil recovery system showing status for individual rigs and aggregated worst-case status for geographical areas.
Figure 19:
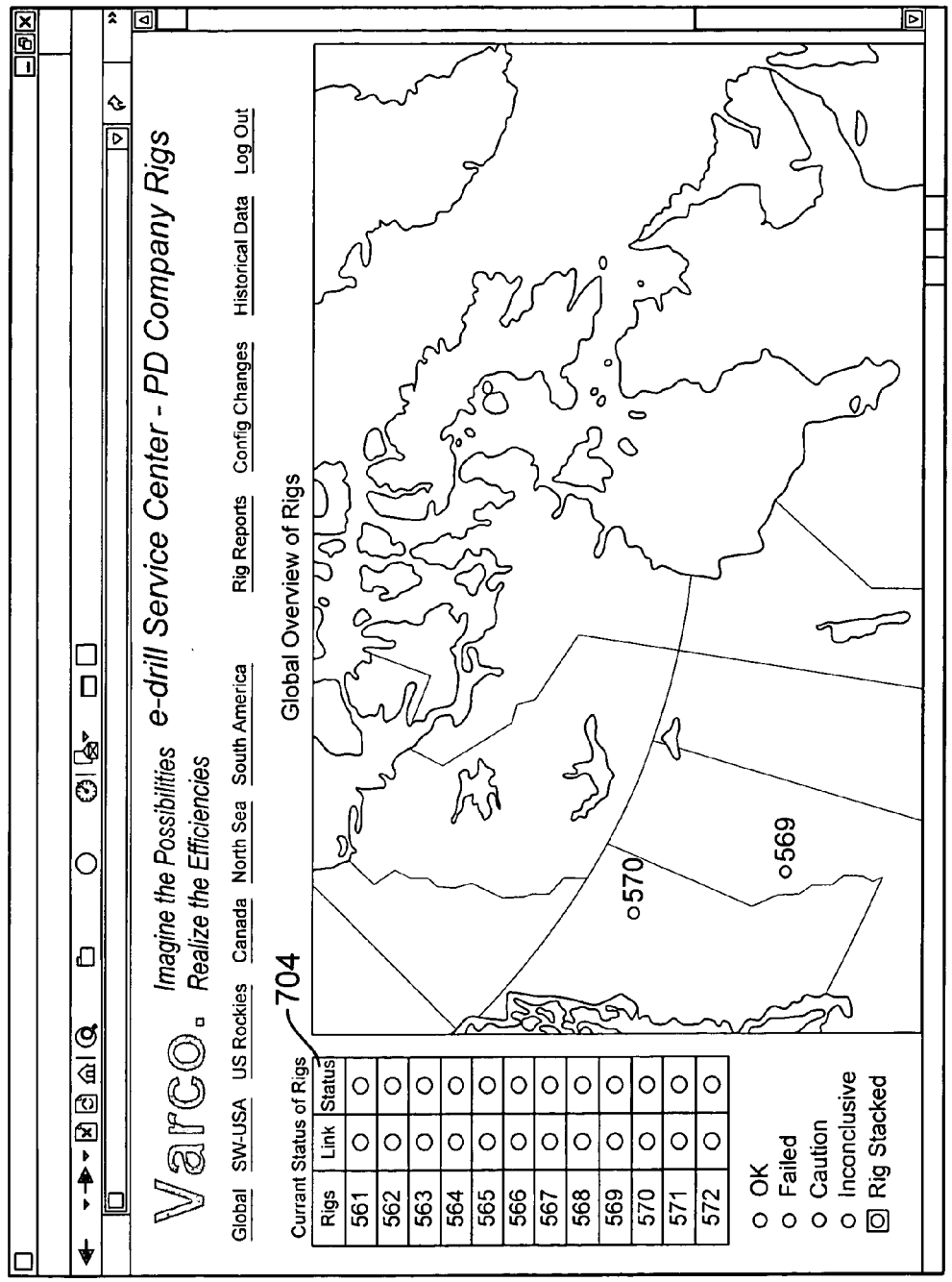
FIG. 19 is an illustration of a preferred status display for an oil recovery system showing status for individual rigs and aggregated worst-case status for a smaller geographical area including Western Canada.

Turning now to FIG. 18, a preferred embodiment of the present invention is shown illustrating a global overview 200 of all rigs comprising an oil recovery system. As shown in FIG. 18, a map pinpoints geographic locations of the rigs in the system of interest. A web page display is presented on a personal computer or PDA. The web page generated by the central server presents a geographic view of an oil recovery system. In FIG. 18, rig number 563 (70)2 and rig number 569 (707) are shown with a red status, indicating that a condition or reporting event of interest has occurred at rig number 563 and number 569. Rig number 569 (706) is in Canada and rig number 563 (711) is in the United States. Rig number 571 (709) has a yellow status and rig number 567 (708) has gray status. All other rigs shown in FIG. 18 have a green status. When a system user clicks on rig number 569 (707) or the Canadian region, the display of FIG. 19 appears. FIG. 19 shows the Canadian region, which includes rig number 569. Notice that rig number 570 has a green status is now displayed on the more detailed Canadian region display. The green status geographical indicator for rig number 570 is suppressed and not shown in the broader display of FIG. 18 so that the more severe red status of rig number 569 would be immediately visible and evident on the display of FIG. 18. Once a user implicitly acknowledges the red status for rig number 569 by clicking on rig number 569, the present invention displays the less severe status of rig number 570. Thus, the more severe status of rig number 569 bubbles up in the geographical display and is displayed first at a higher level in the geographical display hierarchy. Note that the green status indicator of rig number 570, however, is shown in the panel 704 of FIG. 18 and FIG. 19. Thus, the present invention presents a hybrid display in which all Health Check results are available in the panel 704, but worst case results are presented in the geographical displays of FIG. 18 and FIG. 19.

Turning now to FIG. 20, the status display 724 of FIG. 20 for rig number 569 is shown when a user clicks on rig number 569 in FIG. 18 or FIG. 19. FIG. 20 illustrates that a rig number 569 component, "RigSense" has a red indicator. The Magnifying Glass icon 722 shown adjacent red indicator 730 indicates that more information is available regarding the red indicator 730. Notice that there are also additional panel displays 716 and 718, which are configurable, which perform additional informative functions. A summary panel 720 is displayed for rig number 569. The summary status panel contains operator reports from the oil rig. These operator reports are useful in diagnosing status and formulating a plan of action or notification. An AutoDriller status panel is also displayed. Note that the Weight on Bit (WOB) indicator 717 is red in the AutoDriller status panel. A driller adjustable parameters panel 718 is also displayed.

Figure 21A:
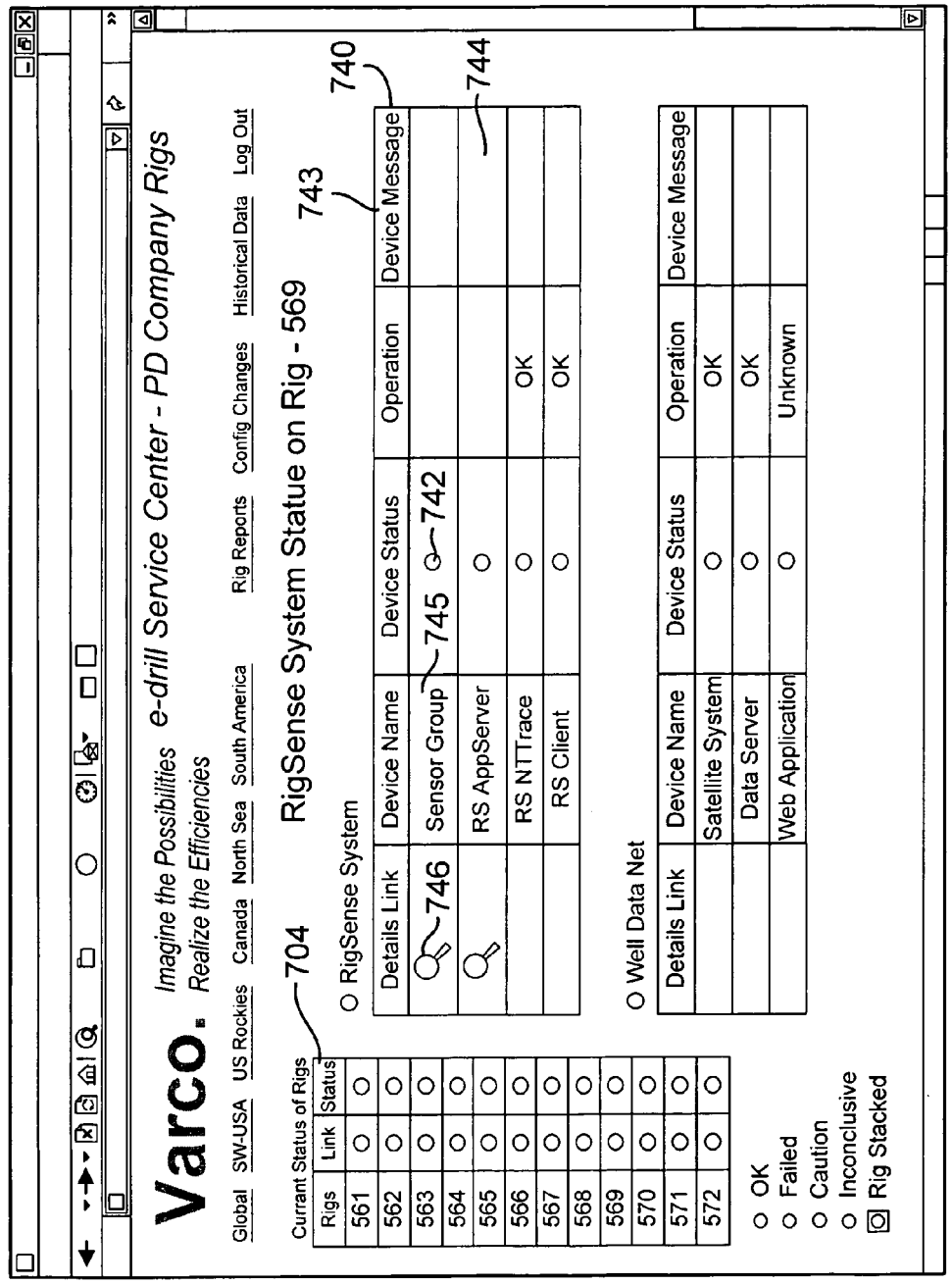
FIG. 21A is an illustration of a preferred status display for an oil recovery system and a sub status for an individual rig.

Turning now to FIG. 21A, continuing with rig number 569, clicking on the red indicator for RigSense status in FIG. 20, brings up the display for the RigSense system panel status 740 as shown in FIG. 21A. Note that the device message block 743 may contain a part number to expedite repair of a failure as reported. The particular part number and or drawing number necessary to perform a given repair associated with a given problem or severity report may be difficult to find in a vast inventory of parts and part numbers and drawings associated with a given failure. Otherwise, the recipient of a failure report may have to search via key words through a vast inventory of parts, part numbers and drawings associated with a given failure. Moreover, the user may not be familiar with a particular vendor's part numbering system, thus, provision of the part number is a valuable expedient to trouble shooting.

FIG. 21A shows that the sensor group device status 742 is red with a Magnifying Glass icon 746 indicating that more information is available for the red sensor group device status indicator 742. In an alternative embodiment, as shown in FIG. 21B, a pop-up message 746a appears along with the Magnifying Glass stating "Click on Magnifying Glass for more details." Clicking on the red sensor group 744 device Magnifying Glass 746 brings up the display 750 of FIG. 22, showing a detailed status for the sensor group device status. Note that there are two red indicators shown in FIG. 22 for device status in the sensor group as follows: "Pump 3 Stroke Count Sensor" 756 and "Hookload Sensor" 754. Note that the Pump 3 red device status indicator has an informational comment 752 in the operation column of the display of FIG. 22, stating "Intermittent Loss of Signal." The Hookload Sensor red device status indicator present an adjacent Magnifying Glass icon 758 with a message indicating that more information is available for the device status of the Hookload sensor by clicking on the Magnifying Glass icon. Clicking on the Magnifying Glass indicator 758 for the Hookload sensor brings up the Hookload sensor panel 766 of FIG. 23, which shows that the device name "Barrier" 760 had a red device status indicator 762. The red device status for the Barrier displays an Operation message 764, stating, "Excessive ground current". Each colored indicator and accompanying operation message shown in the preferred displays illustrated in FIGS. 18-23 appeared in line of the Health Check performed at an oil rig and sent to the server in the structured protocol of the present invention.

Figure 26:
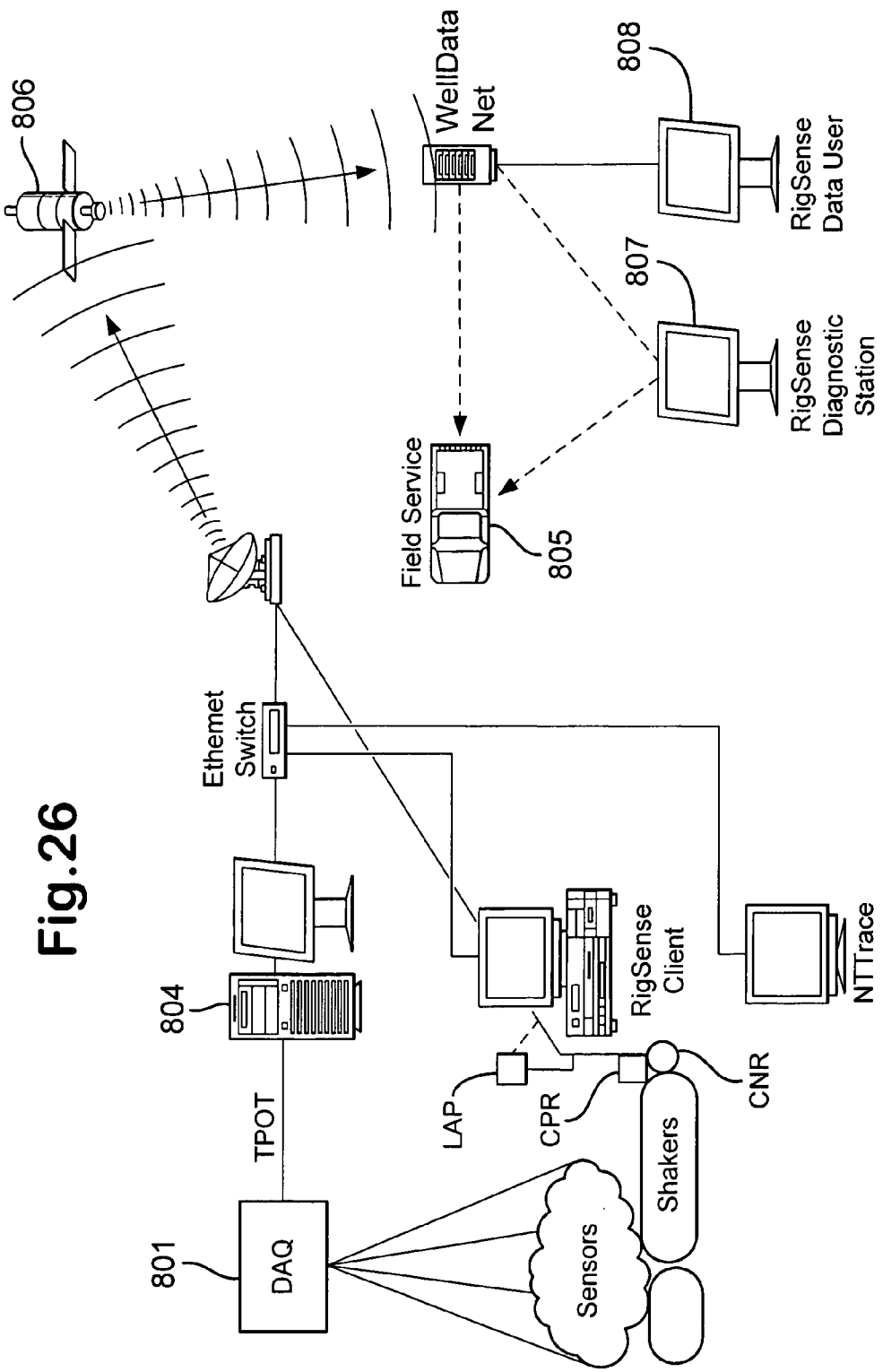
FIG. 26 is an illustration of a preferred health check system reporting health checks from an oil rig to a user via satellite.

FIG. 24 illustrates a Driller Adjustable parameters display 710 with two red indicators showing that Drill Low Set Point 712 and Upper Set Point 714 are Outside Range. A Drilling Tuning parameters panel 716 is also displayed. Both panels indicate the current value, changed indicator and outside range indicator for each parameter displayed in the respective panels of FIG. 24. The display of FIG. 24 is an alternative tabular display for rig status for a single rig. FIG. 25 illustrates a configuration or driller adjustable parameters status panel 810 for rig numbers 178-189. The display of FIG. 25 is an alternative tabular display for rig status for plurality of rigs, e.g., rigs 178-189. Turning now to FIG. 26, a data acquisition system 801 is shown in an oil rig environment connected to a plurality of legacy or Heath Check sensors ("SENSORS") which, in certain aspects, include sensors on a shaker or shakers, which gathers data from the group of sensors monitoring the rig equipment, parameters and processes. The data acquisition system 801 sends the acquired data from the sensors to a computer 804 on which the preferred Health Check application of the present invention is running. The application of the present invention performs Health Checks logic on the acquired data and reports the results in the structured protocol to a user via satellite 806 or some other form of electronic communication. A user may monitor health check status and receive notifications via an electronic receiver 808, diagnostic station 807 or mobile in field service vehicle 805. Alternatively the shaker(s) may have a direct connection from a shaker computer CPR to the data transmission system.

The present invention is also useful for Process Monitoring, that is, to determine that equipment is being used properly to perform a designated process. For example, if rig operators are using an "override" during a certain system state indicative of a certain process, which is supposed to be run automatically rather than manually overridden, the present invention can perform a health check to detect this event of interest and report it to the central server. Knowledge of this occurrence enables central server personnel to detect and correct the inappropriate action of the operators. Moreover, the test to detect the inappropriate override stays in the system so that if new operators recreate the problem or trained operators backslide into using the manual override inappropriately, the central server personnel will be notified so that the problem can be address again. Thus, the Health Check system builds a cumulative base of operational checks to insure that a process on a rig or oil recovery system runs in optimal fashion.

Figure 27:
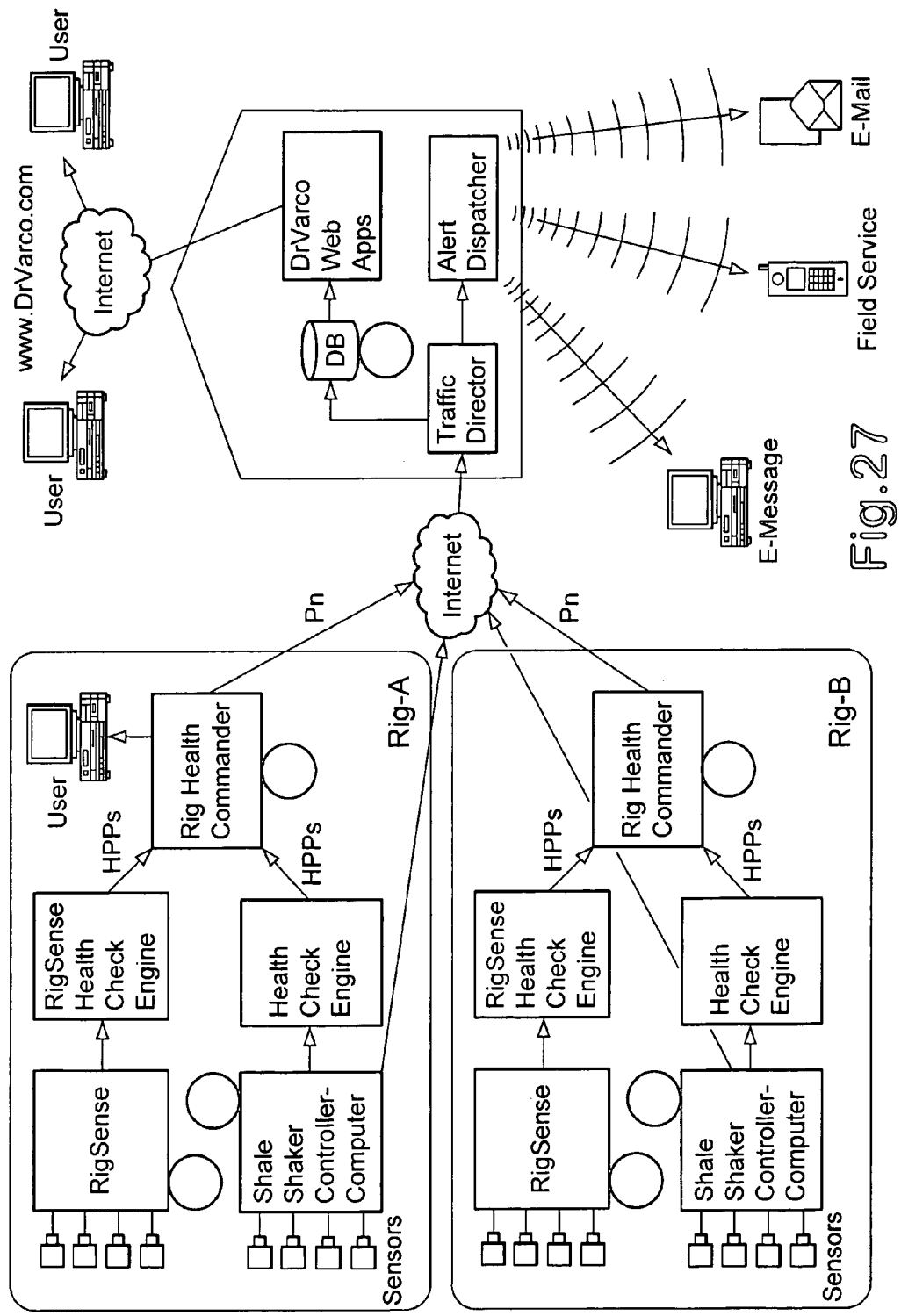
FIG. 27 is an illustration of a preferred health check system reporting health checks of multiple equipments, processes or systems from multiple oil rigs to a multiple users.

Turning now to FIG. 27, FIG. 27 is an illustration of a preferred Health Check system reporting health checks of multiple equipments, processes or systems from multiple oil rigs to multiple users. It is to be understood that any equipment's, device's, or apparatus's controller or associated computer may be employed for the system as shown in FIG. 27, but the specific item shown schematically is a controller and/or computer for a shaker. As shown in one aspect the shaker controller and/or computer is in communication with a Rig Health Commander, a Health Check Engine, and a user. Optionally, the shaker controller and/or computer can be in direct communication via the Internet or a similar network with another entity, device, and/or user.

Figure 28:
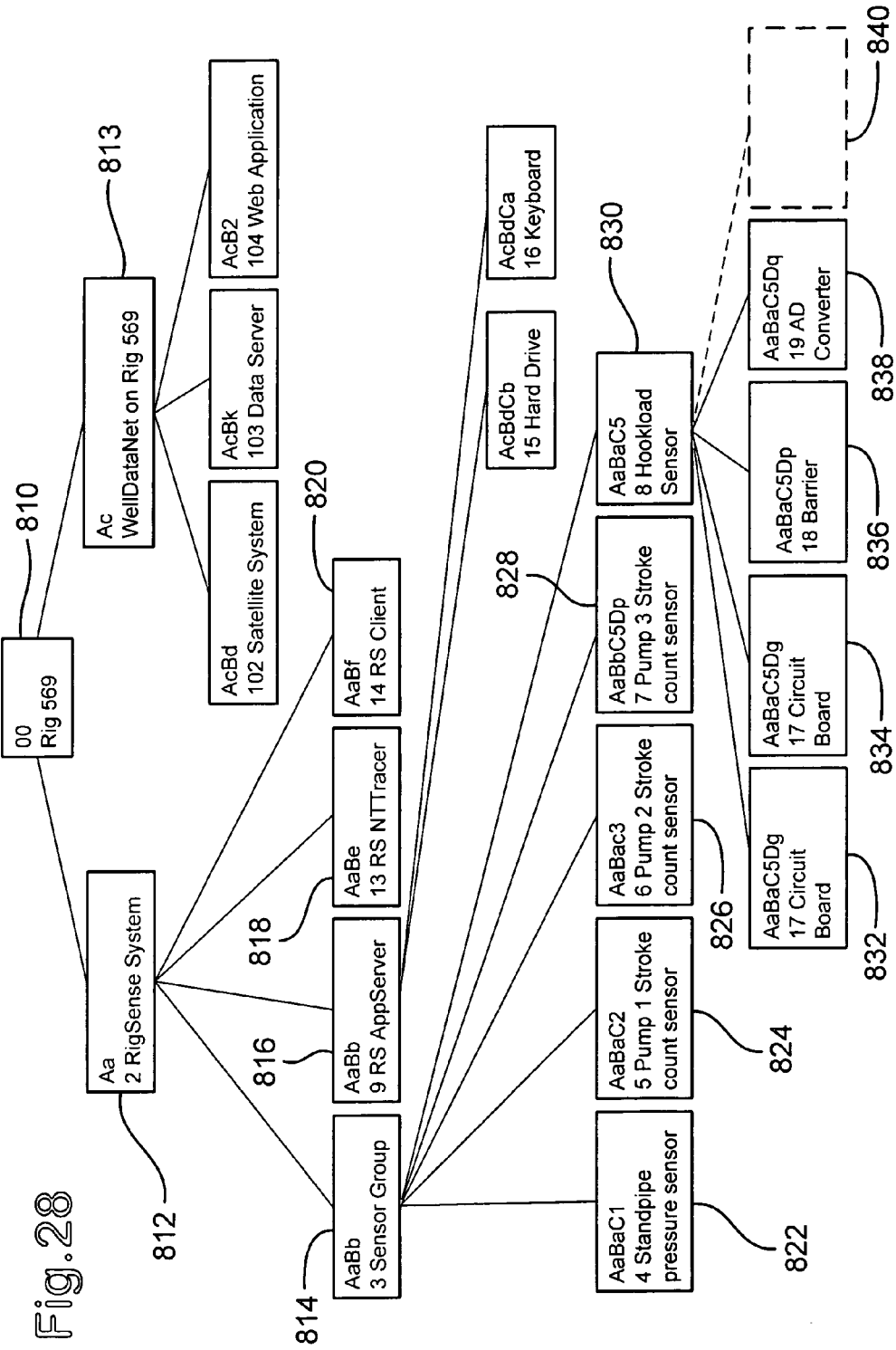
FIG. 28 is an illustration of a preferred protocol which defines an event reporting data structure for data base population and display.

Turning now to FIG. 28, the results of the tests are reported to the central server in a special protocol that contains heath check results data and describes the manner in which the data is constructed so that the data can be placed in a logical data structure or tree format and displayed. Note that the root node 810, usually an oil rig has a designation of "00". The first level of nodes 812, 813 etc. under the root node are named Aa, Ab, Ac, Ad, etc. Each subsequent layer of node is named with the name of the parent node followed by a designation of the current node. For example, as shown in FIG. 28, for a rig number 569, the root node 810 is named "00", the first level of children nodes under the root node are named Aa 812 and Ac 813. The children of node Aa 812 are named AaBa 814, AaBd 1116, AaBe 818 and AaBf 820 as shown. The children of child node AaBa are named AaBaC1 822, AaBaC2 824, AaBaC3 826 and AaBaC4 828. The children of node AaBaC5 830 are named AaBaC5Dg 832, AaBaC5Dp 834, AaBaC5Dq 836 and AaBaC5Ds 838. A new test could be added to rig 569 number and the Heath Check status could be reported under node AaBaC5Dx 839.

Changes to the Health Checks running on any or all rigs does not require changes to the display or data base population application because the preferred communication protocol defines the data base layout and display layout. The leaf nodes of the tree structure represent Health Check results. Each node contains a test identifier, test result (red/yellow/green/gray), intermediate data, user-entered data and test description. Trouble shooting comments are provided at the central server based on reported errors. Test error codes are included in the node so that messages associated with the error codes are displayed to the appropriate user. Alternately, trouble shooting and other information can also be generated and appended to the results of the tests at rig site. Thus, no processing to determine rig status is done at the central server. Notifications are sent when deemed necessary by the application. Notification logic is configurable by service personnel at the central server or at the oil rig. Notification logic dictates that notifications are sent when an event occurs and the event has been selected for reporting as a notification to a user. The notification logic and a list of appropriate notification recipients in order of priority, that is, who to contact first, is retained at the central server. The event can be a report on an equipment status, process execution or an operational item. A user can check in with the central server of present invention to obtain a real time report of the status of an oil rig or multiple oil rigs. The requesting user will receive a severity report message indicating the status of the rig, for example, "okay" or "red/yellow/green/gray."

FIGS. 29-32B illustrate computer screen displays for one embodiment of a control system for shakers and methods of their use according to the present invention.

Figure 29:
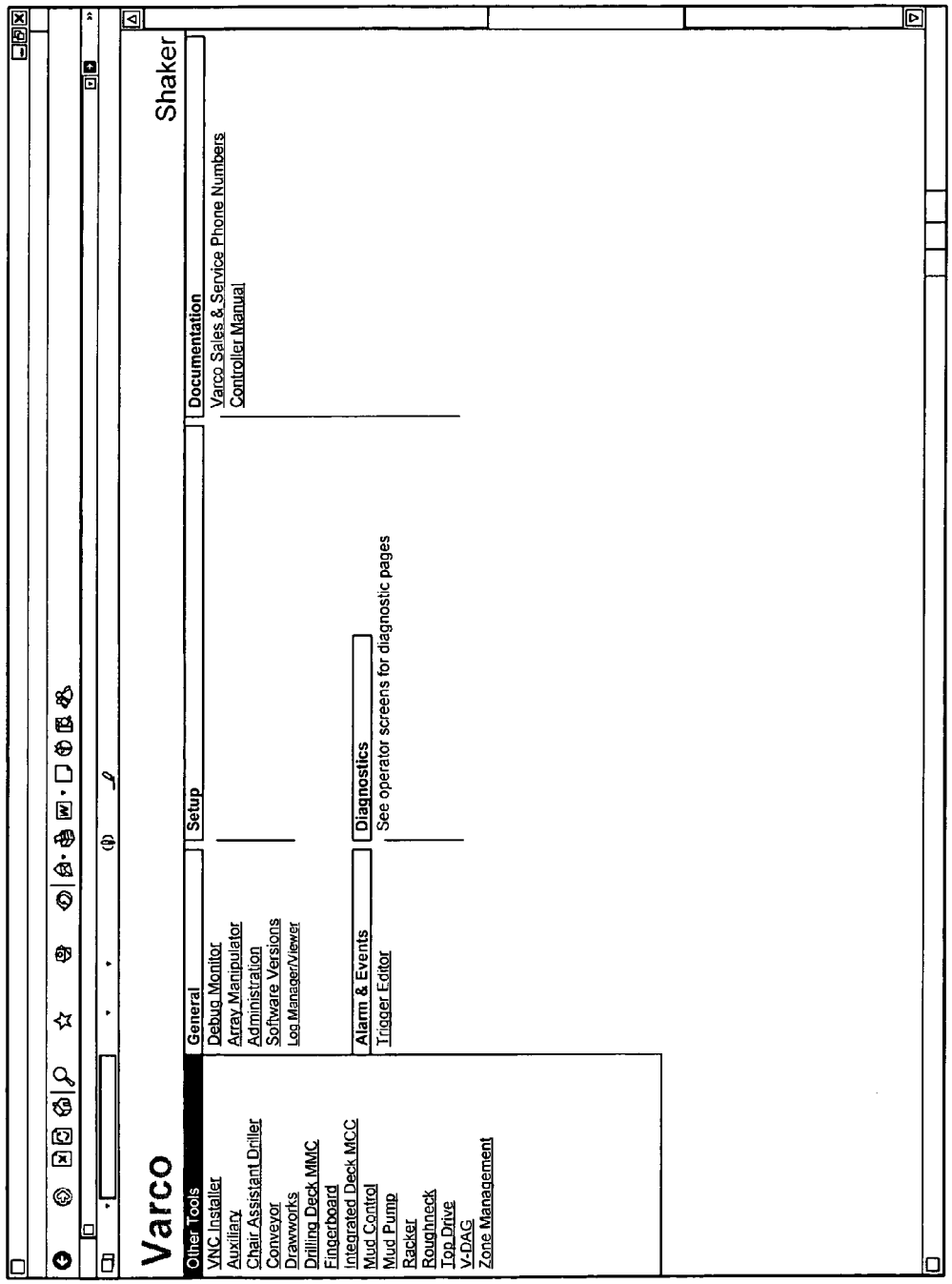
FIG. 29 is a screen display for a system according to the present invention.

FIG. 29 shows a display screen provided by a server, e.g. a web server on a computer on a shaker (e.g. like the computers 530, 630 and the shale shaker computer controller in FIG. 27). When this computer is connected to and in communication with a rig control system, interfaces with the rig control system are identified as "Alarms & Events," "Diagnostics," and "Documentation." From the "General" column, an operator can go to any of the five listed choices. Choosing "Debug Monitor" leads to a display screen as in FIGS. 32A and 32B that allows a user to monitor and modify shaker program variables. Choosing "Administration" leads to a display screen as in FIG. 30. "Array Manipulator" leads to a screen that shows the array of input/output channels. "Software versions" leads to a screen that displays the current software version. "Log Manager/Viewer" leads to a screen that allows the user to view and delete system log files.

Figure 30:
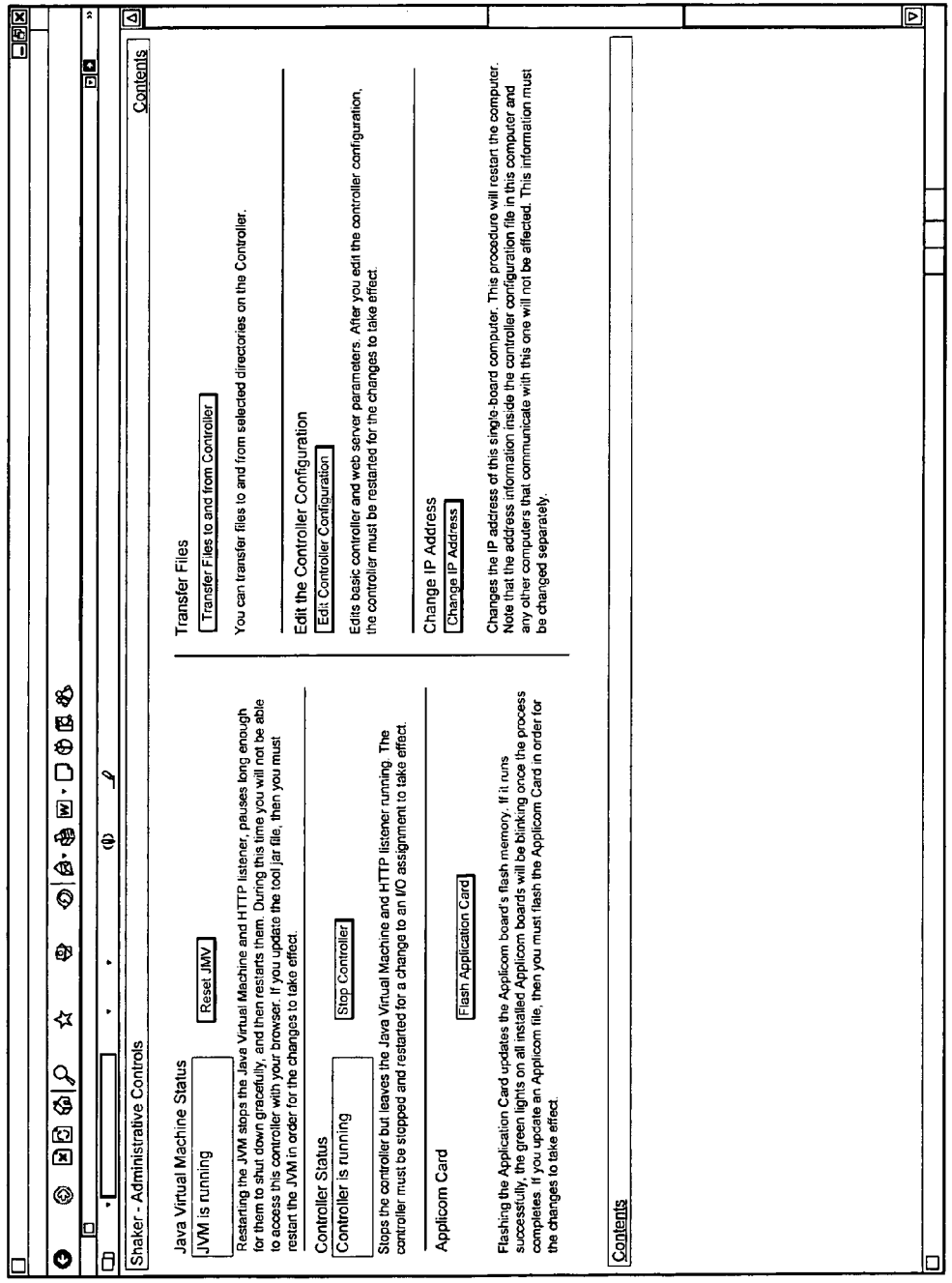
FIG. 30 is a screen display for a system according to the present invention.
Figure 31:
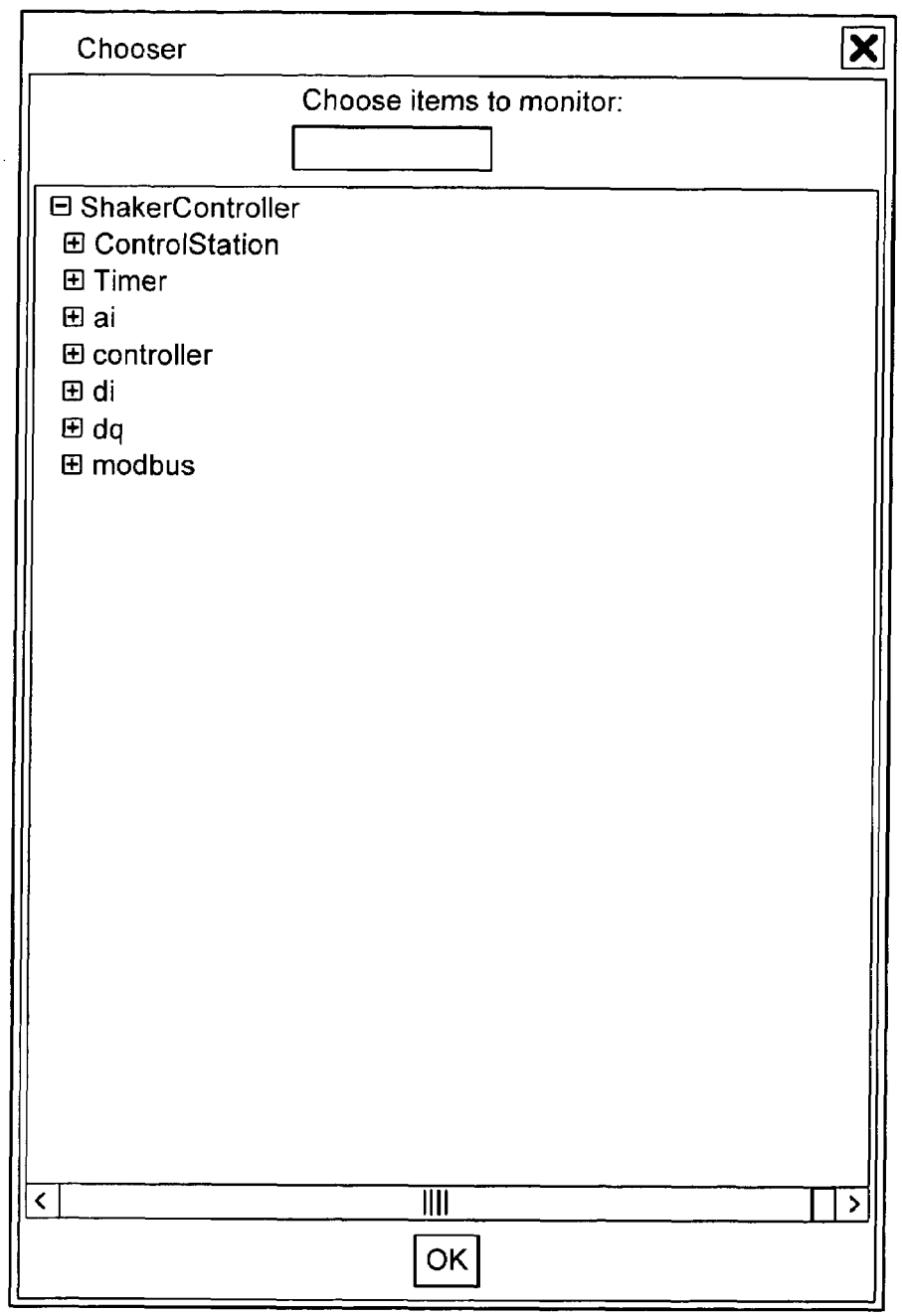
FIG. 31 is a screen display for a system according to the present invention.

The display screen of FIG. 30 (displayed by clicking on the "Debug Monitor" line, FIG. 29) illustrates a variety of administrative checks and tasks that can be done related to the shaker computer. "Restart JVM" is chosen to restart the computer software operating system on the shaker computer. The shaker control program is stopped by choosing "Stop Controller." This screen lets a user choose which parameters and variable are viewed (e.g. in screens like screens in FIGS. 32A and 32B). The general state of the shaker is displayed by choosing "ControlStation." Choosing "Timer" displays timer variables and states. The "ai" screen displays analog input variables and states, e.g. from the ultrasonic transducers, the measured distance to fluid on the screens. Controller variables and states are displayed by choosing "controller." Digital input variables and states [e.g. signals from a shaker's variable frequency drive] and those effected using user push buttons and switches (e.g. as in FIG. 14) are displayed by choosing "di." Digital output variables, e.g. valve opening and closing signals and signals to a VFD to run fast or fun normal, are displayed by choosing "dq." Parameters and variables of the protocol used to send and receive information is displayed by choosing "modbus."

Figure 32A:
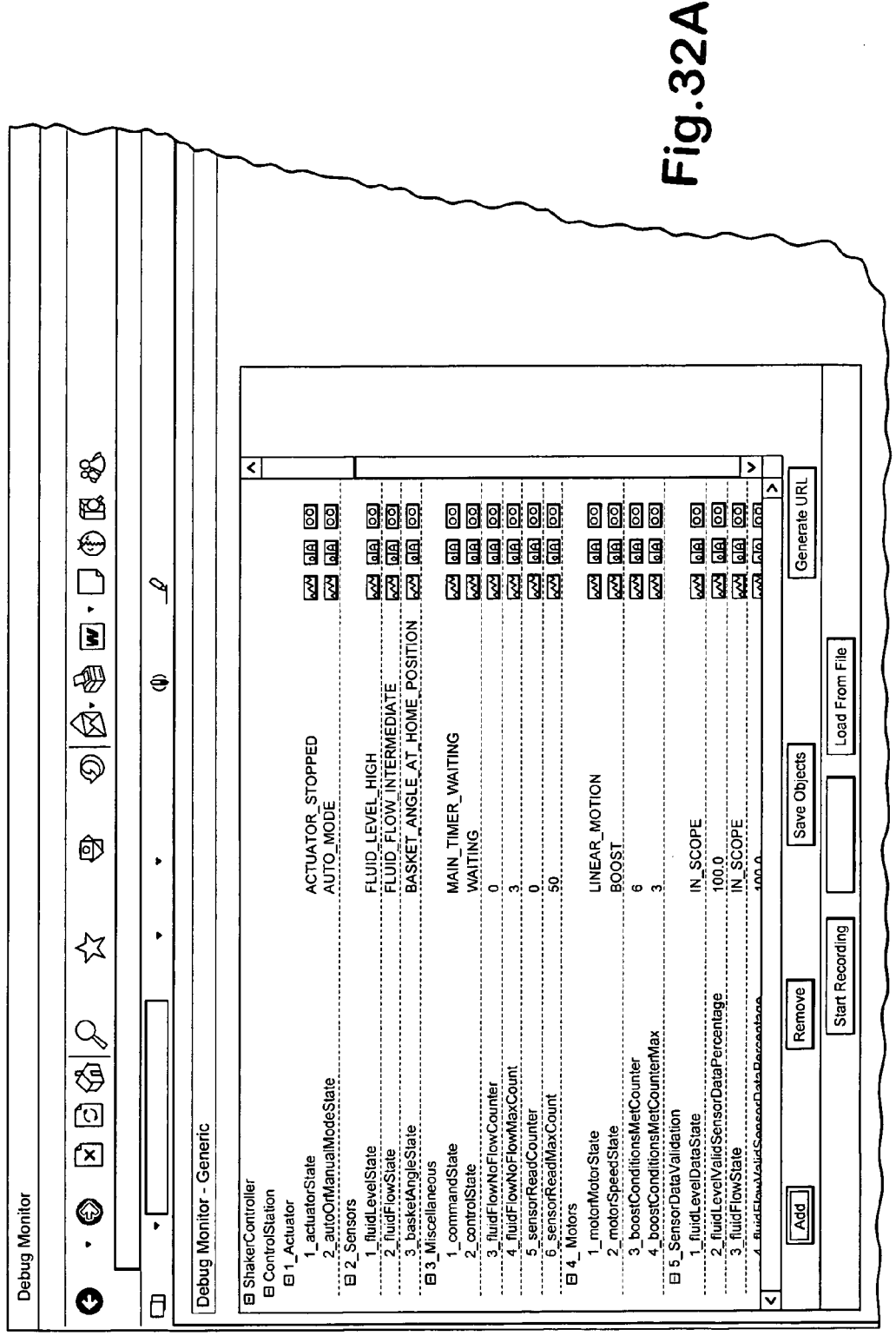
FIG. 32A is a screen display for a system according to the present invention.

In FIG. 32A the entries indicate the following:

| Entry | Indication |
| --- | --- |
| actuatorState | state of actuator (e.g. 636, FIG. 14)—moving up, moving down, stopped |
| autoOrManualModeState | auto control or user control of basket angle |
| fluidLevelState | pool depth on screen relative to desired position—high, low, desired |
| fluidFlowState | relative fluid flow rate onto shaker screens |
| basketAngleState | basket angle—home position, intermediate, high |
| commandState | command output sent to actuator system—main timer waiting, null, actuator moving up, actuator moving down |
| controlState | state of sensor reading timer cycle—waiting, reading |
| fluidFlowNoFlowCounter | number of consecutive times fluid flow sensor has measured a no-flow |
| fluidFlowNoFlowMaxCount | preset number of consecutive times flow sensor must measure no-flow before basket angle is moved to fully uphill position to prepare for next fluid rush |
| sensorReadCounter | current number of times sensors have been read |
| sensorReadCounterMaxCount | number of sensor readings to take, filter, and return a signal value |
| motorMotionState | current shaker motion—linear, elliptical, circular |
| motorSpeedState | speed of shaker motors—normal, boost |
| boostConditionsMetCounter | number of consecutive times boost conditions have been met |
| boostConditionsMetCounter Max | number of consecutive times boost conditions must be met before motor speed is automatically boosted |
| fluidLevelDataState | indication whether sensor reading are within expected range—in scope, out of scope |
| fluidLevelValidSensor DataPercentage | indicates % of sensor reading within expected range |
| fluidFlowDataState | whether sensor readings are within expected range—in scope, out of scope |
| fluidFlowValidSensor DataPercentage | indicates s$ of sensor reading within expected range |

In FIG. 32B, the entries indicate the following for each of three different sensors (ultrasonic transducer apparatuses):

| Entry | Indication |
| --- | --- |
| deadband | distance above or below desired value that will not cause the actuator to move |
| desiredValue | desired fluid level |
| fluidLevelError | difference between desiredValue and fluidLevel_inches |
| fluidLevelInches | distance that represent fluid level |

-continued

| Entry | Indication |
|---|---|
| homePosition | distance to the bottom of the screen at the lowest basket angle |
| maxValueFiltered | maximum allowable filtered fluid level (medianDistance) |
| medianDistance | filtered fluid level |
| minValueFiltered | minimum allowable filtered fluid level (medianDistance) |
| offset | distance above the homePosition that represents a high flow |
| runningState | pool depth on the shaker screen relative to the desired position—high, low, at desired |
| validSensorDataPercentage | the % of sensor readings within the expected range |
| validSensorDataPoints | actual number of valid sensor readings |
| calibrateCommand | has the calibrate button been pushed |
| decoded | is the input used |
| forceEnabled | is the input value controlled by the Debug Monitor |
| forceValue | value to force the input to if forceEnabled is true |
| ioIdentifier | Modbus address of the input |
| ioType | (MOD) Modbus protocol |
| maxRawValue | maximum value that can be returned from the input |
| maxValue | measurement scale value corresponding to the maxRawValue for this input |
| minRawValue | minimum value that can be returned from the input |
| minValue | measurement scale value corresponding to the minRawValue for this input |
| rawValue | raw integer value returned from the input |

The present invention, therefore, in at least some, but not necessarily all embodiments, provides a vibratory separator including: a base; a basket movably mounted on the base and for supporting screen apparatus for treating material introduced into the vibratory separator, the basket on the base and pivotable with respect thereto; screen apparatus supported by the basket, the material flowing onto the screen apparatus for treatment; vibratory motor apparatus connected to the basket for vibrating the basket and the screen apparatus; variable frequency drive apparatus for selectively driving the vibratory motor apparatus at a selected speed; angle adjustment apparatus connected to the basket for adjusting angle of the basket; sensor apparatus connected to the vibratory separator for sensing a parameter indicative of operation of the vibratory separator for providing a signal corresponding to said parameter; and control apparatus for receiving signals from the sensor apparatus, for controlling the vibratory separator based on said signals, and for automatically signaling the variable frequency drive apparatus to change the speed of the vibratory motor apparatus so that force applied to the basket is changed. Such a vibratory separator may have one or some (in any possible combination) of the following: wherein the basket is tilted at a largest possible uphill angle; wherein the control apparatus includes timing apparatus that indicates the basket has been maintained at the largest possible uphill angle for a pre-set time period and actuation apparatus for actuating the variable frequency drive apparatus to increase the speed of the vibratory motor apparatus upon said pre-set time being achieved; wherein said actuating is done for a pre-set period of time or until a pre-set flow of material to the material introduction end is sensed by the sensor apparatus; wherein the vibratory separator is a shale shaker and the material is drilling fluid with drilled cuttings therein; wherein the vibratory apparatus comprises two motors for vibrating the basket, the two motors providing dual motion capability; wherein the sensor apparatus comprises a plurality of sensor apparatuses; wherein the measurement sensor apparatus is from the group consisting of electrical, optical, electromagnetic, ultrasonic, acoustic, and pulse-echo apparatus; flow sensor apparatus connected to the vibratory separator for sensing the flow of material onto the screen apparatus, the flow sensor apparatus controlled by and in communication with the control apparatus, and the control apparatus for adjusting shaker operation in response to signals from the flow sensor apparatus; the vibratory motor apparatus connectible to the basket at a plurality of locations so that a motion profile of the basket is selectively variable between linear, elliptical, and circular motion; wherein the motion profile of the basket includes a first shape at a material introduction end of the basket and a second shape at a material exit end of the basket; wherein the basket has a middle area between the material introduction end and the fluid exit end and the motion profile of the basket includes a thin ellipse shape at the material introduction end, a medium ellipse shape at the middle area, and a fatter ellipse shape at the material exit end; the vibratory motor apparatus including bearing apparatus for enhancing operation of the vibratory motor apparatus, the sensor apparatus including temperature sensor apparatus for sensing temperature of the bearing apparatus during operation, and the control apparatus for providing a notification to an operator of the vibratory separator that the bearing apparatus is to be greased; the control apparatus for monitoring total operational time of the vibratory separator and for providing a notification of said total operational time; the control apparatus including web interface apparatus for an interface between on-site personnel at a location of the vibratory separator and an entity remote therefrom; the vibratory separator on a drilling rig, the control apparatus for monitoring and analyzing a plurality of signals from the sensor apparatus and for transmitting signals indicative of information related to operation of the vibratory separator to a processor on the drilling rig, the processor including a set of health check rules for health checks comprising logical rules, inputs and outputs for defining events associated with the status of the vibratory separator, the processor for determining a severity code for each event and for reporting the events and severity codes to a central server, the events reported by the processor to the central server in a protocol defining a data structure, the data structure comprising a hierarchical tree node structure wherein results from application of the health check rules are a bottommost node of the tree node structure, and displaying the event severity codes on a display; the processor for providing to the central server the results as records containing node information regarding an appropriate location for the results in the tree node structure; and/or the control apparatus running the health checks in real time to provide results regarding on-going status of the vibratory separator to indicate a potential failure of the vibratory separator.

The present invention, therefore, in at least some, but not necessarily all embodiments, provides a vibratory separator including: a base; a basket movably mounted on the base and for supporting screen apparatus for treating material introduced into the vibratory separator, the basket on the base and pivotable with respect thereto; screen apparatus supported by the basket, the material flowing onto the screen apparatus for treatment; vibratory motor apparatus connected to the basket for vibrating the basket and the screen apparatus; sensor apparatus connected to the vibratory separator for sensing a parameter indicative of operation of the vibratory separator for providing a signal corresponding to said parameter; control apparatus for receiving signals from the sensor apparatus, for controlling the vibratory separator based on said signals; wherein the vibratory separator is a shale shaker and the material is drilling fluid with drilled cuttings therein; wherein the sensor apparatus comprises a plurality of sensor apparatuses; and the vibratory motor apparatus connectible to the basket at a plurality of locations so that a motion profile of the basket is selectively variable between linear, elliptical, and circular motion.

The present invention, therefore, in at least some, but not necessarily all embodiments, provides a method for treating material introduced to a vibratory separator, the method including introducing material to a vibratory separator according to the present invention, treating the material in the vibratory separator, and adjusting the angle of the basket, its motion profile, and/or its motor speed.

Figure 33:
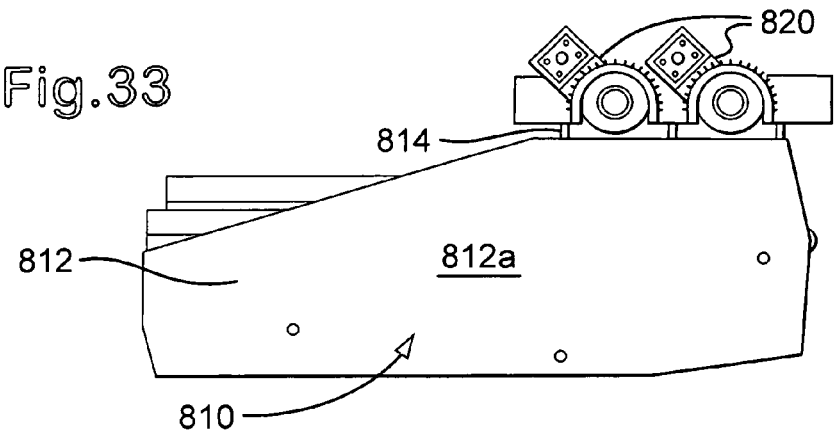
FIG. 33 is a side view of a shale shaker according to the present invention.
Figure 34:
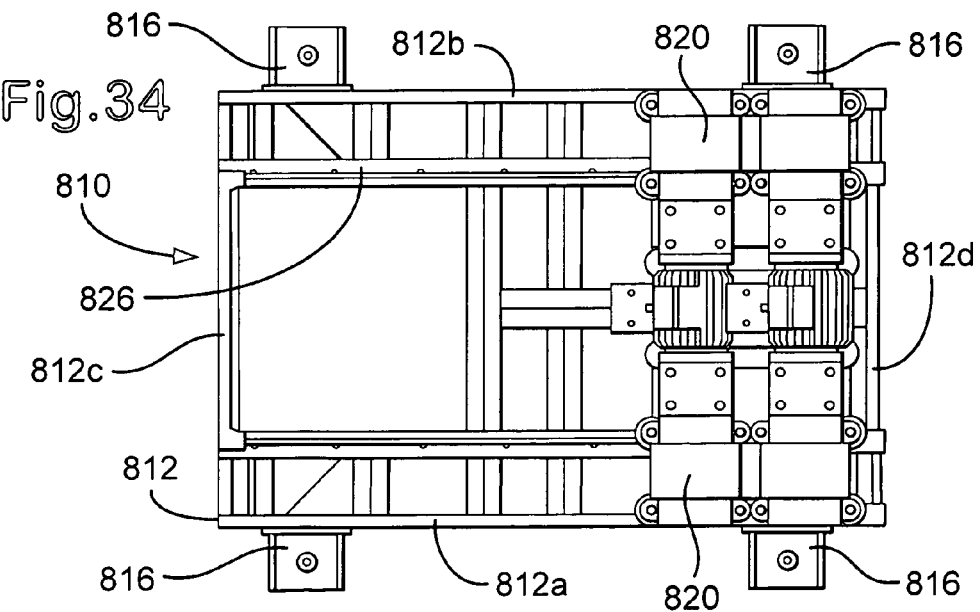
FIG. 34 is a top view of the shale shaker of FIG. 33.
Figure 35:
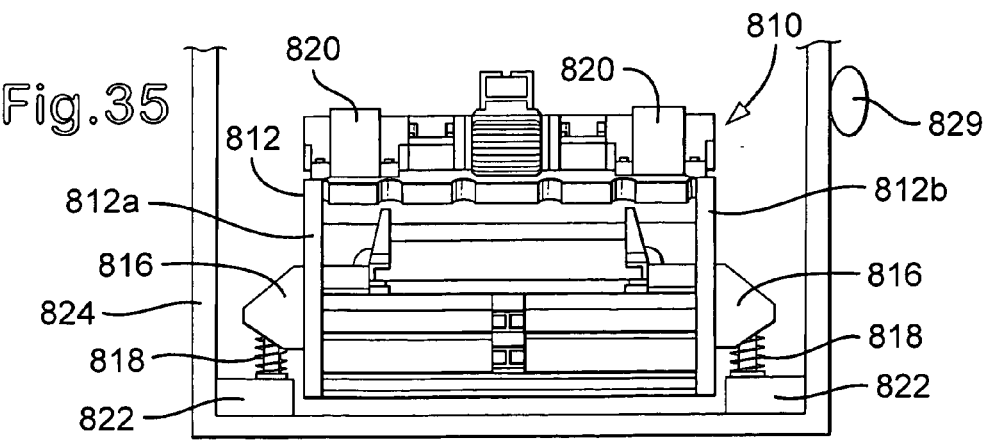
FIG. 35 is an end view of the shale shaker of FIG. 33.

FIGS. 33-35 show a shale shaker 470 according to the present invention which has a screen-mounting basket 472 and a bridge 474 on which are mounted two vibrating apparatuses 480. The basket 472 has brackets 476 to which are secured helical springs 478. Each spring 478 is secured to a base member 482. As shown in FIG. 35, an optional housing 484 may be used on sides of and beneath the shale shaker 470. Optionally (and as may be the case with any shale shaker disclosed herein according to the present invention or with any known prior art shaker or vibratory separator) an electronic tracking apparatus 489 is on the housing 484, but may, according to the present invention, be within any suitable member or part of a shale shaker; and, optionally, such a tracking apparatus has a container or housing made of composite material and/or is encased within or coated with composite material. Any known tracking device, apparatus, or system may be used, including, but not limited to known satellite tracking systems.

The brackets 476 are made, in one aspect, of composite material, as are the base members 482 and the housing 484. Optionally, the basket 472 (side walls 472a, 472b; ends 472c, 472d) is made of composite material. Alternatively one, some, or all of these components are made of steel encased in composite or steel coated with composite. A coating of composite may have the thickness of a layer of paint or of two, three, four or more layers of paint. A shale shaker similar to the shale shaker 470, but with no teaching, motivation, or suggestion of using such composite material for a shale shaker or parts of it, is disclosed in U.S. Pat. No. 6,155,428 incorporated fully herein for all purposes.

Figure 36:
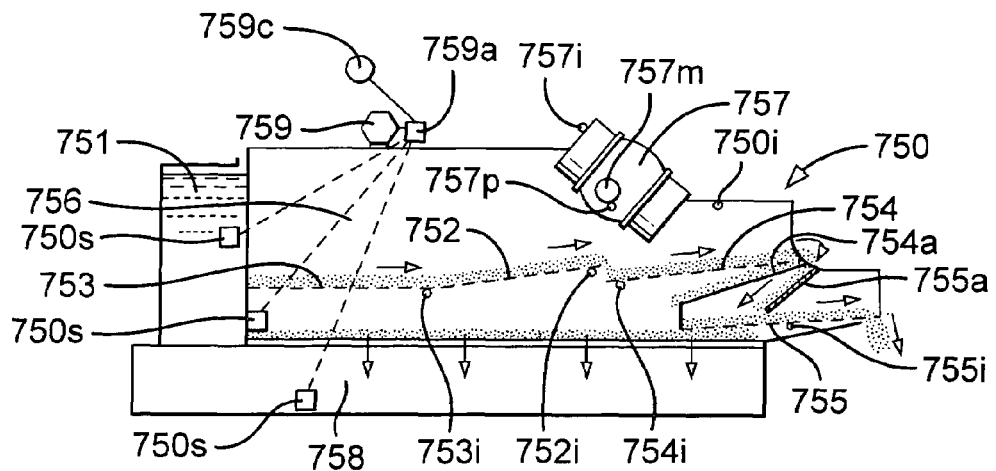
FIG. 36 is a side view of a shaker according to the present invention.

FIG. 36 shows a shaker 570 according to the present invention. Material 570m to be treated (e.g. drilling fluid with solids) by the shaker 570 is introduced from a tank 571. Material and fluid flows onto screening apparatuses 573, 572, and 574 which are mounted in a shaker basket 576. Any of the screening apparatuses 573-575 may be horizontal (see the screening apparatus 573 FIG. 36) or inclined uphill (see the screening apparatuses 572, 574, 575). Vibratory apparatus 577 vibrates the basket 576 and the screen apparatus 572-575. Electromagnetic vibratory apparatus (e.g. as in FIG. 43A or FIGS. 44A-44C) may be used instead of (or in addition to) the apparatus 577. A flowback pan 574a under the screening apparatus 574 receives fluid flowing through the screening apparatus 574 which flows down to a container 578. A flowback pan 575a directs material to the screening apparatus 575.

Material and/or fluid flowing through the screening apparatuses 572-575 flows down into a sump, tank or container 578. The basket 576 is mounted on a frame with springs (not shown). Material not flowing through the screening apparatuses, e.g. separated out solids, flows off the end of the screening apparatus 574 down onto the screening apparatus 575. Material 570r separated out by the screening apparatus 575 flows on top thereof and off the end thereof.

The screen apparatuses 572-575 may be any known screens or screen assemblies used with vibratory separators or shale shakers.

Each screen apparatus 572-575 has an energizable identification apparatus or apparatuses 573i-575i, respectively, therein or thereon and/or the shaker 570 has an energizable identification apparatus or apparatuses 570i therein and/or thereon. Any energizable identification apparatus disclosed herein may be used for the screen apparatuses (and for any disclosed herein), vibratory apparatus (and for any disclosed herein), and/or for the shaker (and for any disclosed herein) (including, e.g. RFIDT's and/or SAW's). Optionally, the vibratory apparatus 577 has an energizable identification apparatus 577i therein or thereon and/or motor weights 577m have an energizable identification apparatus 577p. An energizable identification apparatus disclosed herein for a screen or screen assembly may contain any desired information and may be a read-only or read-write apparatus. Such information may include, but is not limited to: date and place of manufacture; manufacturer identity; frame or support type and material; screening material type, material, weave, mesh count; material used for bonding, welding, gluing, connection or adhesion; screen size, dimensions; whether or not refurbished or remanufactured; heat treatment(s); metallurgy; time in service; wire diameter; frame dimensions; and type of side mounts. Any reader apparatus or system disclosed herein may be used to read and monitor the apparatus 570i.

As is the case with several screens on various shale shakers, the screens 572, 574, and 575 are inclined so that materials thereon must climb "uphill" to exit off the end of the screen. It is within the scope of the present invention to use an energizable identification apparatus (any disclosed herein) with any such inclined screen, with flat (horizontal) screen(s) and with any inclined screen, or non-downwardly inclined, on any vibratory separator or shale shaker.

Optionally the shaker 570 is provided with a reader apparatus 579, on the shaker or adjacent thereto, (e.g. as any disclosed herein or in the prior art) to read and monitor the energizable identification apparatuses on screens mounted on the shaker 570 and/or on other parts of the shaker 570. Optionally, the reader apparatus communicates with a control system 579a (on site or remote). The control system 579a controls the vibratory apparatus 577 (motor, motors; or electromagnetic vibratory apparatus) and can monitor all the energizable identification apparatuses. With respect to a particular screen assembly, the control system 579a receives signals, including identification signals, from energizable identification apparatus on a screen assembly and the control system (or any interconnected computer system 579c, on site or remote) determines whether that particular screen assembly is suitable for use on the shaker 570. If via sensors 570s the control system determines that the particular screen assembly is not suitable for the material being processed and/or for particular flow rates, the control system and/or computer system can send a signal and/or an alarm and/or can automatically shut the shaker down. Signals from the energizable identification apparatus 577i can indicate, e.g., motor manufacturing date, last service date, motor refurbishment date, etc. Signals from the energizable identification apparatus 577p can indicate nominal rated motor force so the control system can ensure correct motor force operation at correct frequency and operation.

Figure 37:
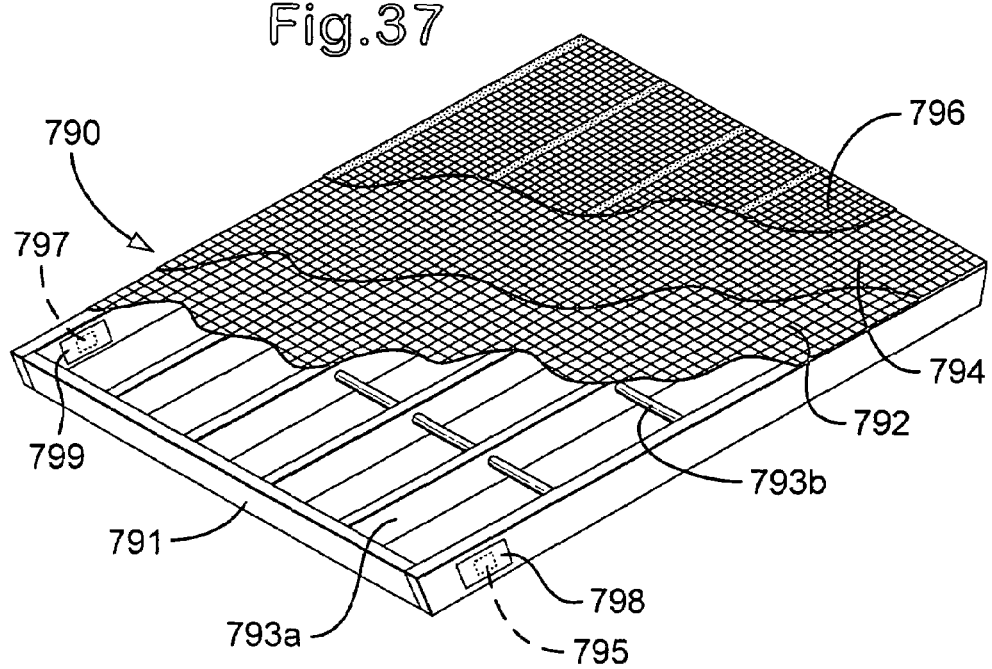
FIG. 37 is a perspective view of a screen assembly according to the present invention.
Figure 38A:
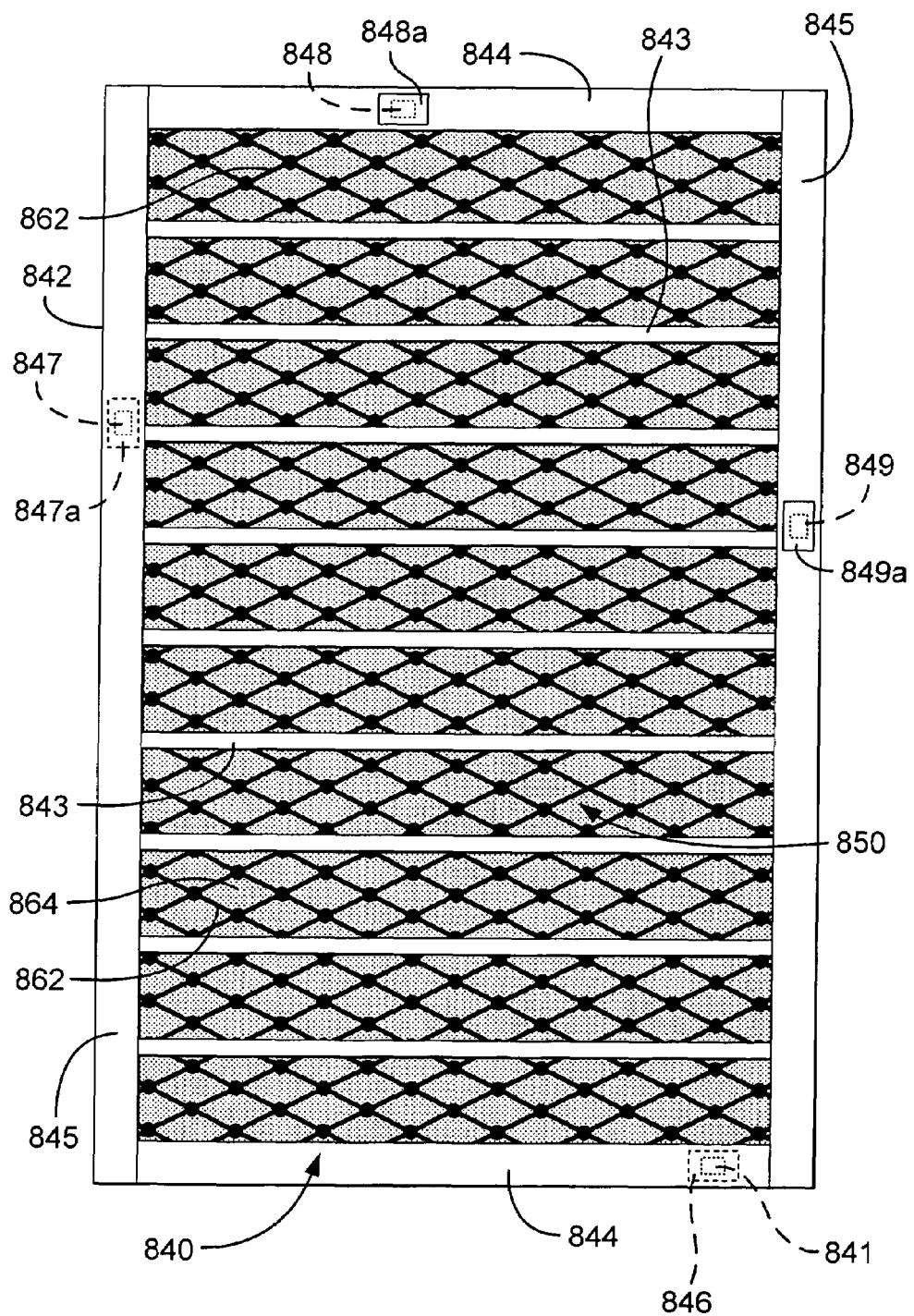
FIG. 38A is a top view of a screen assembly according to the present invention.
Figure 38B:
FIG. 38B is an end view of the screen assembly of FIG. 38A.
Figure 38C:
FIG. 38C is a side view of the screen assembly of FIG. 38A.
Figure 38D:
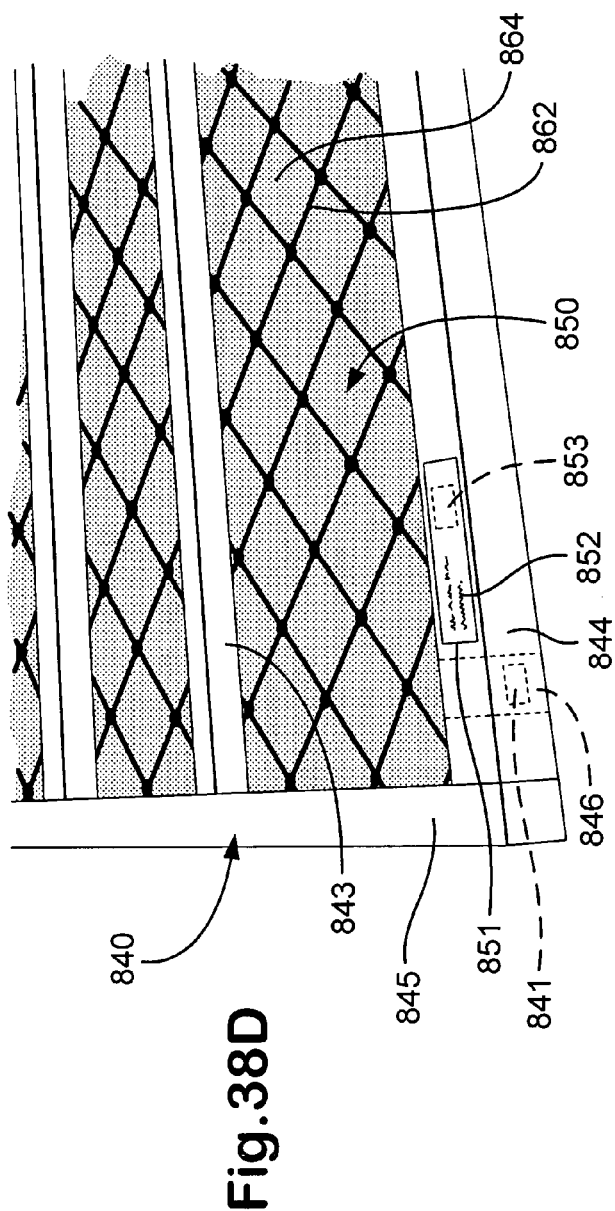
FIG. 38D is a perspective view of part of the screen assembly of FIG. 38A.

FIG. 37 shows a screen assembly 790 according to the present invention which has a frame 791 with crossmembers 793a and cross rods 793b with multiple screen mesh layers 792, 794, 796. Epoxy material connects the mesh layers to the frame 791.

An energizable identification apparatus 795 on an exterior portion of the frame 791 with a protective tape, covering or encasement 798 (which may be encasement, layer(s), mass of material, tape(s), and/or wraps disclosed or referred to herein) Optionally, a protective covering, etc., encircles the portion of the frame 791 adjacent the apparatus 795. Optionally, or instead of the apparatus 795, an energizable identification apparatus 797 is on an inner portion of the frame 791 and is protected by an encasement, tape, or protective covering 797 (which may be any encasement, tape(s), layer(s), mass of material, and/or wrap(s) disclosed or referred to). It is within the scope of the present invention to provide one or more apparatuses 795 and/or one or more apparatuses 797 on or in any portion of any screen or screen assembly used with a vibratory separator or shale shaker, including but not limited to, on frames, plates, supports, lips, ledges, crossmembers, rods, structural parts, and seal structures of such screens or screen assemblies.

FIGS. 38A-38D show a screen assembly 840 according to the present invention which has a tubular frame 842 made of hollow tubulars with ends 844 and interconnected sides 845. A screening material layer or combination of layers 850 is secured to the tubular frame 842 with suitable glue and/or adhesives. A plurality of spaced-apart crossmembers 843 extend between and have ends 844 connected to the sides 845. The screen assembly 840 may, in one particular aspect, have a multi-layer combination 850 of layers of screening material adhered together with adhesive or epoxy or glued together with moisture curing hot melt glue in a glue pattern 862.

It is within the scope of the present invention to position and/or mount an energizable identification apparatus within any part of a screen or screen assembly for a vibratory separator or shaker, including, but not limited to, within a hollow frame member or tubular, within a hole or recess, or within a side mounting structure of a screen or screen assembly. The screen assembly 840 has an energizable identification apparatus 841 secured in an amount of material 846 (e.g., plastic, epoxy, fiberglass, gel, aerogel, silica aerogel, wood, metal, composite) within an end 844 of the screen assembly 840 and an energizable identification apparatus 847 in an amount of material 847a within a side 845. Energizable identification apparatus 848 and 849 are adhesively secured exteriorly to parts of the frame 842 and/or have a layer or layers (not shown) of encasement or tape 848a, 849a over them.

Often identification tags or labels, e.g. made of plastic or metal are used on screens and screen assemblies to convey information about the screen or screen assembly. It is within the scope of the present invention to include on or within such labels or tags one or more energizable identification apparatuses. For example, a tag or label 851 on the frame 842 (FIG. 38D) has information 852 about the screen 840 and on or embedded within the tag or label 851 is an energizable identification apparatus 853.

FIGS. 39A-39D show a screen assembly 910 according to the present invention which has a layer or layers 912 of screening material and side mounts 914. In one particular aspect there are three layers 912 of stainless steel screening material with a lowermost layer with mesh of 20×20, a middle layer of 105×64 mesh, and a top layer of 170×105 mesh. It is within the scope of this invention for the layers 912 (as with any layers of any screen or screen assembly disclosed herein) to be any known screening material separate and unconnected to each other or with layers bonded, connected, fused, sintered, glued together, and/or sewn together in any known manner and the screening material may be made of any known material used for such screen assemblies.

In certain aspects, the layers 912 of screening material (as with any layers of any screen or screen assembly disclosed herein) are glued together with cured hot melt glue producing glued-together screening material that is flexible. In some aspects a screen assembly according to the present invention with flexible material can be folded on itself or rolled up.

Each side mount 914 has a bottom part 921, a side part 922, a top part 923, a top lip 924, and a top lip 925. The layers 912 pass between and are secured between the bottom part 921 and the top lip 924. An end of the layers 912 is held between opposed parts 925a and 925b of the top lip 925. The top lip 924 may, optionally, be adhesively secured together and/or welded to the bottom part 921 with multiple spaced-apart welds 926 along the length of the side amounts 914. Similar adhesive material and/or welds may be, optionally, used along the top lip 925. In other aspects, the welds 926 are deleted or are supplemented with glued areas along the mounts 914. Alternatively, or in addition, inwardly projecting teeth or humps on the top lip 924 and/or bottom part 921 may be used to hold screening material. The bottom part 921 has a plurality of spaced-apart holes 929 for receiving corresponding upwardly-directed projections of a screen mounting structure or apparatus of a shale shaker or vibratory separator. Optionally ends 916 of the side mounts 914 are sealed with any suitable seal material or seal structure. As shown in FIG. 39D, a solid plug or an amount of hardened adhesive or hot melt glue 927 is applied at the end opening 916. An energizable identification apparatus 928 is encased within the plug 927. Optionally, such material may encapsulate the edge of screening material layers 912. In certain aspects the side mounts and/or the plug 927 are made of plastic, epoxy, acrylic, steel, stainless steel, fiberglass, composite, aluminum, aluminum alloy, zinc, zinc alloy, brass or bronze. Optionally the top part 923 is deleted and a generally "L" shaped side mount is provided and it is within the scope of this invention to provide such a side mount with any seal or handling apparatus described herein.

Optionally, a plurality of screws 931 secure a seal member 930 to the side part 922. In one aspect the seal member 930 is (as may be the case for any seal or seal member according to the present invention) made of neoprene, but it may be made of nitrile rubber, rubber, plastic, gasket material, polyurethane, or any suitable seal material. The seal member 930 has an upper portion 932 of generally circular cross-section (but, according to the present invention, this cross-section may be any desired shape, including, but not limited to, square, oval, and rectangular). Optionally, the upper portion 932 is hollow and, e.g. may have a space 933 of a generally circular (or of any desired shape) cross-section. An elongated part 934 of the seal member 930 extends down from the upper portion 932. The seal member 930 is, in one aspect, positioned so that when the screen assembly 910 is in place on a shale shaker or vibratory separator, the seal member 930 is trapped between the screen assembly 910 and the side wall of a basket or other screen holding structure. In another aspect the seal member 930 is positioned so that the upper portion 932 is above a top edge of the top lip 925. The seal member 930 may be adhesively secured to a side mount. An energizable identification apparatus may, according to the present invention, be in or on the seal member 930 or in the hollow part of the end 932.

FIG. 40 shows a screen assembly 940 according to the present invention which has side mounts 944 (like the side mounts 914, FIG. 39D); one or more layers 942 of screening material (like the layer or layers 912 of the screen assembly 910); and one, two, three or more layer(s) 946 of ridged or undulating screening material on and/or connected to the layer(s) 942. The screening material layer(s) 946 may be any known undulating or ridged screening material, including, but not limited to, that disclosed in U.S. Pat. Nos. 6,450,345; 5,868,929; 5,720,881; 5,958,236; 5,876,552; 5,636,749; 5,417,858; 5,417,793; 5,417,859; and 5,944,993, all fully incorporated herein fully for all purposes. In the screen assembly 940 a portion of the layers 946 may pass with the layer(s) 942 between the bottom part and lower lip of the side mounts 944 and, if desired, into the top lip. Alternatively only the layer(s) 942 are secured within the side mounts 944. The side mounts 944 may have an energizable identification apparatus 944a like the energizable identification apparatuses shown and/or described for the embodiment of FIG. 39D.

Figure 41A:
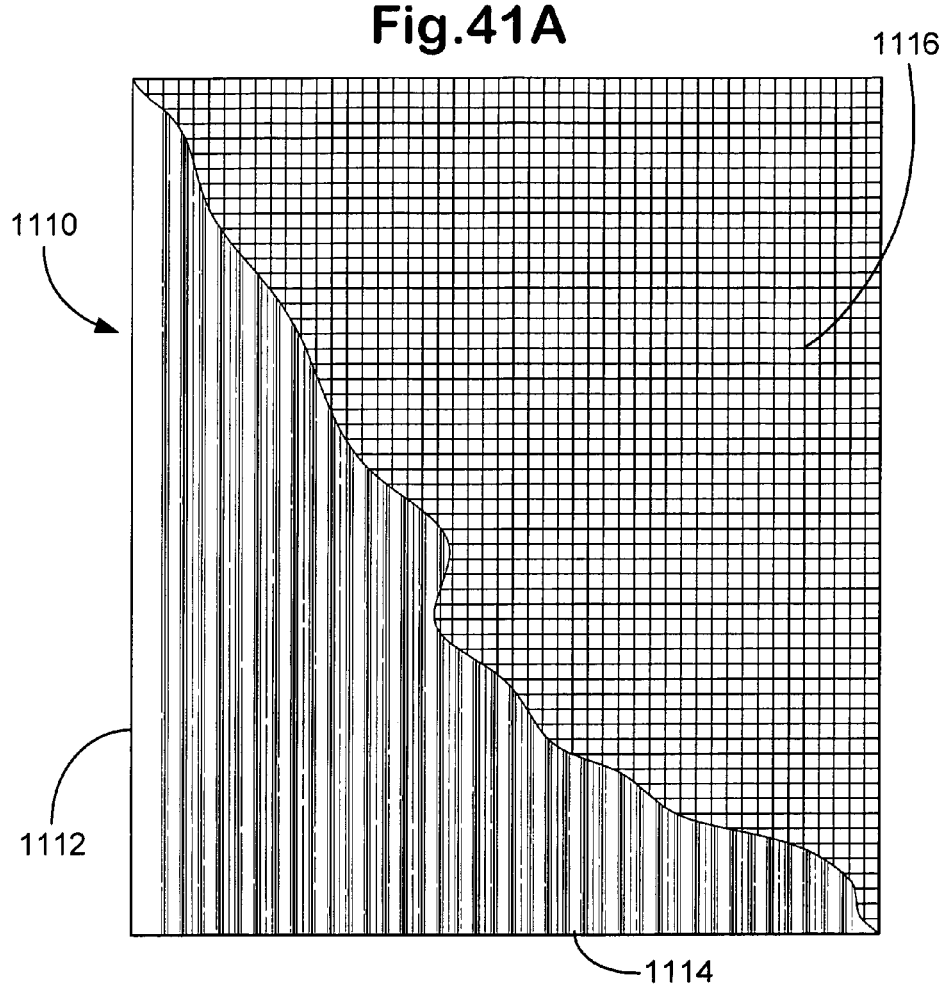
FIG. 41A is a top view of a screen assembly according to the present invention.

FIG. 41A shows a screen 1110 according to the present invention with a lower base, support or frame 1112, three undulating mesh screens 1114 (any two of which may be deleted) on and/or bonded or connected to the frame 1112, and, optionally, an upper mesh or screen 1116. The screens 1114 may themselves be sewn, bonded or glued together, e.g. with epoxy, glue, welding, and/or sintering. Rubber strips, plastic strips tape, cushion or cushions 1118 are positioned between the screen 1114 and the upper screen 1116. The strip(s) or cushion(s) 1118 are optional. As shown the strip(s), tape(s), or cushion(s) 1118 are secured to the screen 1114 (or to crests thereof), but it is within the scope of this invention to secure them (or some of them) to the screen 1116. To effect such securement any suitable glue, epoxy, weld, and/or sintering may be employed. The frame 1112 may be any suitable known base, frame or support.

Figure 41B:
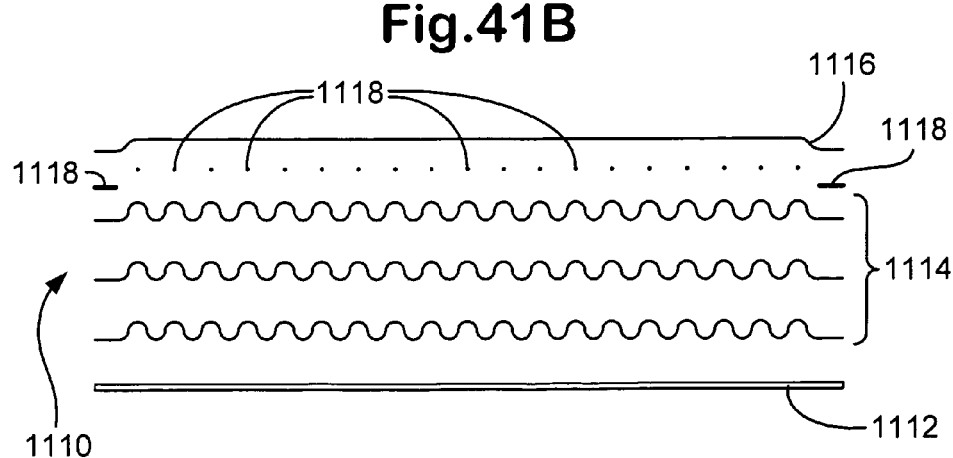
FIG. 41B is an exploded view of the screen assembly of FIG. 41A.
Figure 41C:
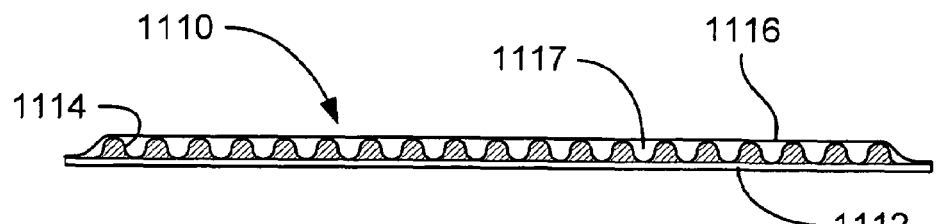
FIG. 41C is an end view of a screen assembly of FIG. 41A.

It is within the scope of this invention for the screen 1114 to be any known screen, mesh, screens, meshes, or combination thereof, bonded together, unbonded, or bonded at only certain locations and with any known shape as viewed either from above or on end (as in FIG. 41A). It is within the scope of this invention for the upper screen 1116, which is optional, to be any known screen, mesh, screens, meshes, or combination thereof, bonded together or unbonded, and with any known shape. As shown in FIG. 41B, the screen 1114 is three mesh screens bonded together with coarser mesh on the bottom, medium mesh in the middle, and finer mesh on top. The screen 1116 as shown may be a scalping screen of a mesh coarser than the finest mesh of the screen 1114 or of a multi-layer coarser mesh. In another aspect the screen 1114 is a single screen of closely woven mesh made of any suitable material, e.g. stainless steel and/or plastic material and the screen 1116 is a single screen of coarser mesh made of any suitable material (e.g. but not limited to stainless steel and/or plastic), with the screen 1114 on a metal or plastic frame or support. Alternatively or additionally, instead of the frame 1112 any known perforated plate, strip, support, or series of straps or strips may be used.

In one aspect the strips 1118 are fused plastic strips aligned with peaks of the undulating fine mesh. Such strips may be made of rubber (e.g. nitrile) or plastic, e.g. polypropylene, to inhibit or prevent abrasion of the finer meshes. Such strips can be glued to the bottom of the screen 1116 and/or the screen 1114. Also the screen 1116 can be glued to the screen 1114.

Figure 41D:
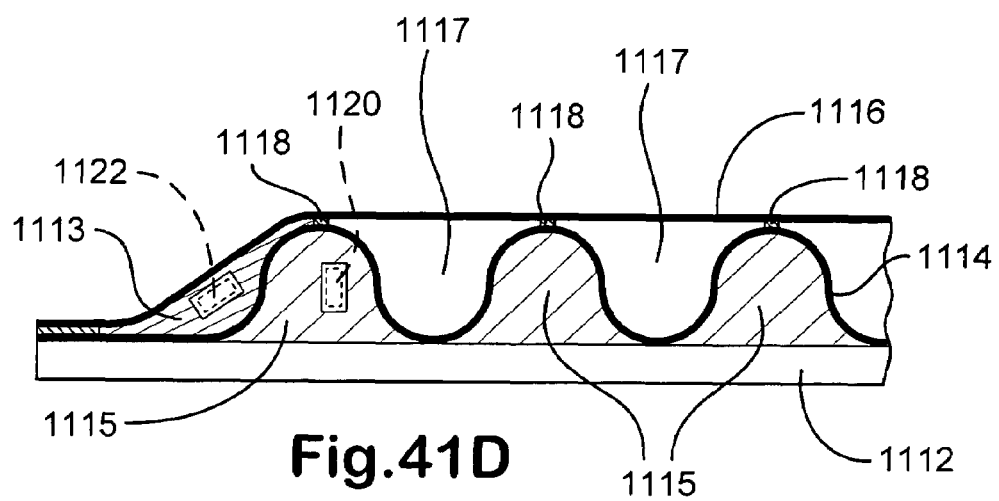
FIG. 41D is an enlargement of part of the screen assembly of FIG. 41C.

End plugs 1113 and 1115 (FIG. 41D) sealingly close off open ends of the screen 1110. These end plugs may be made of rubber, metal, wood, plastic, Teflon™ material, or urethane. The plugs 1113 extend along two sides of the screen along crests of the screening material to completely seal the sides. The plugs are held in place by friction fit, glue, epoxy, welding and/or sintering. Alternatively, the ends may be covered with screen material.

Fluid flow on the screen 1110 from either end may be from top-to-bottom as viewed in FIG. 41A, bottom-to-top, or from one side to the other.

In one aspect the screen 1116 is a scalping screen of woven steel mesh. In another aspect, it is woven plastic or synthetic or composite mesh; and in another aspect it is a combination of woven steel and woven plastic or synthetic or composite mesh. The screen 1116 may be the same mesh or coarser mesh than that of the screen 1114 or of any layer thereof.

In one embodiment the areas 1117 between the screen 1116 and the screen 1114 are open. The screen 1116 protects the mesh of the screen 1114 from abrasive particles. When the screen 1116 is of a coarser mesh than that of the screen 1114, relatively larger particles retained on the screen 1116 are prevented from damaging and/or hindering flow through the screen 1114.

With the screen 1110 as shown and with the optional screen 1116 liquid flow through the screen is increased by reducing the thickness of the solids bed of the finer mesh screens by the separation of larger particles with the screen 1116.

Figure 41E:
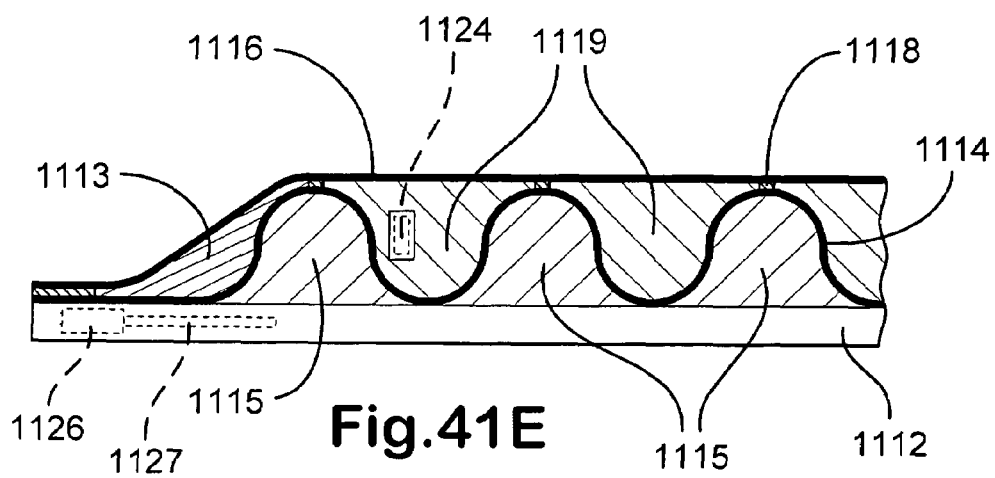
FIG. 41E is an end view of a screen assembly according to the present invention.

FIG. 41E shows an alternative embodiment of the screen 1110 with identical parts (indicated by the same numerals) but with additional end plugs 1119 between the upper screen 1116 and the screen 1114. Such "double plugging" may be used on either or both screen ends. A fluid and/or particles introduced to the screen 1110 first encounters the screen 1116 and then material flowing through the screen 1116 flows to the screen 1114. The plugs 1119 may be made of the materials described for the plugs 1113, 1115 and the plugs 1119 may be similarly installed and/or secured in place. Any of the plugs 1113, 1115, 1119 may be deleted in certain embodiments.

As has been described previously, any previously-disclosed energizable identification apparatus may be applied to any part of the screen 1110. An energizable identification apparatus 1120 is embedded within a plug 1115 and/or an energizable identification apparatus 1122 is embedded within a plug 1113. Optionally, an energizable identification apparatus 1124 is embedded within a plug 1119 (FIG. 41E).

Optionally, an energizable identification apparatus 1126 with an antenna 1127 extending therefrom is located within the frame 1112. It is within the scope of the present invention when an energizable identification apparatus being used has an antenna extending therefrom, to adhere the antenna to part of the screen or screen assembly and/or to locate the antenna within part of the screen or screen assembly (e.g. within a frame member, seal, hookstrip, or side mount) and/or to locate such an antenna in a mass of material.

Figure 42B:
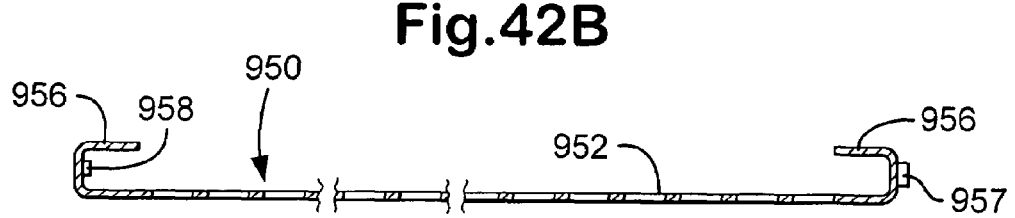
FIG. 42B is a section view along line 42B-42B of FIG. 42A.

FIGS. 42A and 42B show a screen assembly 950 according to the present invention which has a lower support plate 952 and one, two, three, four or more layers of screening material on the plate 952 (three layers 953, 954, 955 shown). Side hookstrips 956 on sides of the plate 952 facilitate mounting of the screen assembly 950 to a deck or mount structure of a vibratory separator or shaker. An energizable identification apparatus 957 is secured to an exterior portion of a hookstrip 956 and/or an energizable identification apparatus 958 is secured to an interior portion of a hookstrip 956. In one particular aspect the screen assembly 950 is like a screen assembly disclosed in U.S. Pat. No. 4,575,421 (incorporated fully herein) modified in accord with the present invention.

Figure 42C:
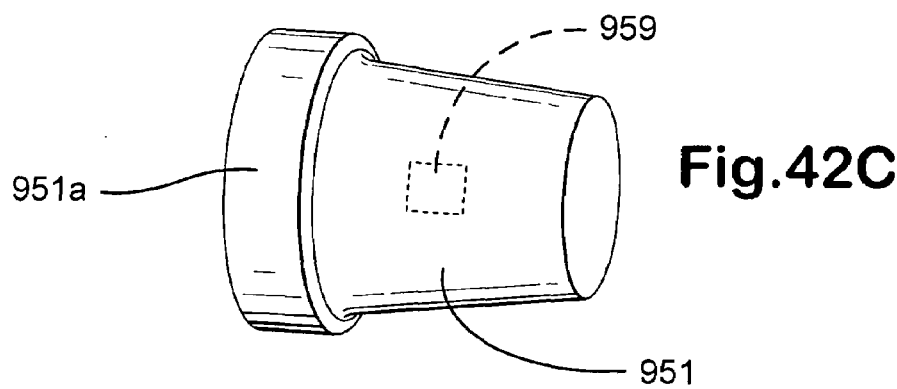
FIG. 42C is a perspective view of an apparatus according to the present invention.

According to the present invention an energizable identification apparatus (any disclosed herein) can be applied to, connected to, or disposed within a screen assembly using a solid mass within which is located the energizable identification apparatus. FIG. 42C shows a mass 951 of material within which is an energizable identification apparatus 959. The mass 951 is sized and configured for insertion into a recess, notch, hollow, channel or opening of a screen assembly (or other apparatus) to facilitate installation of the energizable identification apparatus 959. The mass 951 can be held in place with a friction fit and/or adhesive, glue, welding, and/or tape and/or any layer(s), wrap(s) or encasement disclosed herein. The material of the mass 951 can be metal, plastic, composite, wood, ceramic, cermet, fiberglass, gel, aerogel, silica aerogel, nonmagnetic metal, or polytetrafluorethylene. The material can be rigid and relatively unbending or it can be soft and/or flexible. An enlarged end 951a of the mass 951 is optional, as is the conical shape of the mass 951 (any desirable or convenient shape being within the scope of the present invention, including but not limited to cubic pyramidal or any regular solid).

Figure 42D:
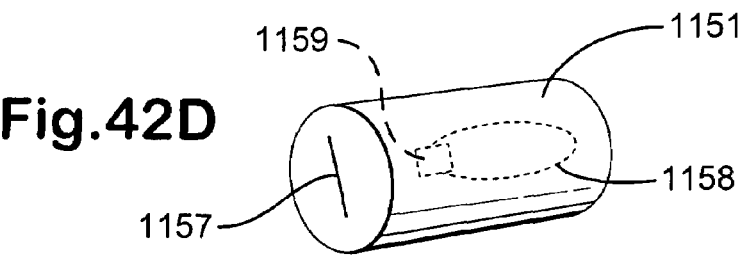
FIG. 42D is a perspective view of an apparatus according to the present invention.

FIG. 42D shows a mass 1151 (made, e.g. of any material mentioned for the mass 951) with an energizable identification apparatus 1159 therein. The energizable identification apparatus 1159 has an antenna 1158 extending from the energizable identification apparatus 1159 and disposed within the mass 1151. With a flexible or sufficiently non-rigid mass 1151 (and with a flexible mass for the mass 951) a slit or recess 1157 of any desired length and extent within the mass 1151 may be provided for inserting the energizable identification apparatus 1159 and antenna 1158 into the mass 1151 and/or for removable emplacement of the energizable identification apparatus 1159.

Figure 42E:
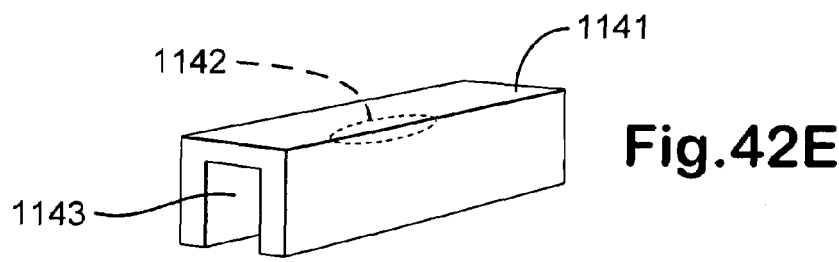
FIG. 42E is a perspective view of an apparatus according to the present invention.
Figure 43A:
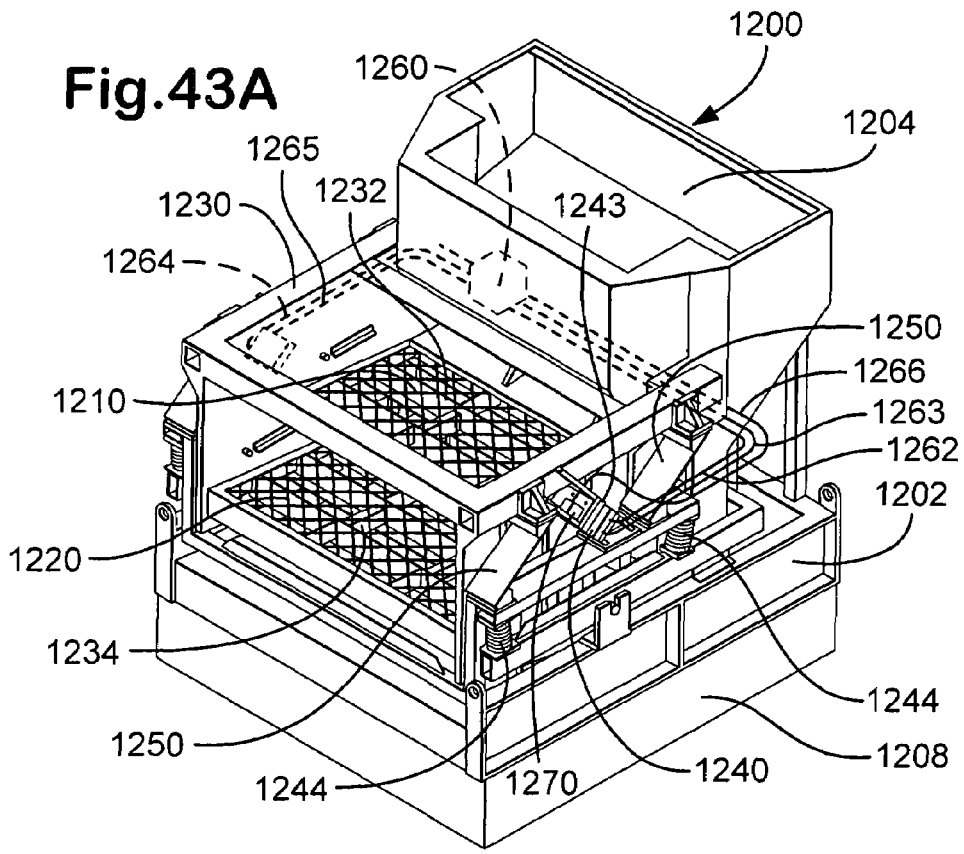
FIG. 43A is a perspective view of a shale shaker according to the present invention.
Figure 43E:
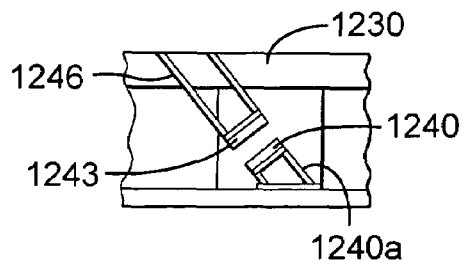
FIG. 43E is a side view of part of the shaker of FIG. 43A.
Figure 43B:
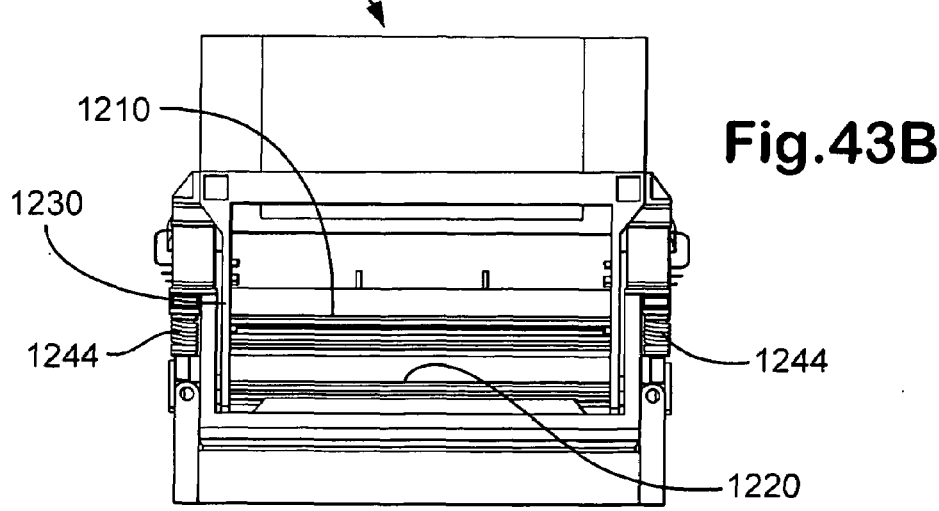
FIG. 43B is an end view of the shaker of FIG. 43A.
Figure 43C:
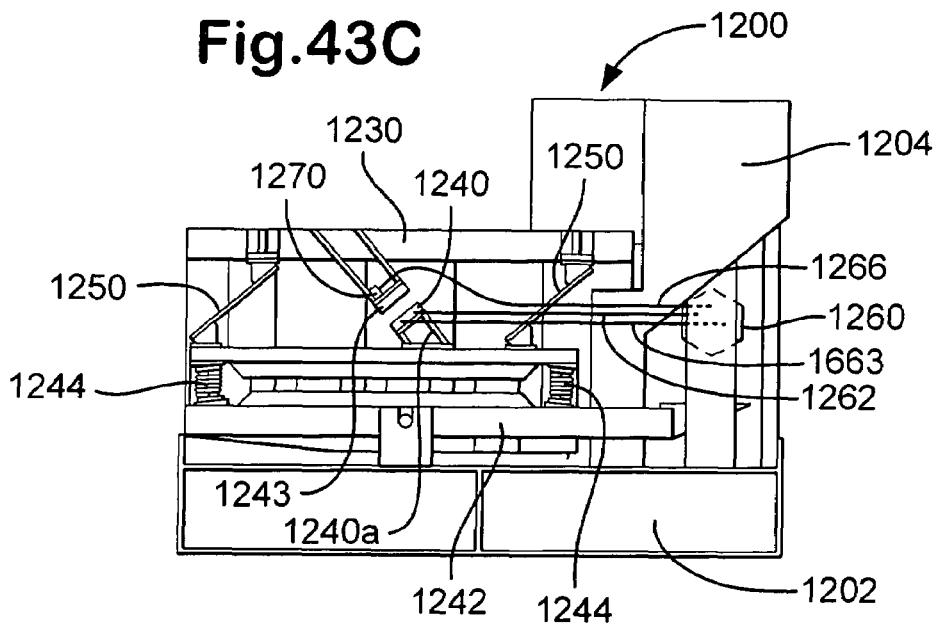
FIG. 43C is a side view of the shaker of FIG. 43A.
Figure 43D:
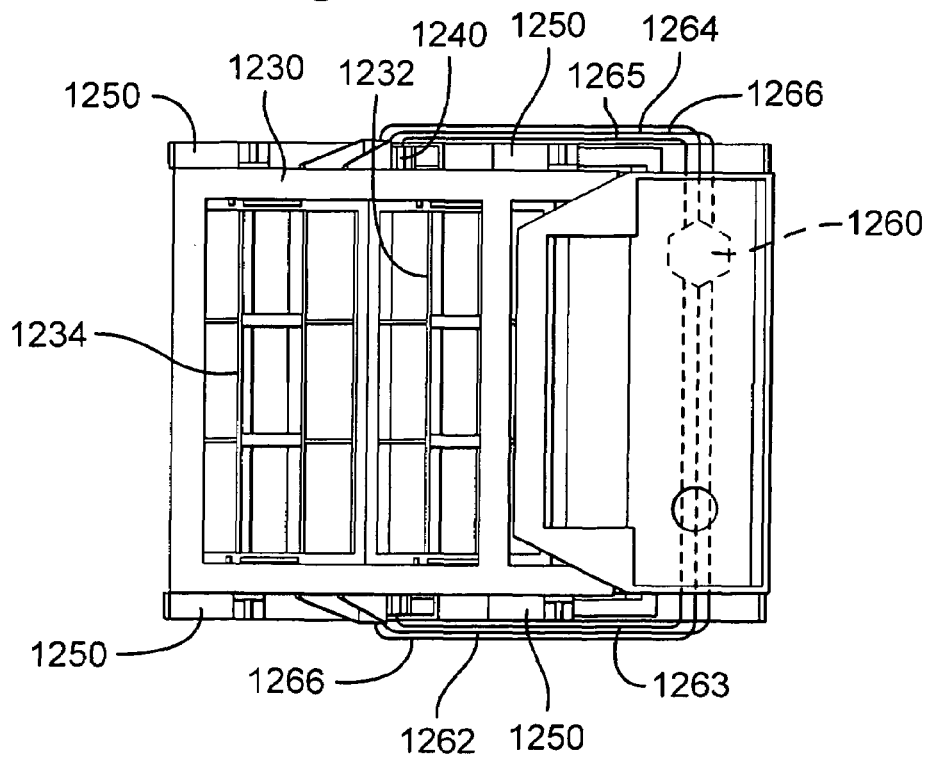
FIG. 43D is a top view of the shaker of FIG. 43A.

FIG. 42E shows a mass 1141 (e.g. like the masses 951, 1151 and made of the materials mentioned above) with an energizable identification apparatus 1142 therein (or it may, according to the present invention, be thereon). The mass 1141 has a recess 1143 sized, located, and configured for receipt therein of a part or a portion of a screen or screen assembly so that the mass 1141 is easily installable on a part (e.g. a frame part, crossmember, or edge) of a screen or screen assembly. A friction fit between the mass 1141 and the part or portion of the screen assembly can hold the mass 1141 in place (e.g. on a frame, part, edge, rod crossmember, plate, mount, hookstrip, or support of a screen or screen assembly) and/or connectors, fasteners, releasably cooperating hook-loop material, and/or adhesive may be used to hold the mass 1141 in place (as is true for any energizable identification apparatus disclosed herein).

FIGS. 43A-43E show a shale shaker 1200 according to the present invention which has a base 1202 with a fluid input tank 1204 from which drilling fluid with solids therein is fed to a screen assembly 1210. Drilling fluid passing through the screen assembly 1210 flows down and material (including undesirable solids such as drilled cuttings) moving up the screen assembly 1210 (which is inclined "uphill") moves off the end of the screen assembly 1210 and flows down onto a lower screen assembly 1220 which is also inclined "uphill." Drilling fluid passing through the screen assembly 1220 flows to a pit, tank or collection receptacle 1208 and material (including undesirable solids such as drilled cuttings) moves off the end of the screen assembly 1220 and falls to a container or further processing apparatus.

The screen assemblies 1210 and 1220 are releasably mounted to decks 1232, 1234 of a basket 1230. Two electromagnet apparatuses 1240 are mounted on a support 1242 which is, optionally, secured to the base 1202 with springs 1244. Plates 1243 secured to a mounting bracket 1246 (which, in one aspect, is made of composite material) which is secured to the basket 1230 are attracted by the electromagnetic apparatuses 1240. Each electromagnetic apparatus 1240 has a mounting bracket 1240a (which, in one aspect, is made of composite material) By pulsing power to the electromagnetic apparatuses 1240 (e.g. with alternating current), the plates are moved quickly toward and away from the electromagnetic apparatuses 1240, thus vibrating the basket 1230 and the screen assemblies 1210 and 1220.

An alternating current applied to the electromagnet causes an attractive electromagnetic force between the electromagnet and the plate. The frequency of input current to the electromagnet is same as the output vibration frequency of the basket. The vibration amplitude of the basket is a function of the input current and frequency to the electromagnet, weight of the basket and processed material, and the stiffness of the springs or resonators supporting the basket. Generally, as the input current to the electromagnet is increased, the vibration amplitude increases. As the input current to the electromagnet is decreased, the vibration amplitude decreases. In one aspect, the apparatuses 1240 vibrate the basket 1230 at its natural resonant frequency.

Leaf springs or resonators 1250 are interconnected between the basket 1230 and the support 1242 to allow the basket 1230 limited freedom of movement with respect to the electromagnetic apparatuses 1240.

A controller 1260 (shown schematically, which may be any suitable known programmable logic controller ("PLC"), variable frequency drive ("VFD") (one for each apparatus 1240), or controller for controlling electromagnetic apparatuses and/or any controller or control system disclosed herein with suitable apparatus, devices, and programming for controlling the electromagnetic apparatuses) via lines 1262-1265 (shown schematically) controls the electromagnetic apparatuses 1240. In certain aspects the controller 1260 controls the frequency and amplitude of vibrations of the basket 1230 by controlling the electromagnetic apparatuses 1240. One or more accelerometers 1270 measure acceleration of the basket 1230 and provides signals via a cable 1266 (e.g. a multi-wire cable) to the controller 1260. In one aspect, the accelerometer measures acceleration and sends an output signal to a control system or PLC. The control system or PLC includes parameters to control the electromagnets. An acceleration setpoint is chosen and programmed into the PLC. If the accelerometer measures an acceleration below the setpoint, then the control system or PLC increases the input current to the electromagnets. If the accelerometer measures an acceleration above the setpoint, then the control system or PLC decreases the input current to the electromagnets. If the accelerometer measures an acceleration at the setpoint, then the control system or PLC maintains the previous input current to the electromagnets. Thus, the shaker can operate at constant acceleration under load (and under changing load) because of this closed-loop acceleration control, and, in one aspect, at a constant natural resonant frequency under load.

The system, in certain aspects, operates at the natural frequency of the basket with load springs or resonators. Operating the shaker at the system resonance greatly reduces the input energy required to drive the system. Certain traditional shakers can operate at many times the natural frequency and require excessive power to operate. Operating a shaker according to the present invention at its natural frequency reduces energy requirements and permits the use of lighter baskets.

Certain traditional shakers operate at a fixed motor speed and with a fixed rotating mass. This produces a fixed force at a fixed frequency. A basket without the additional mass of drilling mud operates at a nominal acceleration. As drilling mud is added to the basket, the system mass is increased, but the driving force remains fixed. This results in a significantly decreased acceleration. Acceleration is a primary factor determining shaker performance and fluid handling capacity. In order for a traditional shaker to be able to operate over a wide range of loads, some baskets have been designed to be exceptionally heavy compared to the load they process. This helps reduce the effect of decreasing acceleration with increasing load. However, heavy baskets operating above the system natural frequency require significant input power. Even with heavy baskets, some traditional shakers can lose up to 25% of their nominal acceleration with the addition of weighted drilling mud.

A shaker according to the present invention, in certain aspects, changes the input frequency to the electromagnets to match the natural frequency of the system. Thus, as more mass is added to the system with drilling mud, the PLC automatically determines the new lower natural frequency. In addition, in some aspects, the feedback from the accelerometer is used by the PLC to change the current to the electromagnet and maintain a constant acceleration amplitude. The electromagnets of the shaker can be driven with a typical input current function and a superimposed high-frequency signal to partially de-plug the screens. This can also be accomplished by out-of-phase driving with the typical input current functions. Since adding weight to the screens changes the system natural frequency, this frequency can be measured to assist in determining the weight of the cuttings discharged by the shaker. A signal representative of the natural frequency of the system is sent to the PLC and/or computer that calculates the total amount of solids discharged. In one aspect, since the shaker is automatically tuned to the natural frequency, the mass (solids, liquid, plus any other material) can be indicated. The system natural frequency is calculated by taking the square root of (mass divided by stiffness) where the mass is the total vibrating mass (screen or screens plus basket plus screen hardware plus solids plus liquid) and the stiffness is the equivalent spring rate of the resonators (e.g. four if four are used) in the vibration direction. Since the stiffness of the system does not change, any change in the natural frequency when flow is introduced and when flow progress is due to the addition of mass on a screen. When this is calculated for a last or exit screen (at a discharge end of a shaker), it is assumed that most of the mass on the screen is discharged and can be taken as an indication of solids discharged.

In one embodiments, the controller (PLC or computer) includes two control loops. One control loop controls the acceleration by varying the voltage supplied to the magnets and measuring the signal from the accelerometer, indicative of the acceleration. The other control loop controls the frequency to maintain the lowest ratio of input power to output acceleration. To find the natural frequency of the system, the controller sweeps the magnet frequency over a given range that the natural frequency is expected to lie within. The frequency that yields the greatest acceleration for the same input is the natural frequency. The frequency control loop tried to maintain the frequency at the natural frequency. Once the natural frequency is found, if the ratio of input power to output acceleration decreases, then the controller adjusts down the frequency until the frequency is found that minimizes the required input power to maintain the same acceleration.

It is within the scope of the present invention to provide a vibratory separator or shale shaker with one, two, or more electromagnetic vibrators, the vibratory separator or shaker having one, two or more generally horizontal screens and/or one, two, three or more screens inclined uphill.

Figure 44A:
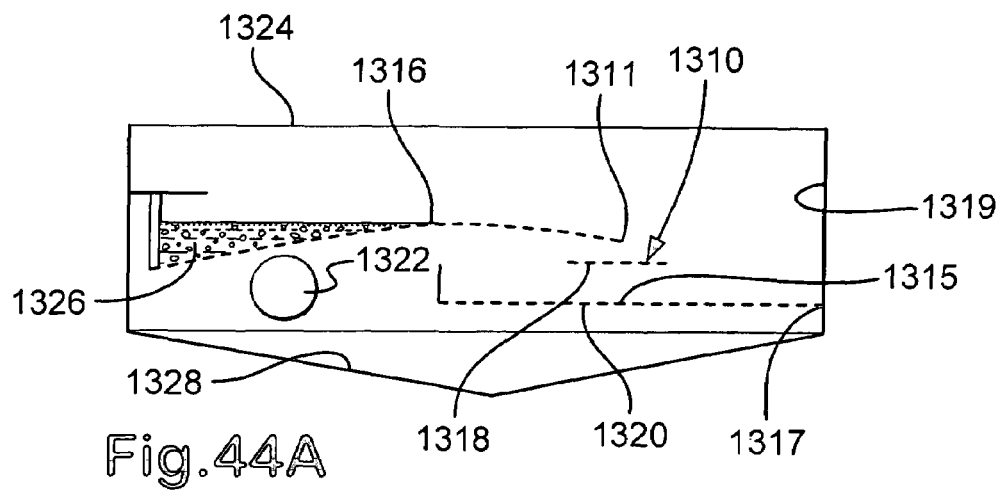
FIG. 44A is a side view in cross-section of a shaker according to the present invention.

FIG. 44A shows schematically a shale shaker 1312 according to the present invention with a flow diffusion apparatus 1310. The flow diffusion apparatus in FIG. 44A and those in FIG. 44B and FIG. 44C may be any flow diffusion apparatus disclosed in U.S. Pat. No. 6,868,972. Fluid flowing from an exit end 1311 of an upper screen 1316 hits the flow diffusion apparatus 1310. Without the flow diffusion apparatus 1310 in place, the fluid flowing from above would impact an area 1315 on a lower screen 1320. A basket 1324 supports the screens. The flow diffusion apparatus 1310 (as may be the case for any such apparatus) is secured to the basket 1324. The flow diffusion apparatus 1310 may be connected to the upper screen, the lower screen, or both in addition to, or instead of, securement to the basket 1324. The flow diffusion apparatus 1310 has one or a series of holes 1318 therethrough which permit fluid to flow therethrough down onto the lower screen 1320.

A vibratory apparatus 1322 (shown schematically; any electromagnetic vibratory apparatus disclosed herein) vibrates the basket 1324 in which the upper screen 1316 and lower screen 1320 are mounted. Fluid to be treated is introduced into a pool end 1326 of the shale shaker 1312. Fluid flows from both screens down into a collection receptacle 1328. Separated material exits from an exit end 1317 of the lower screen 1320.

Figure 44B:
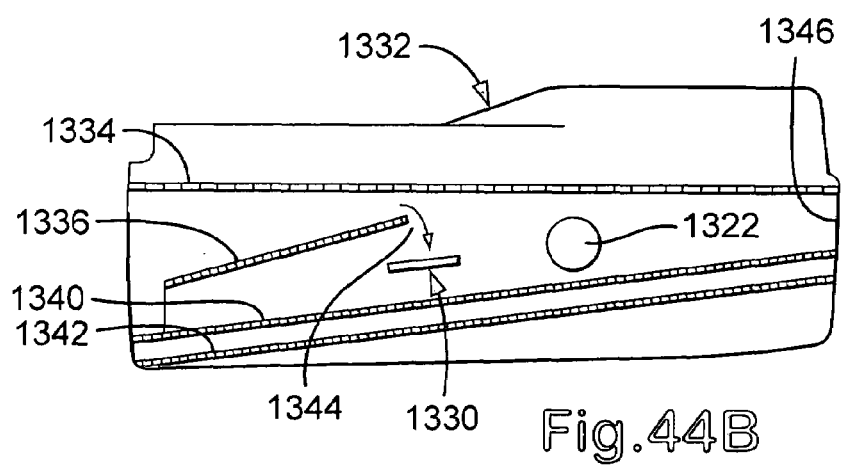
FIG. 44B is a side view in cross-section of a shaker according to the present invention.

FIG. 44B shows a shale shaker 1332 according to the present invention with a flow diffusion apparatus 1330. Fluid introduced at a fluid introduction end 1334 of the shale shaker 1332 flows to an upper screen 1336. The major portion of this fluid flows from the upper screen 1336 to an intermediate screen 1340 and through the intermediate screen 1340 to a lower screen 1342. Fluid flowing from an end 1344 of the intermediate screen 1340 (see arrow, FIG. 44B above the apparatus 1330) flows down onto the flow diffusion apparatus 1330 which, in the embodiment shown, is a solid plate; but which, according to the present invention, may have one or more holes, etc. for fluid flow therethrough. Vibrator apparatus 13322 (like that described above; shown schematically) vibrates a screen mounting basket 1346 in which the screens are located.

Figure 44C:
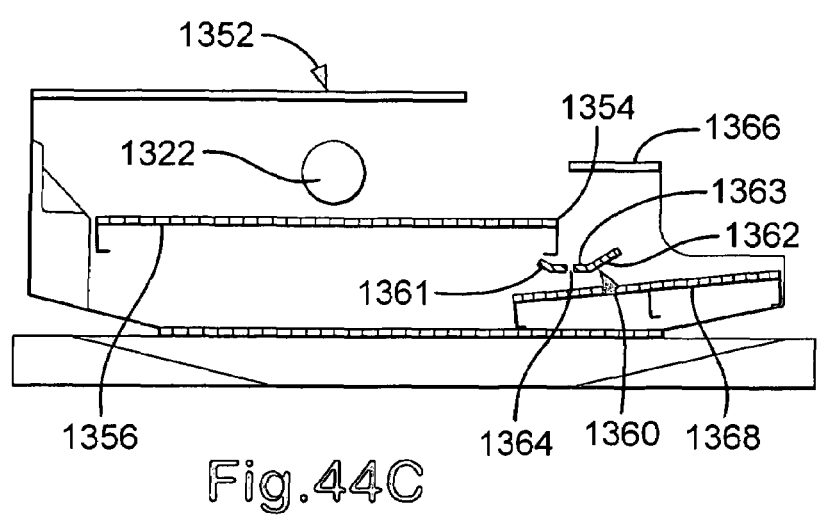
FIG. 44C is a side view in cross-section of a shaker according to the present invention.

FIG. 44C shows a shale shaker 1352 according to the present invention which has a flow diffusion apparatus 1350 (like those described above) which is positioned below a fluid exit end 1354 of an upper screen 1356 (which, as may be any screen etc. of any embodiment herein, may be any suitable known screen(s), screen apparatus(es), or screen assembly or assemblies). Viewed on end the flow diffusion apparatus in one aspect has two sides 1361, 1362 spaced apart by a flat part 1363 in a truncated "V" shape, but it is within the scope of this invention for any f low diffusion apparatus herein to be "V" shaped, "U" shaped, truncated "V" or "U" shaped, or flat. In one aspect side 1361 and/or side 1362 is deleted.

Fluid flowing from the fluid exit end 1354 of the upper screen 1356 falls into the flow diffusion apparatus 1350 and moves from there down onto a lower screen 1368 (which, as may be any screen etc. of any embodiment herein, may be any suitable known screen(s), screen apparatus(es), or screen assembly or assemblies). In one aspect, fluid flow holes (of different diameters) are present in the flat part 1363 of the flow diffusion apparatus 1350. In one aspect, all of the holes are of the same diameter. In one aspect the flow diffusion apparatus 1350 extends under and corresponds in length to slightly less than the width of the upper screen 1356 above the flow diffusion apparatus 1350. Vibrator apparatus 1322 (shown schematically; like the apparatus 1322 described above) vibrates a screen mounting basket 1366 in which are secured the screens 1356 and 1368.

A piezoelectric apparatus may be substituted for any electromagnetic vibratory apparatus disclosed herein in any embodiment of the present invention, including, but not limited to, piezoelectric transducers and patches as disclosed in U.S. Pat. Nos. 6,543,620; 6,938,778; and 6,953,122; and in the references referred to in these patents—all of said patents incorporated fully herein for all purposes. Incorporated fully herein for all purposes is the U.S. patent application filed on Oct. 20, 2005, Serial Number entitled "Shale Shakers and Screens with Identification Apparatuses" co-owned with the present invention.

The present invention, therefore, provides in certain, but not necessarily all embodiments, a computer readable medium containing instructions that when executed by a computer implement a method according to the present invention (any method disclosed herein according to the present invention).

The present invention, therefore, provides in certain, but not necessarily all embodiments, a shale shaker having: a base; a basket movably mounted on the base and for supporting screen apparatus for treating material including fluid introduced into the vibratory separator; screen apparatus supported by the basket, the material flowing onto the screen apparatus for treatment, fluid flowing through the screen apparatus for collection therebelow, at least a portion of the screen apparatus not inclined downhill; electromagnetic vibratory apparatus connected to the basket for vibrating the basket and the screen apparatus; driving apparatus for driving the electromagnetic vibratory apparatus; and control apparatus for controlling the electromagnetic vibratory apparatus.

The present invention, therefore, provides in certain, but not necessarily all embodiments, a vibratory separator including: a base, a basket movably mounted on the base and for supporting screen apparatus for treating material introduced to the vibratory separator, screen apparatus supported by the basket, the material flowing onto the screen apparatus for treatment, at least a portion of the screen apparatus not inclined downhill, electromagnetic vibratory apparatus connected to the basket for vibrating the basket and the screen apparatus, driving apparatus for driving the electromagnetic vibratory apparatus, and control apparatus for controlling the driving apparatus and the electromagnetic vibratory apparatus. Such a system may have one or some (in any possible combination) of the following: wherein at least a portion of the screen apparatus is inclined uphill; wherein at least a portion of the screen apparatus is horizontal; the screen apparatus comprising at least one upper screen apparatus in the basket, the at least one upper screen apparatus having a fluid exit end, and at least one lower screen apparatus in the basket below the at least one upper screen apparatus, fluid flowable from the at least one upper screen apparatus down onto the at least one lower screen apparatus, and flow diffusion apparatus mounted below the fluid exit end of the at least one upper screen apparatus and above the at least one lower screen apparatus, so that fluid flowing down from the at least one upper screen apparatus flows onto the flow diffusion apparatus and is diffused thereby; wherein the vibratory separator is a shale shaker and the material is drilling fluid with drilled cuttings therein; wherein the electromagnetic vibratory apparatus includes a metal plate spaced-apart from an electromagnet; the driving apparatus is variable frequency drive apparatus for selectively driving the electromagnetic vibratory apparatus at a selected frequency, sensor apparatus connected to the vibratory separator for sensing a parameter indicative of operation of the vibratory separator for providing a signal corresponding to said parameter, and the control apparatus for receiving signals from the sensor apparatus, for controlling the vibratory separator based on said signals; wherein the control apparatus is for automatically signaling the variable frequency drive apparatus to change the frequency of the electromagnetic vibratory apparatus so that force applied to the basket is changed; wherein the control apparatus can change the frequency to maintain vibration of the basket at a natural resonant frequency of the basket; wherein the control apparatus continuously changes the frequency to continuously maintain the basket vibrating at the natural resonant frequency of the basket; wherein the control apparatus controls the driving apparatus to drive the electromagnetic vibratory apparatus to de-plug the screen apparatus; wherein the sensor apparatus comprises a plurality of sensor apparatuses; angle adjustment apparatus connected to the basket for adjusting angle of the basket; flow sensor apparatus connected to the vibratory separator for sensing the flow of material onto the screen apparatus, the flow sensor apparatus controlled by and in communication with the control apparatus, and the control apparatus for adjusting shaker operation in response to signals from the flow sensor apparatus; the electromagnetic vibratory apparatus connectible to the basket at a plurality of locations so that a motion profile of the basket is selectively variable between linear, elliptical, and circular motion; wherein the motion profile of the basket includes a first shape at a material introduction end of the basket and a second shape at a material exit end of the basket; wherein the basket has a middle area between the material introduction end and the fluid exit end and the motion profile of the basket includes a thin ellipse shape at the material introduction end, a medium ellipse shape at the middle area, and a fatter ellipse shape at the material exit end; the control apparatus including interface apparatus for an interface between on-site personnel at a location of the vibratory separator and an entity remote therefrom; the vibratory separator on a drilling rig, the control apparatus for monitoring and analyzing a plurality of signals from the sensor apparatus and for transmitting signals indicative of information related to operation of the vibratory separator to a processor on the drilling rig, the processor including a set of health check rules for health checks comprising logical rules, inputs and outputs for defining events associated with the status of the vibratory separator, the processor for determining a severity code for each event and for reporting the events and severity codes to a central server, the events reported by the processor to the central server in a protocol defining a data structure, the data structure comprising a hierarchical tree node structure wherein results from application of the health check rules are a bottommost node of the tree node structure, and displaying the event severity codes on a display; the processor for providing to the central server the results as records containing node information regarding an appropriate location for the results in the tree node structure; the control apparatus running health checks in real time to provide results regarding on-going status of the vibratory separator; the control apparatus for indicating a potential failure of the vibratory separator; the screen apparatus having an energizable identification apparatus, reader apparatus for reading the energizable identification apparatus and for sending a signal based on said reading to the control apparatus, and the control apparatus for automatically shutting down the vibratory separator upon receipt and processing of the signal based on the identity of the screen apparatus; wherein the control apparatus can automatically shut down the vibratory separator based on a parameter of the material or based on the flow rate of the material; energizable identification apparatus on the electromagnetic vibratory apparatus for identifying the vibratory apparatus; reader apparatus for reading the energizable identification apparatus and for sending a signal based on said reading to the control apparatus; and/or wherein the basket is made of composite material and the base is made of steel.

The present invention, therefore, provides in certain, but not necessarily all embodiments, a method for treating material introduced to a vibratory separator, the method including introducing material to a vibratory separator, the vibratory separator as any according to the present invention with electromagnetic vibratory apparatus, and control apparatus for controlling driving apparatus that drives the electromagnetic vibratory apparatus, treating the material in the vibratory separator, and controlling the electromagnetic vibratory apparatus with the control apparatus. Such a method may have one or some (in any possible combination) of the following: wherein the vibratory separator includes angle adjustment apparatus connected to the basket, the method includes adjusting the angle of the basket with the angle adjustment apparatus; wherein the vibratory separator further includes driving apparatus including variable frequency drive apparatus for selectively driving the electromagnetic vibratory apparatus at a selected frequency, sensor apparatus connected to the vibratory separator for sensing a parameter indicative of operation of the vibratory separator for providing a signal corresponding to said parameter, and the control apparatus for receiving signals from the sensor apparatus, for controlling the vibratory separator based on said signals, the method further including controlling the variable frequency drive apparatus with the control apparatus; wherein the control apparatus is for automatically signaling the variable frequency drive apparatus to change the frequency of the electromagnetic vibratory apparatus so that force applied to the basket is changed; wherein the basket with material therein has a natural resonant frequency and the control apparatus maintains said natural resonant frequency as material flows through the basket; wherein the control apparatus controls the driving apparatus to de-plug the screen apparatus; based on said natural resonant frequency, determining a measure of solids discharged from the vibratory separator; and/or wherein the vibratory separator is a shale shaker and the material is drilling fluid with solids therein.

The present invention, therefore, provides in certain, but not necessarily all embodiments, a computer readable medium containing instructions that when executed by a computer implement a method (any method according to the present invention) for treating material introduced to a vibratory separator or shale shaker.

In conclusion, therefore, the present invention and the embodiments disclosed herein and those covered by the appended claims are well adapted to carry out the objectives and obtain the ends set forth. Certain changes can be made in the subject matter without departing from the spirit and the scope of this invention. Changes are possible within the scope of this invention and each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112.

What is claimed is:

1. A vibratory separator comprising a basket for supporting screen apparatus for treating material introduced into the vibratory separator, the basket on a base and pivotable with respect thereto, vibratory apparatus connected to the basket for vibrating the basket, screen apparatus supported by the basket, the screen apparatus having an exit end, the material flowable onto the screen apparatus to form a pool on the screen apparatus and a beach on the screen apparatus adjacent the pool, material not passing through the screen apparatus flowing off an exit end of the screen apparatus, the beach adjacent the exit end of the screen apparatus, the beach having a rear boundary line on the screen apparatus and a front boundary at or near the exit end of the screen apparatus, measurement sensor apparatus connected to the vibratory separator and positioned above the screen apparatus for measuring a distance from the measurement sensor apparatus to a top surface of the pool, the measurement sensor apparatus including a signal production portion for producing signals indicative of said distance and for transmitting said signals, a control system controlling and in communication with the measurement sensor apparatus for receiving signals from the measurement sensor apparatus indicative of said distance and for processing said signals to calculate a pool depth corresponding to said distance, said pool depth related to a location of an edge of said pool adjacent said beach, angle adjustment apparatus connected to the basket and controlled by the control system for adjusting angle of the basket, thereby adjusting extent of the beach, the basket pivotably connected by two spaced-apart pivot members to the base beneath said rear boundary line, the basket pivotable at a pivot point beneath the rear boundary line, and a control system controlling the angle adjustment apparatus to maintain the rear boundary line above a line between the two spaced-apart pivot members and thereby maintain a desired beach extent, the vibratory separator comprising a shale shaker,
the basket movably mounted on the base,
the screen apparatus for treating material including fluid introduced into the vibratory separator, the fluid flowing through the screen apparatus for collection therebelow,
at least a portion of the screen apparatus not inclined downhill,
the vibratory apparatus comprising electromagnetic vibratory apparatus connected to the basket for vibrating the basket and the screen apparatus,
driving apparatus for driving the electromagnetic vibratory apparatus, and
control apparatus for controlling the electromagnetic vibratory apparatus.

2. A vibratory separator comprising a basket for supporting screen apparatus for treating material introduced into the vibratory separator, the basket on a base and pivotable with respect thereto, vibratory apparatus connected to the basket for vibrating the basket, screen apparatus supported by the basket, the screen apparatus having an exit end, the material flowable onto the screen apparatus to form a pool on the screen apparatus and a beach on the screen apparatus adjacent the pool, material not passing through the screen apparatus flowing off an exit end of the screen apparatus, the beach adjacent the exit end of the screen apparatus, the beach having a rear boundary line on the screen apparatus and a front boundary at or near the exit end of the screen apparatus, measurement sensor apparatus connected to the vibratory separator and positioned above the screen apparatus for measuring a distance from the measurement sensor apparatus to a top surface of the pool, the measurement sensor apparatus including a signal production portion for producing signals indicative of said distance and for transmitting said signals, a control system controlling and in communication with the measurement sensor apparatus for receiving signals from the measurement sensor apparatus indicative of said distance and for processing said signals to calculate a pool depth corresponding to said distance, said pool depth related to a location of an edge of said pool adjacent said beach, angle adjustment apparatus connected to the basket and controlled by the control system for adjusting angle of the basket, thereby adjusting extent of the beach, the basket pivotably connected by two spaced-apart pivot members to the base beneath said rear boundary line, the basket pivotable at a pivot point beneath the rear boundary line, and a control system controlling the angle adjustment apparatus to maintain the rear boundary line above a line between the two spaced-apart pivot members and thereby maintain a desired beach extent, the basket movably mounted on the base,
at least a portion of the screen apparatus not inclined downhill,
the vibratory apparatus comprising electromagnetic vibratory apparatus connected to the basket for vibrating the basket and the screen apparatus,
driving apparatus for driving the electromagnetic vibratory apparatus, and
control apparatus for controlling the driving apparatus and the electromagnetic vibratory apparatus.

3. The vibratory separator of claim 2 wherein at least a portion of the screen apparatus is inclined uphill.

4. The vibratory separator of claim 3 wherein at least a portion of the screen apparatus is horizontal.

5. The vibratory separator of claim 2 further comprising the screen apparatus comprising at least one upper screen apparatus in the basket, the at least one upper screen apparatus having a fluid exit end, and at least one lower screen apparatus in the basket below the at least one upper screen apparatus, fluid flowable from the at least one upper screen apparatus down onto the at least one lower screen apparatus, and flow diffusion apparatus mounted below the fluid exit end of the at least one upper screen apparatus and above the at least one lower screen apparatus, so that fluid flowing down from the at least one upper screen apparatus flows onto the flow diffusion apparatus and is diffused thereby.

6. The vibratory separator of claim 2 wherein the vibratory separator is a shale shaker and the material is drilling fluid with drilled cuttings therein.

7. The vibratory separator of claim 5 wherein the electromagnetic vibratory apparatus includes a metal plate spaced-apart from an electromagnet.

8. The vibratory separator of claim 2 further comprising the driving apparatus comprising variable frequency drive apparatus for selectively driving the electromagnetic vibratory apparatus at a selected frequency, sensor apparatus connected to the vibratory separator for sensing a parameter indicative of operation of the vibratory separator for providing a signal corresponding to said parameter, and the control apparatus for receiving signals from the sensor apparatus, for controlling the vibratory separator based on said signals.

9. The vibratory separator of claim 8 wherein the control apparatus is for automatically signalling the variable frequency drive apparatus to change the frequency of the electromagnetic vibratory apparatus so that force applied to the basket is changed.

10. The vibratory separator of claim 9 wherein the control apparatus can change the frequency to maintain vibration of the basket at a natural resonant frequency of the basket.

11. The vibratory separator of claim 10 wherein the control apparatus continuously changes the frequency to continuously maintain the basket vibrating at the natural resonant frequency of the basket.

12. The vibratory separator of claim 8 wherein the control apparatus controls the driving apparatus to drive the electromagnetic vibratory apparatus to de-plug the screen apparatus.

13. The vibratory separator of claim 8 wherein the sensor apparatus comprises a plurality of sensor apparatuses.

14. The vibratory separator of claim 2 further comprising the angle adjustment apparatus including a basket support pivotably mounted to the base and moving apparatus for selectively moving the basket up and down.

15. The vibratory separator of claim 2 further comprising flow sensor apparatus connected to the vibratory separator for sensing the flow of material onto the screen apparatus, the flow sensor apparatus controlled by and in communication with the control apparatus, and the control apparatus for adjusting shaker operation in response to signals from the flow sensor apparatus.

16. The vibratory separator of claim 2 further comprising the electromagnetic vibratory apparatus connectible to the basket at a plurality of locations so that a motion profile of the basket is selectively variable between linear, elliptical, and circular motion.

17. The vibratory separator of claim 16 wherein the motion profile of the basket includes a first shape at a material introduction end of the basket and a second shape at a material exit end of the basket.

18. The vibratory separator of claim 16 wherein the basket has a middle area between the material introduction end and the fluid exit end and the motion profile of the basket includes a thin ellipse shape at the material introduction end, a medium ellipse shape at the middle area, and a fatter ellipse shape at the material exit end.

19. The vibratory separator of claim 2 further comprising the control apparatus including interface apparatus for an interface between on-site personnel at a location of the vibratory separator and an entity remote therefrom.

20. The vibratory separator of claim 2 further comprising the vibratory separator on a drilling rig, the control apparatus for monitoring and analyzing a plurality of signals from the sensor apparatus and for transmitting signals indicative of information related to operation of the vibratory separator to a processor on the drilling rig, the processor including a set of health check rules for health checks comprising logical rules, inputs and outputs for defining events associated with the status of the vibratory separator, the processor for determining a severity code for each event and for reporting the events and severity codes to a central server, the events reported by the processor to the central server in a protocol defining a data structure, the data structure comprising a hierarchical tree node structure wherein results from application of the health check rules are a bottommost node of the tree node structure, and displaying the event severity codes on a display.

21. The vibratory separator of claim 20 further comprising the processor for providing to the central server the results as records containing node information regarding an appropriate location for the results in the tree node structure.

22. The vibratory separator of claim 20 further comprising the control apparatus running health checks in real time to provide results regarding on-going status of the vibratory separator.

23. The vibratory separator of claim 22 further comprising the control apparatus for indicating a potential failure of the vibratory separator.

24. The vibratory separator of claim 2 further comprising the screen apparatus having an energizable identification apparatus, reader apparatus for reading the energizable identification apparatus and for sending a signal based on said reading to the control apparatus, and the control apparatus for automatically shutting down the vibratory separator upon receipt and processing of the signal based on the identity of the screen apparatus.

25. The vibratory separator of claim 24 wherein the control apparatus can automatically shut down the vibratory separator based on a parameter of the material or based on the flow rate of the material.

26. The vibratory separator of claim 2 further comprising energizable identification apparatus on the electromagnetic vibratory apparatus for identifying the vibratory apparatus.

27. The vibratory separator of claim 26 further comprising reader apparatus for reading the energizable identification apparatus and for sending a signal based on said reading to the control apparatus.

28. The vibratory separator of claim 1 wherein the basket is made of composite material and the base is made of steel.

29. A method for treating material introduced to a vibratory separator, the method comprising introducing material to a vibratory separator, the vibratory separator comprising a basket for supporting screen apparatus for treating material introduced into the vibratory separator, the basket on a base and pivotable with respect thereto, vibratory apparatus connected to the basket for vibrating the basket, screen apparatus supported by the basket, the screen apparatus having an exit end, the material flowable onto the screen apparatus to form a pool on the screen apparatus and a beach on the screen apparatus adjacent the pool, material not passing through the screen apparatus flowing off an exit end of the screen apparatus, the beach adjacent the exit end of the screen apparatus, the beach having a rear boundary line on the screen apparatus and a front boundary at or near the exit end of the screen apparatus, measurement sensor apparatus connected to the vibratory separator and positioned above the screen apparatus for measuring a distance from the measurement sensor apparatus to a top surface of the pool, the measurement sensor apparatus including a signal production portion for producing signals indicative of said distance and for transmitting said signals, a control system controlling and in communication with the measurement sensor apparatus for receiving signals from the measurement sensor apparatus indicative of said distance and for processing said signals to calculate a pool depth corresponding to said distance, said pool depth related to a location of an edge of said pool adjacent said beach, angle adjustment apparatus connected to the basket and controlled by the control system for adjusting angle of the basket, thereby adjusting extent of the beach, the basket pivotably connected by two spaced-apart pivot members to the base beneath said rear boundary line, the basket pivotable at a pivot point beneath the rear boundary line, and a control system controlling the angle adjustment apparatus to maintain the rear boundary line above a line between the two spaced-apart pivot members and thereby maintain a desired beach extent, the vibratory separator comprising a shale shaker,
the basket movably mounted on the base,
the screen apparatus for treating material including fluid introduced into the vibratory separator, the fluid flowing through the screen apparatus for collection therebelow,
at least a portion of the screen apparatus not inclined downhill,
electromagnetic vibratory apparatus connected to the basket for vibrating the basket and the screen apparatus,
driving apparatus for driving the electromagnetic vibratory apparatus, and
control apparatus for controlling the electromagnetic vibratory apparatus, the method further comprising
treating the material in the vibratory separator, and
controlling the electromagnetic vibratory apparatus with the control apparatus.

30. The method of claim 29 wherein the vibratory separator includes angle adjustment apparatus connected to the basket, the method further comprising adjusting the angle of the basket with the angle adjustment apparatus.

31. The method of claim 30 wherein the vibratory separator further includes the driving apparatus comprising variable frequency drive apparatus for selectively driving the electromagnetic vibratory apparatus at a selected frequency, sensor apparatus connected to the vibratory separator for sensing a parameter indicative of operation of the vibratory separator for providing a signal corresponding to said parameter, and the control apparatus for receiving signals from the sensor apparatus, for controlling the vibratory separator based on said signals, the method further comprising controlling the variable frequency drive apparatus with the control apparatus.

32. The method of claim 31 further comprising wherein the control apparatus is for automatically signalling the variable frequency drive apparatus to change the frequency of the electromagnetic vibratory apparatus so that force applied to the basket is changed.

33. The method of claim 29 wherein the basket with material therein has a natural resonant frequency and the control apparatus maintains said natural resonant frequency as material flows through the basket.

34. The method of claim 29 wherein the control apparatus controls the driving apparatus to de-plug the screen apparatus.

35. The method of claim 33 further comprising based on said natural resonant frequency, determining a measure of solids discharged from the vibratory separator.

36. The method of claim 30 wherein the vibratory separator is a shale shaker and the material is drilling fluid with solids therein.

37. A computer readable medium containing instructions that when executed by a computer implement a method for treating material introduced to a vibratory separator, the method including introducing material to a vibratory separator comprising a basket for supporting screen apparatus for treating material introduced into the vibratory separator, the basket on a base and pivotable with respect thereto, vibratory apparatus connected to the basket for vibrating the basket, screen apparatus supported by the basket, the screen apparatus having an exit end, the material flowable onto the screen apparatus to form a pool on the screen apparatus and a beach on the screen apparatus adjacent the pool, material not passing through the screen apparatus flowing off an exit end of the screen apparatus, the beach adjacent the exit end of the screen apparatus, the beach having a rear boundary line on the screen apparatus and a front boundary at or near the exit end of the screen apparatus, measurement sensor apparatus connected to the vibratory separator and positioned above the screen apparatus for measuring a distance from the measurement sensor apparatus to a top surface of the pool, the measurement sensor apparatus including a signal production portion for producing signals indicative of said distance and for transmitting said signals, a control system controlling and in communication with the measurement sensor apparatus for receiving signals from the measurement sensor apparatus indicative of said distance and for processing said signals to calculate a pool depth corresponding to said distance, said pool depth related to a location of an edge of said pool adjacent said beach, angle adjustment apparatus connected to the basket and controlled by the control system for adjusting angle of the basket, thereby adjusting extent of the beach, the basket pivotably connected by two spaced-apart pivot members to the base beneath said rear boundary line, the basket pivotable at a pivot point beneath the rear boundary line, and a control system controlling the angle adjustment apparatus to maintain the rear boundary line above a line between the two spaced-apart pivot members and thereby maintain a desired beach extent, the basket movably mounted on the, at least a portion of the screen apparatus not inclined downhill, electromagnetic vibratory apparatus on the basket for vibrating the screen apparatus, driving apparatus for driving the electromagnetic vibratory apparatus, and control apparatus, treating the material in the vibratory separator, and controlling the electromagnetic vibratory apparatus and the driving apparatus with the control apparatus.

* * * * *